US009492832B2

(12) United States Patent
Kim

(10) Patent No.: US 9,492,832 B2
(45) Date of Patent: Nov. 15, 2016

(54) SPRINKLER WITH BRAKE ASSEMBLY

(71) Applicant: Rain Bird Corporation, Azusa, CA (US)

(72) Inventor: Eugene Ezekiel Kim, Covina, CA (US)

(73) Assignee: Rain Bird Corporation, Azusa, CA (US)

( * ) Notice: Subject to any disclaimer, the term of this patent is extended or adjusted under 35 U.S.C. 154(b) by 257 days.

(21) Appl. No.: 13/829,142

(22) Filed: Mar. 14, 2013

(65) Prior Publication Data

US 2014/0263734 A1   Sep. 18, 2014

(51) Int. Cl.
*F16D 65/02* (2006.01)
*B05B 3/00* (2006.01)
*B05B 3/04* (2006.01)

(52) U.S. Cl.
CPC .............. *B05B 3/003* (2013.01); *B05B 3/007* (2013.01); *B05B 3/0486* (2013.01); *F16D 65/02* (2013.01); *F16D 2065/026* (2013.01)

(58) Field of Classification Search
None
See application file for complete search history.

(56) References Cited

U.S. PATENT DOCUMENTS

| | | |
|---|---|---|
| 1,239,229 A | 9/1917 | Shaw |
| 1,407,335 A | 2/1922 | Reynolds et al. |
| 1,435,140 A | 11/1922 | Rolland |
| 1,779,983 A | 10/1930 | Roach |
| 1,805,782 A | 5/1931 | Munz |
| 1,932,427 A | 10/1933 | Stone |
| 1,950,712 A | 3/1934 | Coles et al. ............ 299/69 |
| 2,064,066 A | 12/1936 | Jepson et al. .......... 299/69 |
| 2,086,515 A | 7/1937 | Evans ...................... 299/69 |
| 2,108,787 A | 2/1938 | Coles et al. ............ 299/69 |
| 2,177,100 A | 10/1939 | Frame |
| 2,200,017 A | 5/1940 | Anderson ............... 299/68 |
| 2,212,533 A | 8/1940 | Zimmerman |
| 2,239,942 A | 4/1941 | Stone et al. |

(Continued)

FOREIGN PATENT DOCUMENTS

| | | | |
|---|---|---|---|
| AU | 2006235876 A1 | 5/2007 | ....... B05B 3/02 |
| AU | 2012201884 B2 | 4/2012 | ....... B05B 3/02 |

(Continued)

OTHER PUBLICATIONS

International Search Report and Written Opinion dated Jun. 10, 2014, from related International (PCT) Patent Application No. PCT/US2014/015391, 7 pages.

(Continued)

*Primary Examiner* — Arthur O Hall
*Assistant Examiner* — Christopher R Dandridge
(74) *Attorney, Agent, or Firm* — Fitch, Even, Tabin & Flannery, LLP

(57) ABSTRACT

In one aspect, a sprinkler is provided having a nozzle, a deflector that receives fluid flow from the nozzle, and a friction brake assembly that controls rotation of a deflector. The friction brake assembly is releasably connected to the frame in order to enhance serviceability of the sprinkler. In another aspect, a sprinkler is provided having a frame, a deflector rotatably connected to the frame, a nozzle, and a nozzle socket of the frame. The nozzle and nozzle socket have interlocking portions that releasably connect the nozzle to the frame. The nozzle may be easily removed for servicing. Further, the nozzle socket can be configured to receive a plurality of nozzles having different flow characteristics. A nozzle can be selected and utilized with the sprinkler according to the desired application for the sprinkler.

22 Claims, 50 Drawing Sheets

(56) References Cited

U.S. PATENT DOCUMENTS

| | | | |
|---|---|---|---|
| 2,273,401 A | 2/1942 | Ferrando | 299/126 |
| 2,338,273 A | 1/1944 | Wilkins | |
| 2,488,234 A | 5/1947 | Perry | |
| 2,423,762 A | 7/1947 | Everett | |
| 2,530,779 A | 11/1950 | Owbridge | |
| 2,604,163 A | 7/1952 | Exline | |
| 2,783,094 A | 2/1957 | Storie | |
| 2,819,115 A | 1/1958 | Arnold | |
| 3,009,648 A | 11/1961 | Halt | |
| 3,009,651 A | 11/1961 | Wolf | |
| 3,022,012 A | 2/1962 | Sharp | |
| 3,029,028 A | 4/1962 | Skerritt | 239/252 |
| 3,070,192 A | 12/1962 | Barkalow | |
| 3,090,563 A | 5/1963 | Cheeseboro | 239/206 |
| 3,107,752 A | 10/1963 | McLean | |
| 3,195,817 A | 7/1965 | Sandie | 239/252 |
| 3,292,863 A | 12/1966 | Nelson | 239/227 |
| 3,387,785 A | 6/1968 | Jaggers | |
| 3,408,009 A | 10/1968 | Friedmann et al. | |
| 3,408,055 A | 10/1968 | Machiels | |
| 3,448,928 A | 6/1969 | Turner | 239/252 |
| 3,533,561 A | 10/1970 | Henderson | |
| 3,682,389 A | 8/1972 | Chapin | |
| 3,744,720 A | 7/1973 | Meyer | |
| 3,788,552 A | 1/1974 | Roberts | |
| 3,799,453 A | 3/1974 | Hart | 239/600 |
| 3,814,326 A | 6/1974 | Bartlett | |
| 3,913,170 A | 10/1974 | Nakane et al. | |
| 3,857,446 A * | 12/1974 | Kenny | 169/60 |
| 3,861,503 A * | 1/1975 | Nash | F16F 9/52 |
| | | | 188/276 |
| 3,918,645 A | 11/1975 | Mohler | |
| 3,933,210 A | 1/1976 | Skidmore | |
| 3,958,761 A | 5/1976 | Watanabe | |
| 3,994,441 A | 11/1976 | Testa | |
| 4,019,686 A | 4/1977 | Palma | |
| 4,083,410 A | 4/1978 | Anderson | |
| 4,091,996 A | 5/1978 | Nelson | |
| 4,154,402 A | 5/1979 | Fletcher | |
| 2,906,023 A | 9/1979 | DE | |
| D253,364 S | 11/1979 | McFadden | |
| 4,182,494 A | 1/1980 | Wichman et al. | |
| 4,193,548 A | 3/1980 | Meyer | 239/230 |
| 4,198,001 A | 4/1980 | Rodriguez | 239/227 |
| 4,228,956 A | 10/1980 | Varner | |
| 4,231,521 A | 11/1980 | Hermine | |
| 4,231,522 A | 11/1980 | Drechsel | |
| 4,256,262 A | 3/1981 | Rosenberg et al. | |
| D259,438 S | 6/1981 | Meyer | D23/35 |
| 4,364,519 A | 12/1982 | Kreitzberg | |
| 4,405,018 A | 9/1983 | Fischer | |
| 4,434,937 A | 3/1984 | Pitchford | 239/230 |
| 4,440,345 A | 4/1984 | Figwer et al. | 239/214 |
| 4,443,028 A | 4/1984 | Hayes | 285/38 |
| 4,492,339 A | 1/1985 | Kreitzberg | |
| 4,498,626 A | 2/1985 | Pitchford | |
| 4,498,628 A | 2/1985 | Tucker | |
| 4,560,108 A | 12/1985 | Rubinstein | 239/222.17 |
| 4,566,632 A | 1/1986 | Sesser | |
| 4,580,729 A | 4/1986 | Pounder | 239/524 |
| 4,625,715 A | 12/1986 | Bucher | |
| 4,625,915 A | 12/1986 | Cockman | 239/390 |
| 4,660,766 A * | 4/1987 | Nelson | B05B 3/0486 |
| | | | 188/290 |
| 4,689,432 A | 8/1987 | Tsien et al. | |
| 4,710,142 A | 12/1987 | Lovell | 440/83 |
| 4,715,543 A | 12/1987 | Rinkewich | |
| 4,760,959 A | 8/1988 | Gorney | |
| 4,787,557 A | 11/1988 | Jackson | |
| 4,796,810 A | 1/1989 | Zakai | 239/222.17 |
| 4,796,811 A | 1/1989 | Davisson | 239/222.17 |
| 4,801,089 A | 1/1989 | Zeman | |
| 4,805,838 A | 2/1989 | Greenberg | |
| 4,815,662 A | 3/1989 | Hunter | 239/222.17 |
| 4,819,872 A | 4/1989 | Rosenberg | 239/119 |
| 4,846,406 A | 7/1989 | Christy | |
| 4,867,378 A | 9/1989 | Kah, Jr. | |
| 4,869,431 A | 9/1989 | Jubert et al. | |
| 4,869,432 A | 9/1989 | Christy | |
| 4,886,211 A | 12/1989 | Cohen | 239/222.17 |
| 4,905,903 A | 3/1990 | Katzer | 239/246 |
| 4,909,441 A | 3/1990 | Christy | |
| 4,932,590 A | 6/1990 | Hunter | 239/222.17 |
| 4,938,322 A | 7/1990 | Sugasawara et al. | |
| 4,944,476 A | 7/1990 | Olson | |
| 4,953,788 A | 9/1990 | Hansen | |
| 4,955,539 A | 9/1990 | Ruttenberg | |
| 4,971,250 A | 11/1990 | Hunter | 239/222.17 |
| 4,986,474 A | 1/1991 | Schisler et al. | 239/205 |
| 5,007,586 A | 4/1991 | Cohen | 239/222.17 |
| 5,031,835 A | 7/1991 | Rojas | |
| 5,037,269 A * | 8/1991 | Halberg | 415/134 |
| 5,058,806 A | 10/1991 | Rupar | 239/205 |
| 5,080,286 A | 1/1992 | Morrison | |
| RE33,823 E | 2/1992 | Nelson et al. | |
| 5,086,977 A | 2/1992 | Kah, Jr. | |
| 5,098,020 A | 3/1992 | Cooper | |
| 5,104,045 A | 4/1992 | Kah, Jr. | 239/246 |
| 5,109,929 A | 5/1992 | Spears | |
| 5,123,593 A * | 6/1992 | Rundle | 236/93 B |
| 5,158,231 A | 10/1992 | Christen et al. | |
| 5,191,811 A * | 3/1993 | Kogure | F16D 37/02 |
| | | | 188/290 |
| 5,199,646 A | 4/1993 | Kah, Jr. | |
| 5,211,267 A | 5/1993 | Clark | |
| 5,213,016 A | 5/1993 | Kah, Jr. | |
| 5,224,653 A | 7/1993 | Nelson et al. | 239/222.17 |
| 5,232,157 A | 8/1993 | Laffrey | 239/222.17 |
| 5,288,022 A | 2/1994 | Sesser | 239/205 |
| 5,297,737 A | 3/1994 | Davisson | 239/222.17 |
| 5,307,993 A | 5/1994 | Simonetti et al. | 239/247 |
| 5,335,859 A | 8/1994 | Thayer et al. | 239/390 |
| 5,353,989 A | 10/1994 | Drechsel | |
| 5,372,307 A | 12/1994 | Sesser | 239/210 |
| 5,377,914 A | 1/1995 | Christen | 239/252 |
| 5,409,168 A | 4/1995 | Nelson et al. | 239/222.17 |
| 5,415,348 A | 5/1995 | Nelson | 239/71 |
| 5,439,176 A | 8/1995 | Bussiere | |
| RE35,037 E | 9/1995 | Kah, Jr. | |
| 5,476,223 A | 12/1995 | Drechsel | |
| 5,544,814 A | 8/1996 | Spenser | 239/241 |
| 5,622,316 A | 4/1997 | Drechsel | 239/230 |
| 5,671,885 A | 9/1997 | Davisson | 239/222.17 |
| 5,671,886 A | 9/1997 | Sesser | 239/222.21 |
| 5,687,909 A | 11/1997 | Dean | |
| 5,730,365 A | 3/1998 | Messinger | 239/222.17 |
| 5,760,373 A | 6/1998 | Colling | |
| 5,762,269 A | 6/1998 | Sweet | 239/71 |
| 5,823,580 A | 10/1998 | Ungerecht | |
| 5,860,745 A | 1/1999 | Squyres | 384/97 |
| 5,868,316 A | 2/1999 | Scott | |
| 5,909,848 A | 6/1999 | Zink | |
| 5,911,894 A | 6/1999 | Colling | |
| 5,947,387 A | 9/1999 | Zink et al. | 239/227 |
| 5,964,414 A | 10/1999 | Hardy et al. | 239/252 |
| 5,971,297 A | 10/1999 | Sesser | 239/222.21 |
| 5,980,112 A | 11/1999 | Matthews | 384/97 |
| 5,992,760 A | 11/1999 | Kearby | |
| 6,019,295 A | 2/2000 | McKenzie | |
| 6,074,119 A | 6/2000 | Schlanger | |
| 6,085,994 A | 7/2000 | Zink | 239/227 |
| 6,095,432 A | 8/2000 | Casagrande | |
| 6,135,364 A | 10/2000 | Nickish | 239/222.17 |
| 6,142,386 A | 11/2000 | Spenser | |
| 6,145,760 A | 11/2000 | Harris | 239/533.1 |
| 6,193,169 B1 | 2/2001 | Steinhilber | |
| 6,209,802 B1 | 4/2001 | Koivunen | |
| 6,244,521 B1 | 6/2001 | Sesser | 239/222.17 |
| 6,260,770 B1 | 7/2001 | Epstein et al. | |
| 6,264,115 B1 | 7/2001 | Liska et al. | 239/119 |
| 6,322,110 B1 | 11/2001 | Banker et al. | |

(56) References Cited

U.S. PATENT DOCUMENTS

| | | | |
|---|---|---|---|
| 6,390,386 B2 | 5/2002 | Krohn et al. ............... 239/119 |
| 6,443,372 B1 | 9/2002 | Hsu | |
| 6,464,151 B1 | 10/2002 | Cordua | |
| D466,585 S | 12/2002 | Alkalay | |
| 6,488,218 B1 | 12/2002 | Townsend et al. ........... 239/205 |
| 6,494,384 B1 | 12/2002 | Meyer ................... 239/222.11 |
| 6,499,672 B1 | 12/2002 | Sesser ................... 239/222.11 |
| 6,530,532 B1 | 3/2003 | Santiesteban et al. ........ 239/233 |
| 6,557,787 B2 | 5/2003 | Swan | |
| 6,581,981 B2 | 6/2003 | Cooper | |
| D481,444 S | 10/2003 | Guo | |
| 6,651,905 B2 | 11/2003 | Sesser et al. ................. 239/205 |
| 6,688,539 B2 | 2/2004 | Griend | |
| 6,736,332 B2 | 5/2004 | Sesster et al. ............... 239/204 |
| 6,755,287 B2 * | 6/2004 | Hadden ................... F16F 9/12 188/290 |
| 6,814,304 B2 | 11/2004 | Onofrio ....................... 239/201 |
| 6,814,305 B2 | 11/2004 | Townsend ................... 239/242 |
| 6,827,291 B2 | 12/2004 | Townsend ................... 239/242 |
| 6,854,668 B2 | 2/2005 | Wancho et al. ............... 239/498 |
| 6,899,285 B2 | 5/2005 | Goettl et al. | |
| 6,899,287 B2 | 5/2005 | Pinch et al. ................. 239/380 |
| 6,976,543 B1 | 12/2005 | Fischer ......................... 169/37 |
| D516,669 S | 3/2006 | Antonucci et al. | |
| 7,025,287 B2 | 4/2006 | Perkins ................... 239/222.17 |
| 7,032,836 B2 | 4/2006 | Sesser et al. ................. 239/204 |
| 7,086,608 B2 | 8/2006 | Perkins ..................... 239/22.17 |
| 7,097,117 B2 | 8/2006 | Zur et al. | |
| 7,100,842 B2 | 9/2006 | Meyer et al. ................. 239/214 |
| 7,108,204 B2 | 9/2006 | Johnson | |
| 7,111,796 B2 | 9/2006 | Olson ......................... 239/452 |
| 7,143,957 B2 | 12/2006 | Nelson ..................... 239/222.21 |
| 7,159,795 B2 | 1/2007 | Sesser et al. ................. 239/203 |
| 7,198,456 B2 | 4/2007 | Kolle et al. ..................... 415/82 |
| 7,201,238 B2 | 4/2007 | Marvin et al. | |
| 7,232,082 B2 | 6/2007 | Kah, Jr. ........................ 239/1 |
| 7,240,860 B2 | 7/2007 | Griend | |
| 7,287,710 B1 | 10/2007 | Nelson et al. ............. 239/222.17 |
| 7,299,999 B2 | 11/2007 | Walker ......................... 239/252 |
| 7,303,148 B2 | 12/2007 | Campbell et al. | |
| RE40,440 E | 7/2008 | Sesser ..................... 239/222.11 |
| 7,395,977 B2 | 7/2008 | Pinch et al. .............. 239/222.21 |
| 7,458,527 B2 | 12/2008 | Lutzki ........................ 239/230 |
| 7,487,924 B2 | 2/2009 | Johnson | |
| 7,562,833 B2 | 7/2009 | Perkins et al. ........... 239/222.17 |
| 7,584,904 B2 | 9/2009 | Townsend ................ 239/222.17 |
| 7,584,906 B2 | 9/2009 | Lev ............................. 239/382 |
| 7,611,077 B2 | 11/2009 | Sesser et al. .............. 239/222.11 |
| 7,624,935 B2 | 12/2009 | Nelson et al. ................. 239/252 |
| 7,635,096 B2 | 12/2009 | Wright et al. | |
| 7,717,361 B2 | 5/2010 | Nelson et al. ............. 239/222.17 |
| 7,770,821 B2 | 8/2010 | Pinch ...................... 239/222.21 |
| 7,780,093 B2 | 8/2010 | Johnson | |
| 7,789,323 B2 | 9/2010 | Nelson et al. ............. 239/222.17 |
| 7,798,431 B2 | 9/2010 | Eader | |
| 7,832,659 B1 | 11/2010 | Collins | |
| 7,954,731 B2 | 6/2011 | Antonucci et al. ........... 239/230 |
| 7,980,488 B2 | 7/2011 | Tonsend ................... 239/222.17 |
| RE42,596 E | 8/2011 | Sesser ............................ 239/11 |
| 8,006,919 B2 | 8/2011 | Renquist et al. | |
| 8,016,210 B2 | 9/2011 | Wright | |
| 8,074,897 B2 | 12/2011 | Hunnicutt | |
| 8,104,963 B2 | 1/2012 | Hibi et al. | |
| 8,177,148 B1 | 5/2012 | Renquist et al. | |
| 8,220,724 B2 | 7/2012 | Wright | |
| 8,282,022 B2 | 10/2012 | Porter | |
| 8,328,112 B2 | 12/2012 | Johnson | |
| 8,336,788 B2 | 12/2012 | Perkins et al. ................ 239/122 |
| 8,366,321 B2 | 2/2013 | Yazawa et al. | |
| 8,366,322 B2 | 2/2013 | Hibi et al. | |
| 8,371,392 B2 | 2/2013 | Ba-abbad | |
| 8,434,695 B2 | 5/2013 | Barzuza | |
| 8,434,696 B2 | 5/2013 | Wright | |
| 8,480,013 B2 | 7/2013 | Causby et al. | |
| 8,511,586 B2 | 8/2013 | Einav et al. | |
| 8,540,171 B2 | 9/2013 | Renquist et al. | |
| 8,544,768 B2 | 10/2013 | Wright | |
| 8,567,691 B2 | 10/2013 | Townsend | |
| 8,567,696 B2 | 10/2013 | Walker et al. | |
| 8,567,699 B2 | 10/2013 | Sesser et al. | |
| 8,579,210 B2 | 11/2013 | Huang | |
| 8,590,808 B2 | 11/2013 | Roach | |
| 8,646,734 B2 | 2/2014 | Vered Shaol et al. | |
| 8,651,400 B2 | 2/2014 | Walker et al. | |
| 8,668,153 B2 | 3/2014 | Johnson | |
| 8,668,155 B2 | 3/2014 | Wright | |
| 8,672,236 B2 | 3/2014 | Gal et al. | |
| 8,672,242 B2 | 3/2014 | Hunnicutt et al. | |
| 8,684,322 B2 | 4/2014 | Park | |
| 8,695,900 B2 | 4/2014 | Hunnicutt et al. | |
| 8,727,238 B1 | 5/2014 | Clark et al. | |
| 8,746,590 B1 | 6/2014 | Collins | |
| 8,783,582 B2 | 7/2014 | Robertson et al. | |
| 8,789,768 B2 | 7/2014 | Hunnicutt et al. | |
| RE45,263 E | 12/2014 | Sesser | |
| 8,899,497 B2 | 12/2014 | Gorny | |
| 8,925,837 B2 | 1/2015 | Walker et al. | |
| 8,931,571 B2 | 1/2015 | Sarkisyan et al. | |
| 8,991,724 B2 | 3/2015 | Sesser et al. | |
| 8,991,726 B2 | 3/2015 | Kah, Jr. et al. | |
| 8,991,730 B2 | 3/2015 | Kah, Jr. et al. | |
| 8,998,109 B2 | 4/2015 | Katzman et al. | |
| 9,079,202 B2 | 7/2015 | Walker | |
| 2002/0139868 A1 | 10/2002 | Sesser et al. ................. 239/457 |
| 2002/0162901 A1 | 11/2002 | Hunter et al. ................ 239/240 |
| 2002/0166900 A1 | 11/2002 | Sesser et al. ................. 239/204 |
| 2004/0046047 A1 | 3/2004 | Townsend ..................... 239/242 |
| 2004/0046055 A1 | 3/2004 | Townsend ..................... 239/463 |
| 2004/0050955 A1 | 3/2004 | Sesser et al. ................. 239/203 |
| 2004/0108391 A1 | 6/2004 | Onofrio | |
| 2004/0124266 A1 | 7/2004 | Pinch et al. ................... 239/380 |
| 2004/0164178 A1 | 8/2004 | Kah, Jr. ........................ 239/237 |
| 2004/0164179 A1 | 8/2004 | Corbett | |
| 2004/0195362 A1 | 10/2004 | Walker ......................... 239/252 |
| 2004/0227007 A1 | 11/2004 | Sesser et al. ................. 239/214 |
| 2005/0035211 A1 | 2/2005 | Perkins ........................... 239/59 |
| 2005/0120717 A1 | 6/2005 | Sprouse et al. | |
| 2005/0145394 A1 | 7/2005 | Wancho et al. ................ 169/37 |
| 2006/0006253 A1 | 1/2006 | Nelson ......................... 239/214 |
| 2006/0006254 A1 | 1/2006 | Meyer et al. .................. 239/214 |
| 2006/0038036 A1 | 2/2006 | Perkins .................... 239/222.17 |
| 2006/0054716 A1 | 3/2006 | Lutzki ........................... 239/246 |
| 2006/0065759 A1 | 3/2006 | Olson ............................ 239/200 |
| 2006/0108445 A1 | 5/2006 | Pinch et al. .............. 239/222.17 |
| 2007/0040045 A1 | 2/2007 | Cohen ...................... 239/222.17 |
| 2007/0095936 A1 | 5/2007 | Ungerecht | |
| 2007/0181711 A1 | 8/2007 | Sesser et al. ................. 239/204 |
| 2007/0246560 A1 | 10/2007 | Townsend ......................... 239/1 |
| 2008/0054093 A1 | 3/2008 | Nelson et al. ............ 239/222.21 |
| 2008/0054094 A1 | 3/2008 | Nelson et al. ............ 239/222.21 |
| 2008/0257982 A1 | 10/2008 | Kah et al. ................. 239/222.11 |
| 2008/0277489 A1 | 11/2008 | Townsend ......................... 239/7 |
| 2008/0277498 A1 | 11/2008 | Townsend ................ 239/222.17 |
| 2009/0078788 A1 | 3/2009 | Holmes ................... 239/222.17 |
| 2009/0159382 A1 | 6/2009 | Chemouni et al. | |
| 2009/0173803 A1 | 7/2009 | Kah, Jr. et al. ............... 239/210 |
| 2009/0188988 A1 | 7/2009 | Walker et al. | |
| 2009/0188991 A1 | 7/2009 | Russell et al. ................ 239/203 |
| 2009/0314859 A1 | 12/2009 | Causby et al. ................ 239/548 |
| 2009/0321537 A1 | 12/2009 | Nelson et al. ................ 239/252 |
| 2010/0006669 A1 | 1/2010 | Thompson | |
| 2010/0294851 A1 | 11/2010 | Johnson | |
| 2011/0024523 A1 | 2/2011 | Sesser et al. ................. 239/205 |
| 2011/0024809 A1 | 2/2011 | Kim | |
| 2011/0031332 A1 | 2/2011 | Sesser et al. ............. 239/222.17 |
| 2011/0114755 A1 | 5/2011 | Katzman et al. .......... 239/222.17 |
| 2011/0198411 A1 | 8/2011 | Antonucci et al. | |
| 2011/0248093 A1 | 10/2011 | Kim | |
| 2012/0153051 A1 | 6/2012 | Kah, Jr. et al. ............. 239/533.1 |
| 2012/0205467 A1 | 8/2012 | Renquist et al. | |
| 2012/0273592 A1 | 11/2012 | Zhang .......................... 239/214 |

(56) References Cited

U.S. PATENT DOCUMENTS

| | | |
|---|---|---|
| 2012/0318888 A1 | 12/2012 | Gandin |
| 2013/0043327 A1 | 2/2013 | Barmoav et al. |
| 2013/0082119 A1 | 4/2013 | Sesser et al. ............... 239/242 |
| 2013/0105596 A1 | 5/2013 | Kah, III |
| 2013/0126635 A1 | 5/2013 | Klinefelter et al. |
| 2013/0140379 A1 | 6/2013 | Boyles |
| 2013/0199372 A1 | 8/2013 | Nock et al. |
| 2013/0228636 A1 | 9/2013 | Sanders et al. |
| 2013/0327846 A1 | 12/2013 | Sesser et al. |
| 2013/0334340 A1 | 12/2013 | Walker et al. |
| 2014/0008459 A1 | 1/2014 | Wright |
| 2014/0027526 A1 | 1/2014 | Walker |
| 2014/0110501 A1 | 4/2014 | Lawyer et al. |
| 2014/0224900 A1 | 8/2014 | Kim et al. |
| 2014/0246513 A1 | 9/2014 | Terrell |
| 2014/0263732 A1 | 9/2014 | Heren et al. |
| 2014/0263734 A1 | 9/2014 | Kim |
| 2014/0312143 A1 | 10/2014 | Duffin et al. |
| 2014/0339334 A1 | 11/2014 | Kah, Jr. et al. |
| 2014/0353402 A1 | 12/2014 | Kah, Jr. |
| 2015/0028128 A1 | 1/2015 | Kah, Jr. |
| 2015/0102126 A1 | 4/2015 | Russell et al. |
| 2015/0165455 A1 | 6/2015 | Kah |

FOREIGN PATENT DOCUMENTS

| | | | |
|---|---|---|---|
| AU | 2012100324 A4 | 5/2012 | ............... B05B 3/02 |
| WO | 2010010535 | 1/2010 | |

OTHER PUBLICATIONS

Toro Australia Pty. Ltd., Toro Irrigation: Waterbird, from www.toro.com.au, accessed prior to Feb. 8, 2013, 3 pages.

U.S. Appl. No. 13/763,487, titled "Rotary Sprinkler," filed Feb. 8, 2013, 72 pages.

U.S. Appl. No. 14/175,828, titled "Sprinkler With Brake Assembly," Feb. 7, 2014, 121 pages.

\* cited by examiner

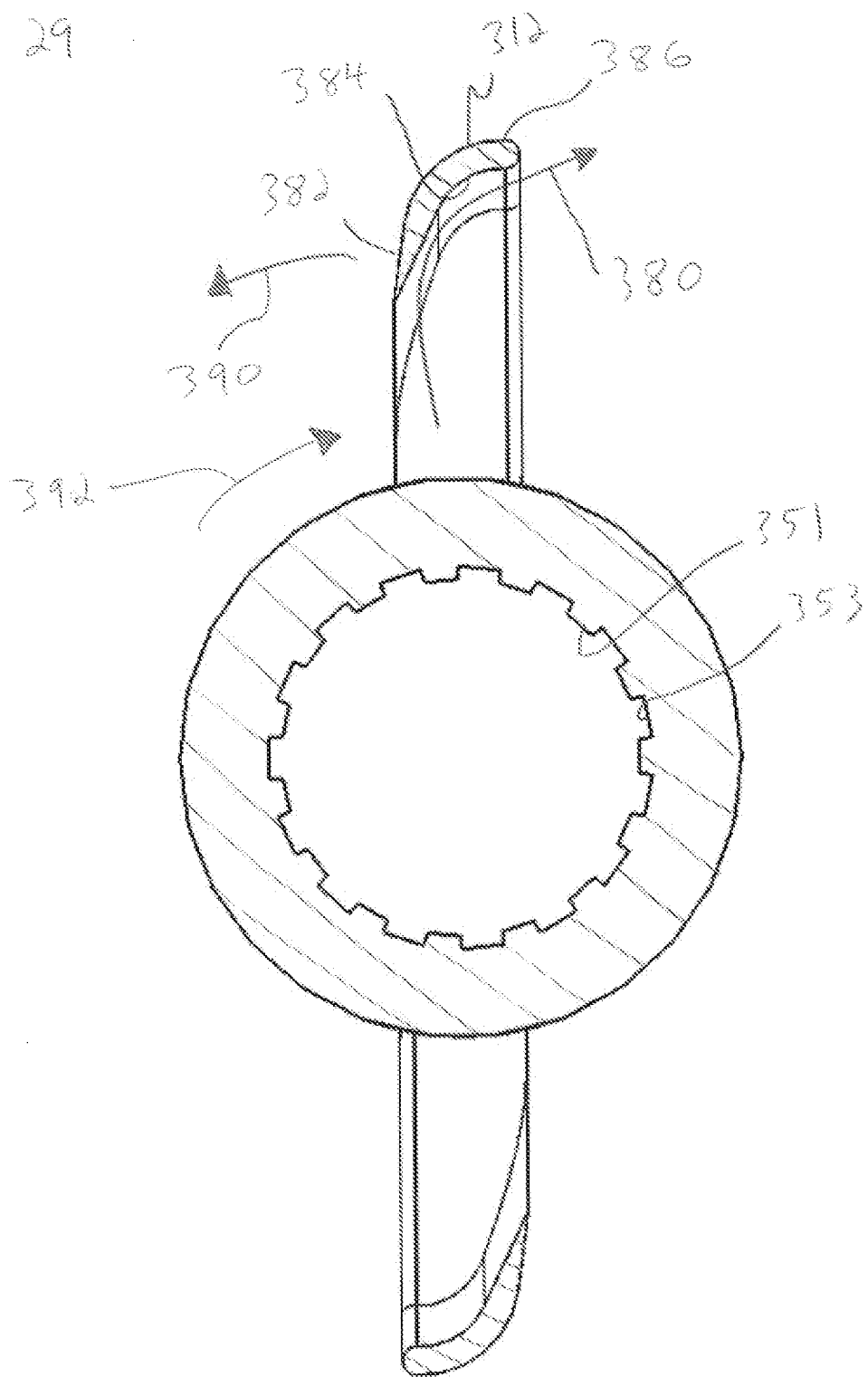

SECTION A-A

SECTION B-B

SECTION C-C

SPRINKLER WITH BRAKE ASSEMBLY

FIELD

This invention relates to irrigation sprinklers and, more particularly, to rotary sprinklers.

BACKGROUND

There are many different types of sprinkler constructions used for irrigation purposes, including impact or impulse drive sprinklers, motor driven sprinklers, and rotating reaction drive sprinklers. Included in the category of rotating reaction drive sprinklers are a species of sprinklers known as spinner or a rotary sprinklers which are often used in the irrigation of agricultural crops and orchards. Typically, such spinner type sprinklers comprise a stationary support structure or frame which is adapted to be coupled with a supply of pressurized water, and a rotatable deflector supported by the frame for rotation about a generally vertical axis. Most rotary type sprinklers employ either a rotating reaction drive nozzle or a fixed nozzle which ejects a stream of water vertically onto a rotating deflector. The deflector redirects the stream into a generally horizontal spray and the deflector is rotated by a reaction force created by the impinging stream from the fixed nozzle.

One shortcoming that has been encountered with rotary-type sprinklers is that due to a very high rate of rotation of the rotary devices, the distance the water is thrown from the sprinkler may be substantially reduced. This has created a need to control or regulate the rotational speed of the deflector and thereby also regulate the speed at which the water streams are swept over the surrounding terrain area. A relatively slow deflector rotational speed is desired to maximize throw-distance, and therefore a variety of brake devices have been developed to accomplish this end.

In one approach, a viscous brake device is used to control rotation of the deflector. The viscous brake device utilizes drag produced by rotation of a brake rotor within a viscous fluid. While suitable for some sprinklers, the viscous brake device may not provide constant rotation speed when the ambient temperature or supply pressure changes.

Another shortcoming encountered with rotary-type sprinklers is that the sprinklers have frame supports that interfere with the water stream after it has been redirected by the deflector. There have been a number of attempts to minimize this interference including utilizing supports with different cross-sectional shapes. However, even with these approaches, the water stream still impacts the supports every time the deflector completes a rotation. This produces a reduced, but still present, shadow in the spray pattern of the sprinkler.

Yet another shortcoming of some prior rotary-type sprinklers is the serviceability of the sprinkler. Rotary-type sprinklers often have two typical types of failures that require the sprinkler to be removed from the water supply in order to be fixed. The first type of failure occurs when the nozzle becomes plugged with debris from the water supply. For some sprinklers, the nozzle is installed from the underside of the sprinkler such that the sprinkler needs to be removed from the water supply in order to remove and clean the nozzle. The second type of failure occurs when the deflector of the sprinkler stops rotating or spins out of control. In this case, the braking system has failed and the entire sprinkler will be replaced.

BRIEF DESCRIPTION OF THE DRAWINGS

FIG. 29 is a cross-sectional view taken along line 29-29 of FIG. 28 showing the cross-sectional shape of arms of the frame;

FIG. 30 is a perspective view of another rotary sprinkler;

DETAILED DESCRIPTION OF THE PREFERRED EMBODIMENTS

Figure 1:
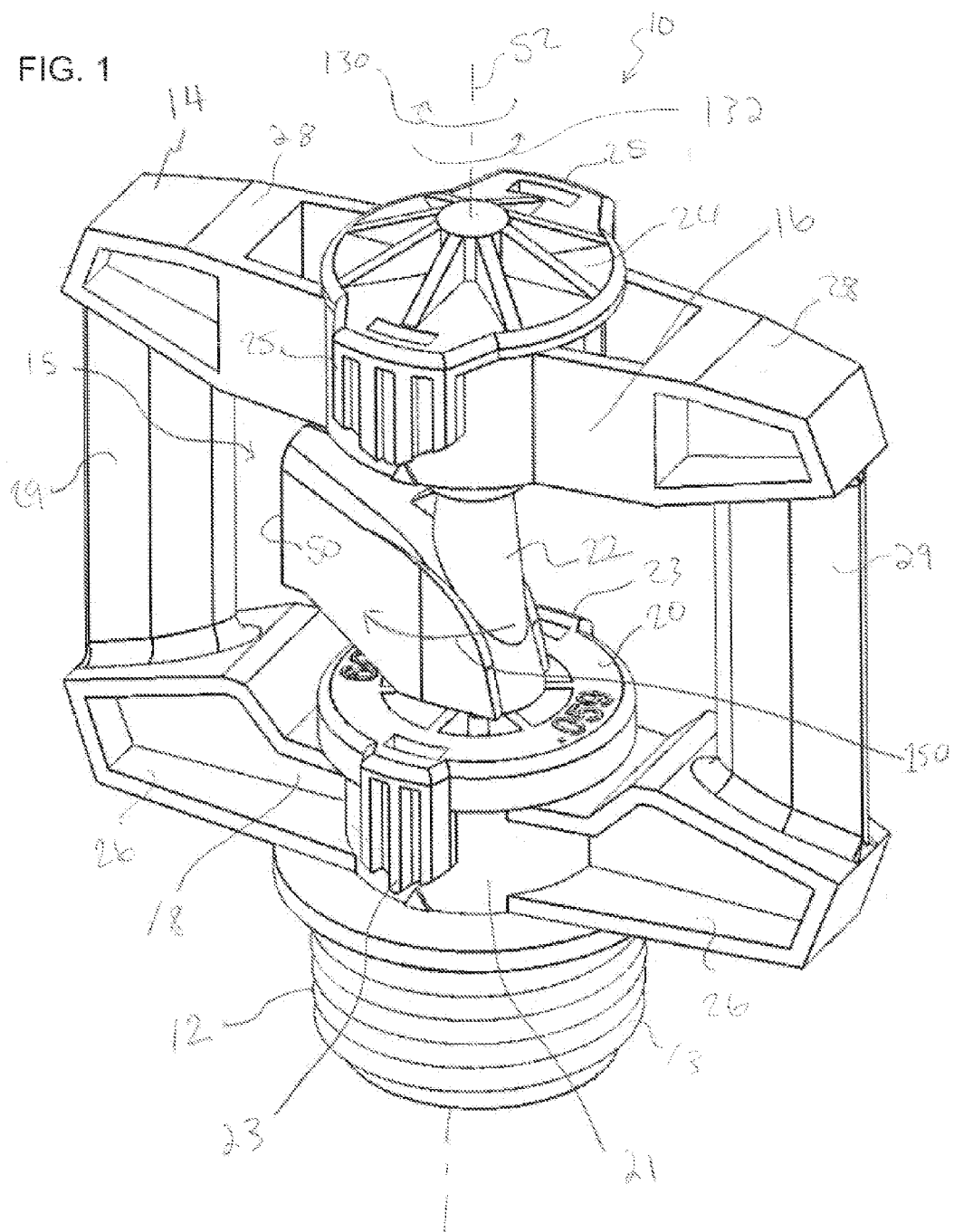
FIG. 1 is a perspective view of a rotary sprinkler.

With reference to FIGS. 1-5, an improved rotary sprinkler 10 is provided having a fitting 12 for connecting to a standpipe or other fluid supply conduit, such as by using threads 13. The sprinkler 10 has a frame 14 with an upper portion 16 and a lower portion 18 connected to the fitting 12. A spinner assembly 15 is connected to the frame upper portion 16 and a nozzle 20 is removably connected to a socket 21 defined by the frame lower portion 18. In one approach, the nozzle 20 is secured to the frame 14 by a pair of releasable connections 23 and can be replaced with another nozzle 20 having flow characteristics desired for a particular application. Fluid travels through the fitting 12, into the nozzle 20, and is discharged from the nozzle 20 as a jet. The spinner assembly 15 includes a deflector 22 disposed above the nozzle 20 which receives the jet of fluid from the nozzle 20. The spinner assembly 15 further includes a brake device 24 removably coupled to the frame upper portion 16 and configured to limit the rate of rotation of the deflector 22. The brake device 24 is secured to the frame 14 with a pair of releasable connections 25. It should be noted that although the sprinkler 10 is illustrated as being disposed in an upright position, the sprinkler can also be mounted in, for example, an inverted position.

Figure 5:
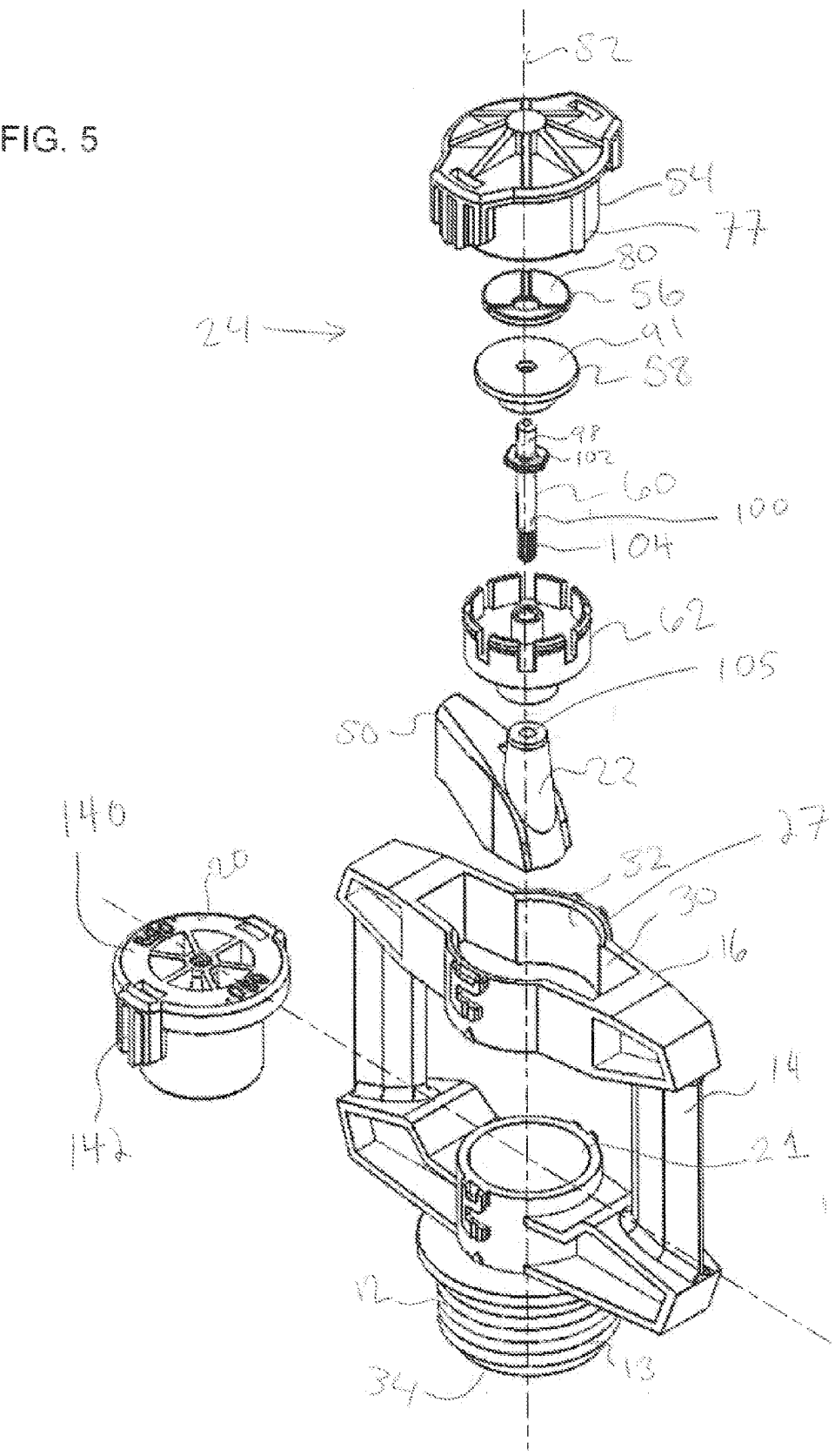
FIG. 5 is an exploded perspective view of the rotary sprinkler of FIG. 1.

The frame 14 comprises a pair of horizontal lower support members 26 extending radially from opposite sides of the nozzle socket 21. A pair of upper support members 28 are attached in a similar manner to the upper portion 16 as those attached to the lower portion 18. The support members 26 outwardly terminate at arms or supports 29 of the frame 14. The upper portion 16 has a yoke 27 with opening 30 defined by a wall 32 of the yoke 27, as shown in FIG. 5. The brake device 24 is disposed within the opening 30 and is supported by the support members 28. Preferably, the upper and lower portions 16 and 18, members 26 and 28, and supports 29 forming the frame 14 are formed as a single unit, such as by molding the frame 14 from a suitable plastic material. Although the frame 14 is illustrated with two supports 29, the frame 14 may alternatively have one, three, four, or more supports 29 as desired.

Figure 6:
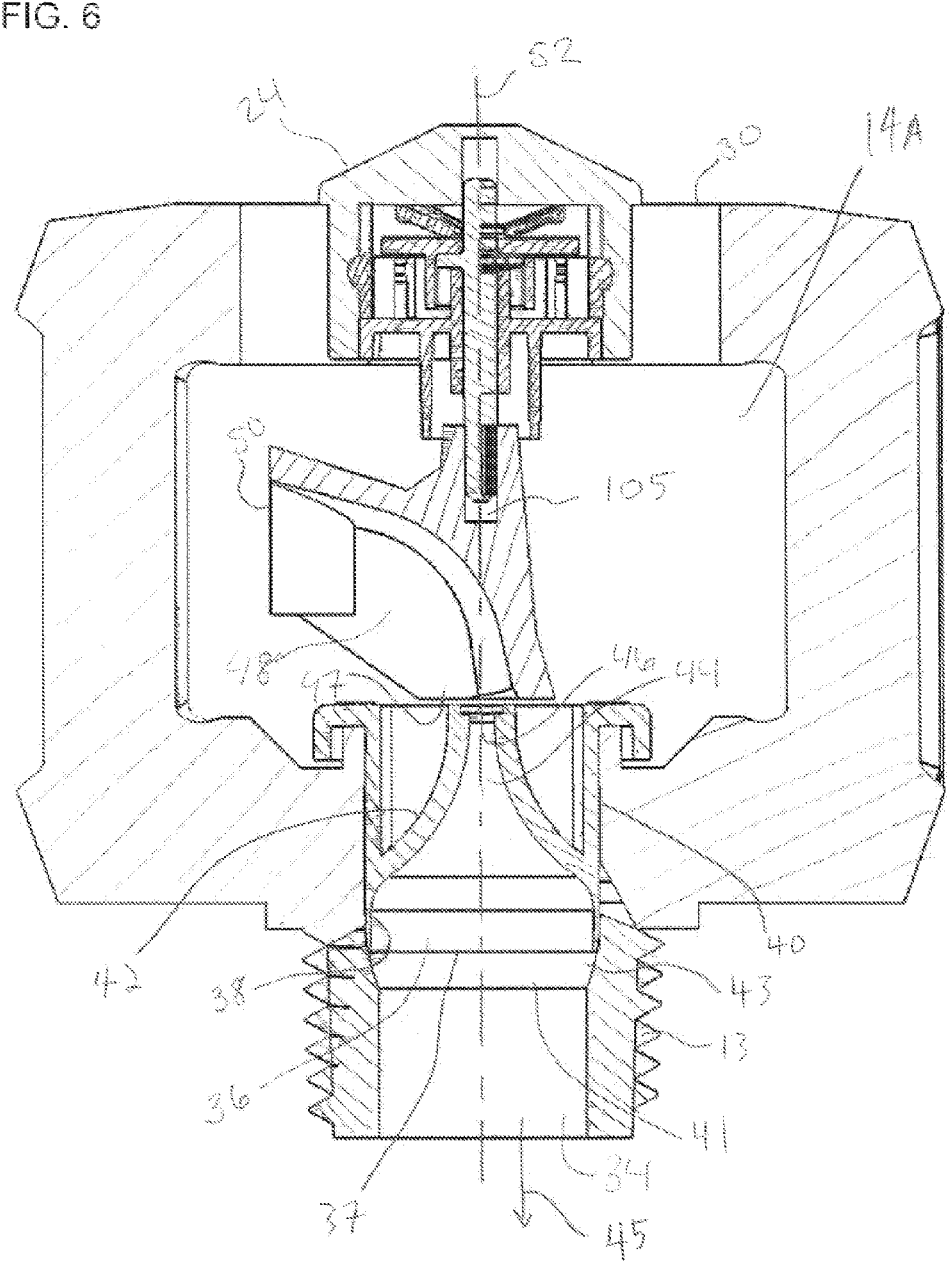
FIG. 6 is a cross-sectional view taken along line 6-6 in FIG. 3.

Referring to FIGS. 5 and 6, the fitting 12 defines an inlet 34 through which fluid flows into the sprinkler 10. The inlet 34 leads to an opening 36 of the nozzle 20 defined by a nozzle inner wall 38. The nozzle inner wall 38 has a tapered configuration that decreases in thickness until reaching an upstream lip 37 of the nozzle 20. The fitting 12 includes a cup portion 41 with a tapered surface 43 that is inclined relative to the longitudinal axis 52 of the sprinkler 10. During assembly, the upstream lip 37 of the nozzle 20 is advanced in direction 45 into nozzle socket 21 until the upstream lip 37 engages the tapered surface 43 (see FIGS. 5 and 6). This engagement causes the fitting tapered surface 43 to slightly compress the upstream lip 37, which provides a positive leak-proof seal between the nozzle 20 and the fitting 12.

The nozzle 20 has a nozzle body 40 that houses a nozzle portion 42, defining a fluid passageway 44 through the nozzle portion 42, and terminating at a nozzle exit 46. The nozzle portion 42 increases the speed of the fluid as it travels through the passageway 44. The fluid leaves the nozzle 20 through the exit 46 as a jet and travels into an inlet opening 47 of the deflector 22 and along a channel 48 of the deflector 22, before exiting the deflector 22 through a deflector outlet opening 50. The exiting fluid causes the deflector 22 to rotate about a longitudinal axis 52 of the sprinkler 10 and disperses the fluid outward from the sprinkler 10, as discussed in greater detail below.

Referring to FIGS. 5-15, the brake device 24 connects the deflector 22 to the frame 14 and permits rotational and vertical movement of the deflector 22 within an opening 14a of the frame 14. The brake device 24 utilizes friction between surfaces to restrict and control the rate of rotation of the deflector 22. More specifically, the brake device 24 is formed as a self-contained module which is releasably and removably attached to the frame 14 so that the brake device 24 can be easily replaced. The brake device 24 is top serviceable and can be removed from above the sprinkler 10 while the frame 14 and lower end fitting 12 remain connected to the fluid supply. This simplifies maintenance of the sprinkler 10 and permits the brake device 24 to be easily removed from the frame 14, such as if the brake device 24 locks up and prevents rotation of the deflector 22 or if the brake device fails and permits the deflector 22 to spin out of control. Another advantage provided by the brake device 24 is that the deflector 22 can be easily replaced or serviced by removing the brake device 24 from the frame 14. Further, the removable brake device 24 provides access to the nozzle 20 for removal and maintenance, such as cleaning the nozzle 20.

Figure 3:
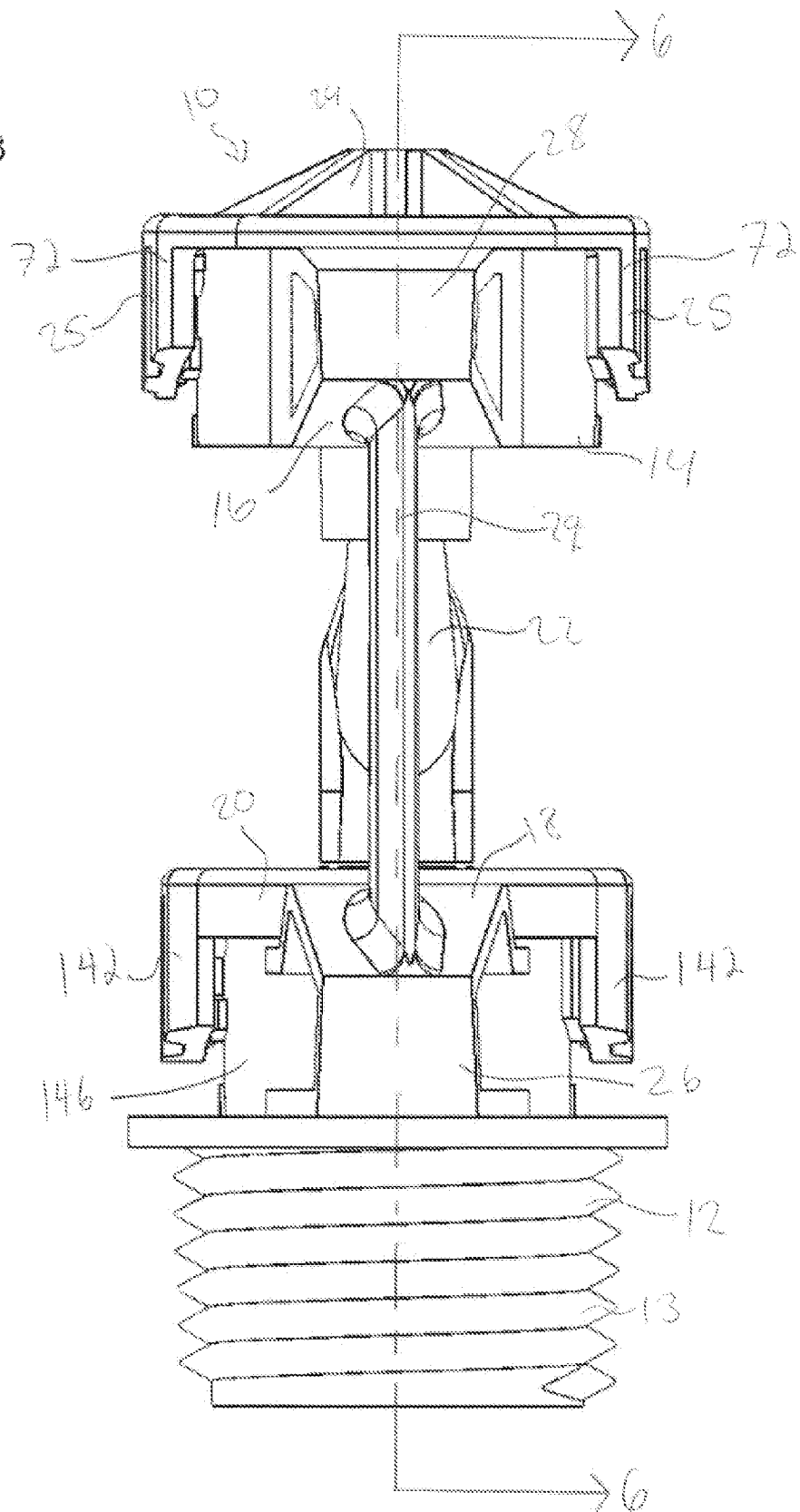
FIG. 3 is a side elevational view of the rotary sprinkler of FIG. 1.
Figure 4:
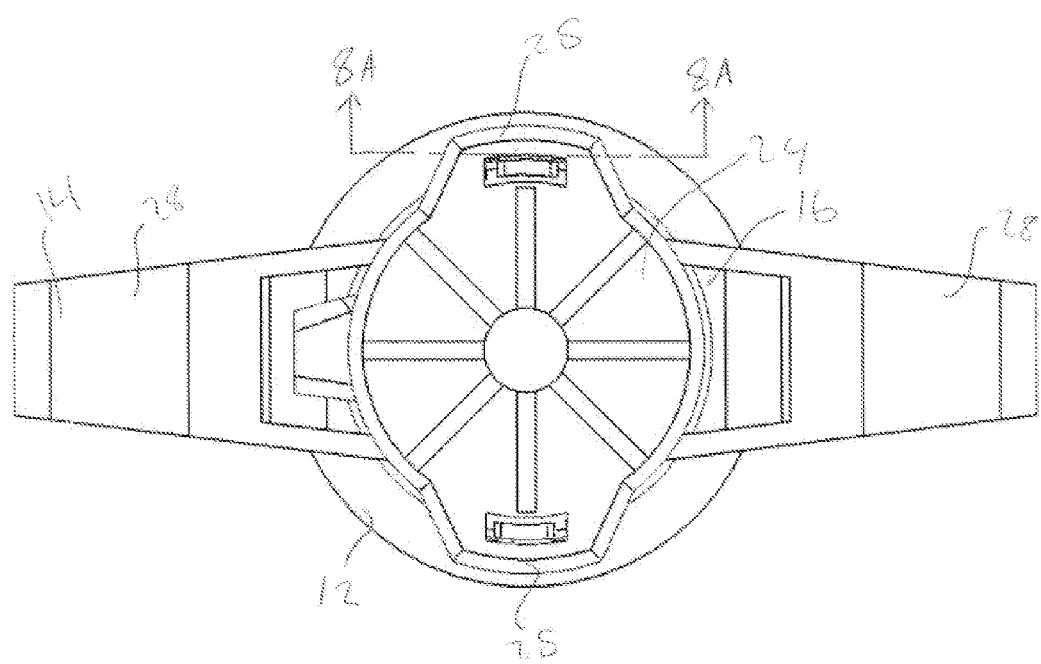
FIG. 4 is a top plan view of the rotary sprinkler of FIG. 1.
Figure 7:
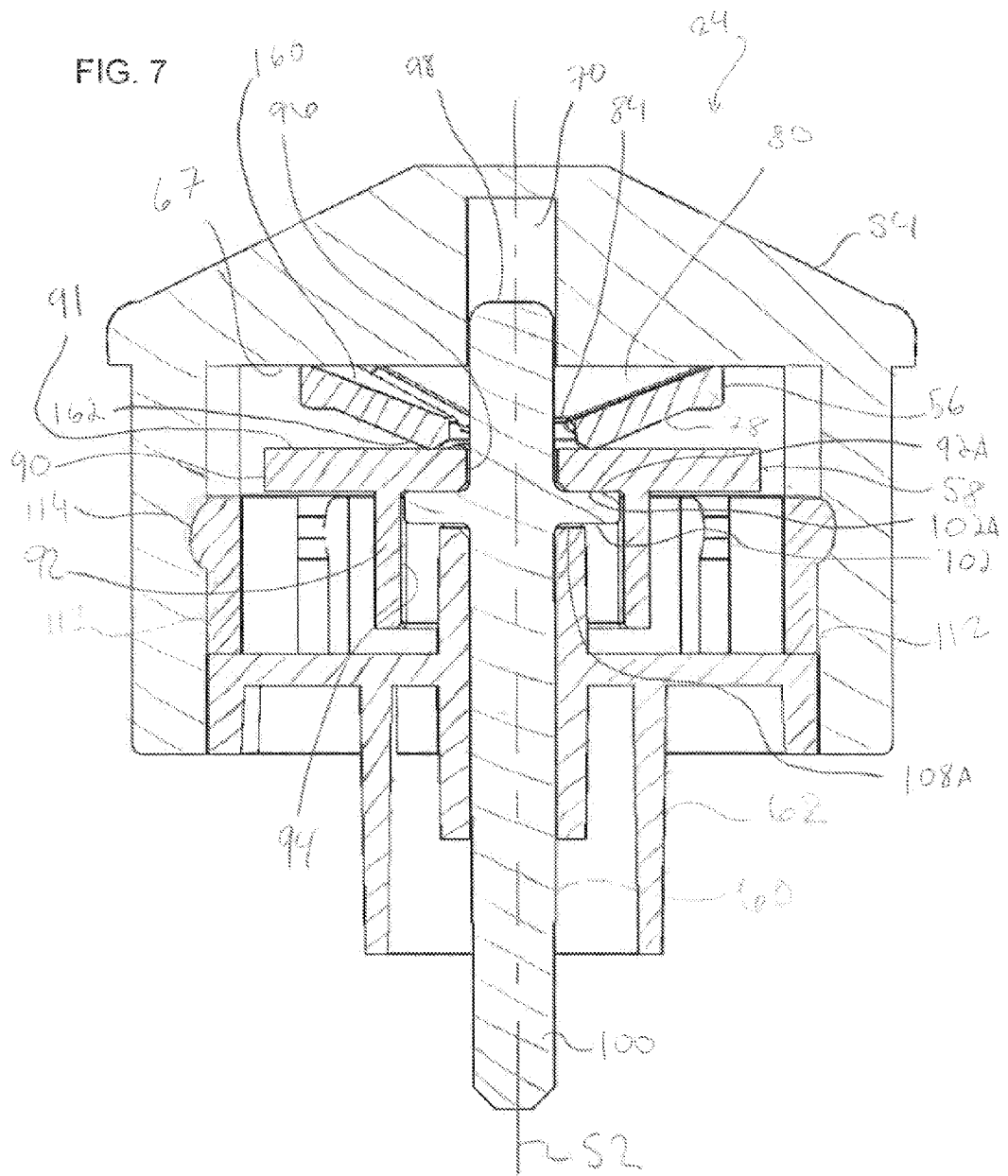
FIG. 7 is a partial enlarged view of FIG. 6 showing a brake device of the sprinkler.
Figure 8:
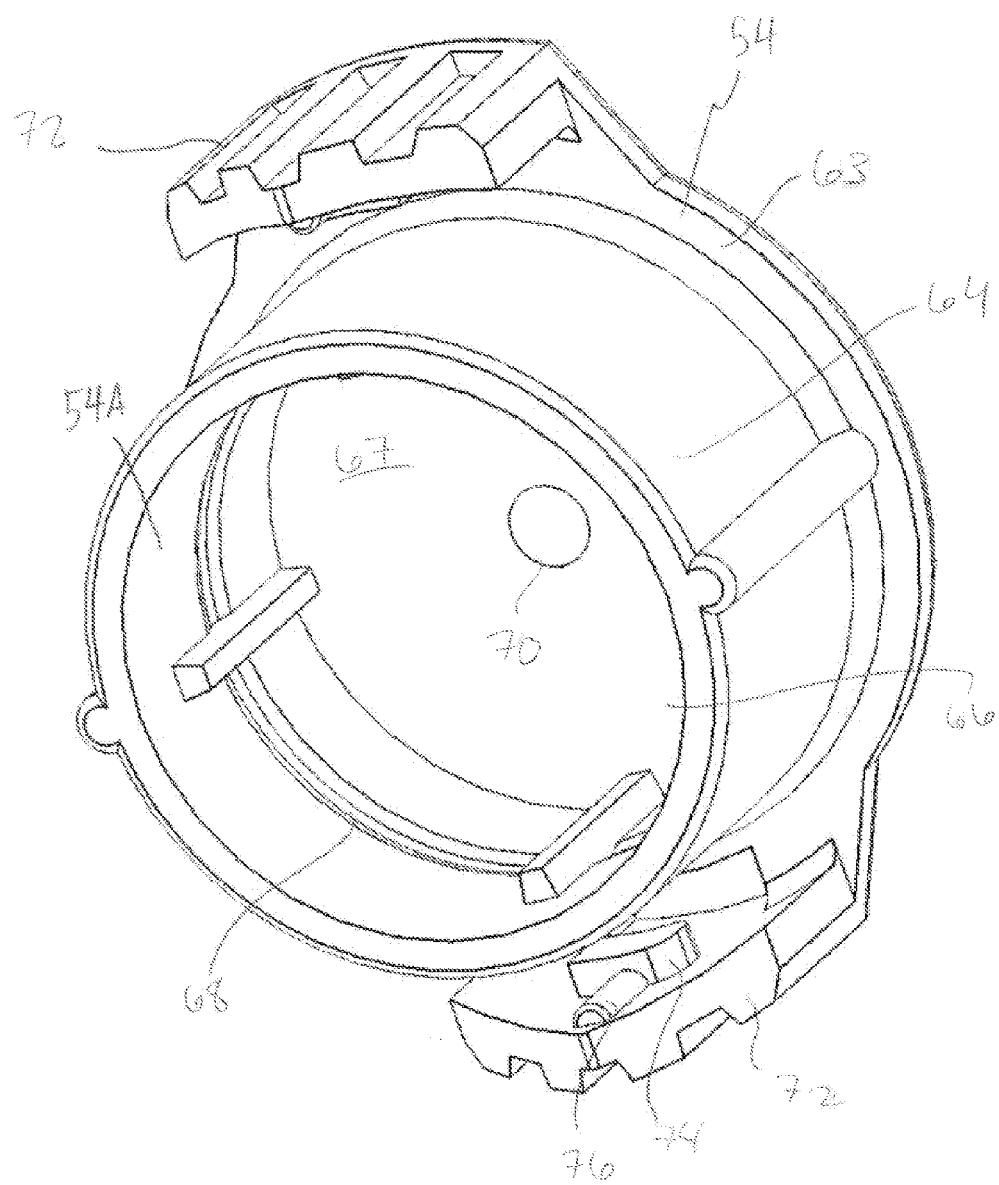
FIG. 8 is a perspective view of a cap of the brake device of FIG. 7.
Figure 8A:
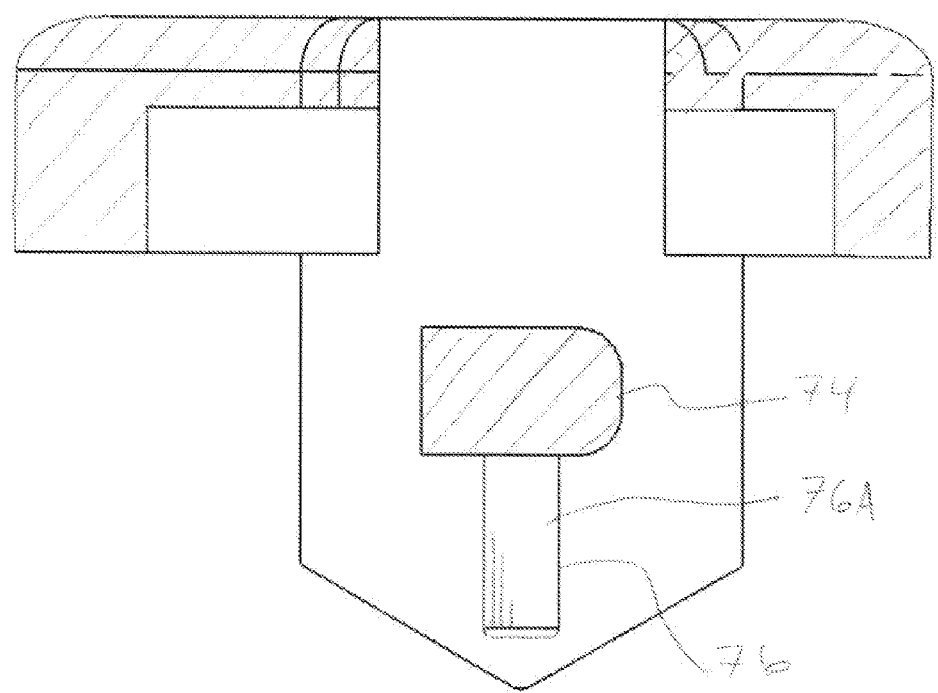
FIG. 8A is a cross-sectional view taken along line 8A-8A in FIG. 4.
Figure 19:
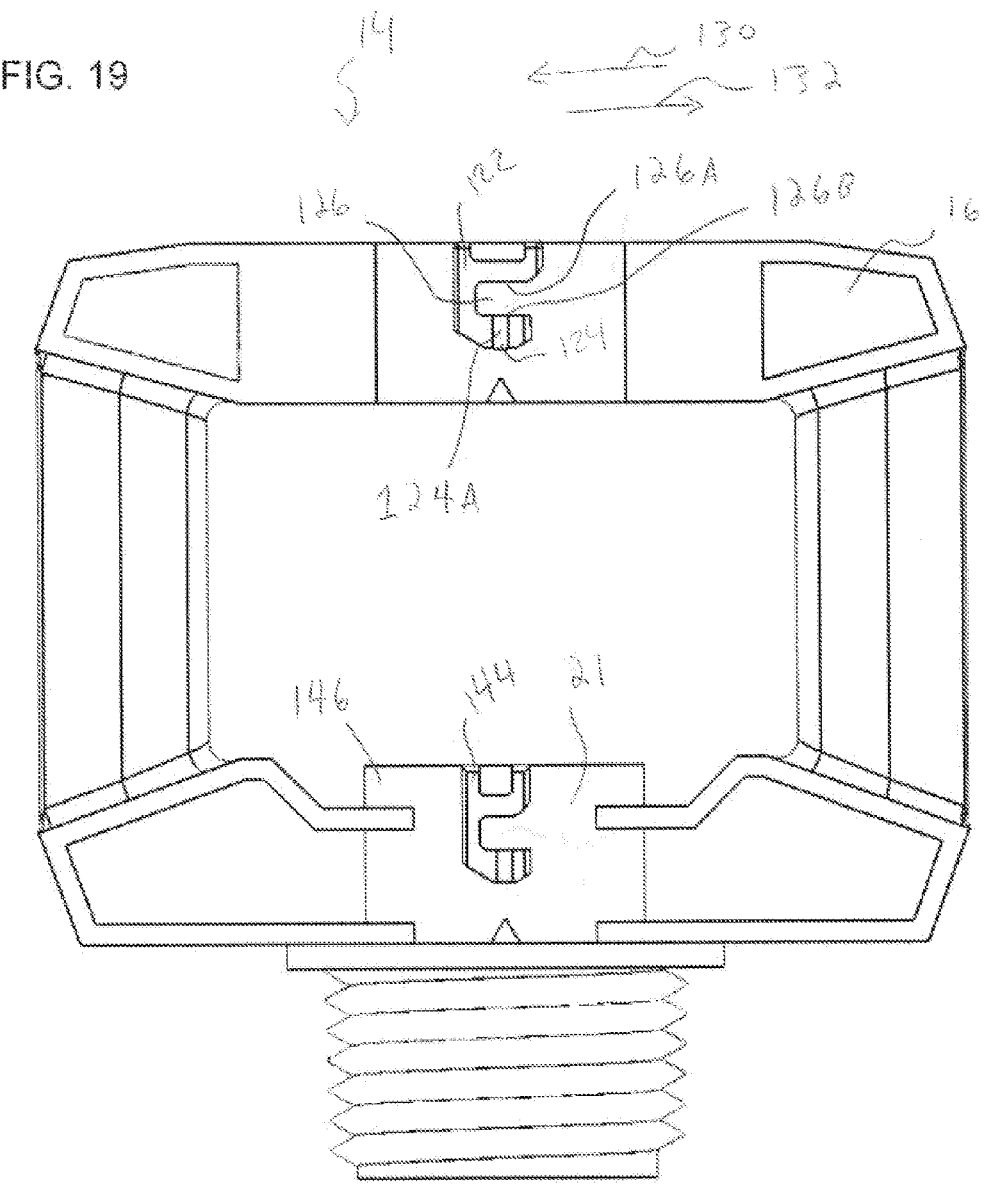
FIG. 19 is a front elevational view of a sprinkler frame of the rotary sprinkler of FIG. 1.
Figure 20:
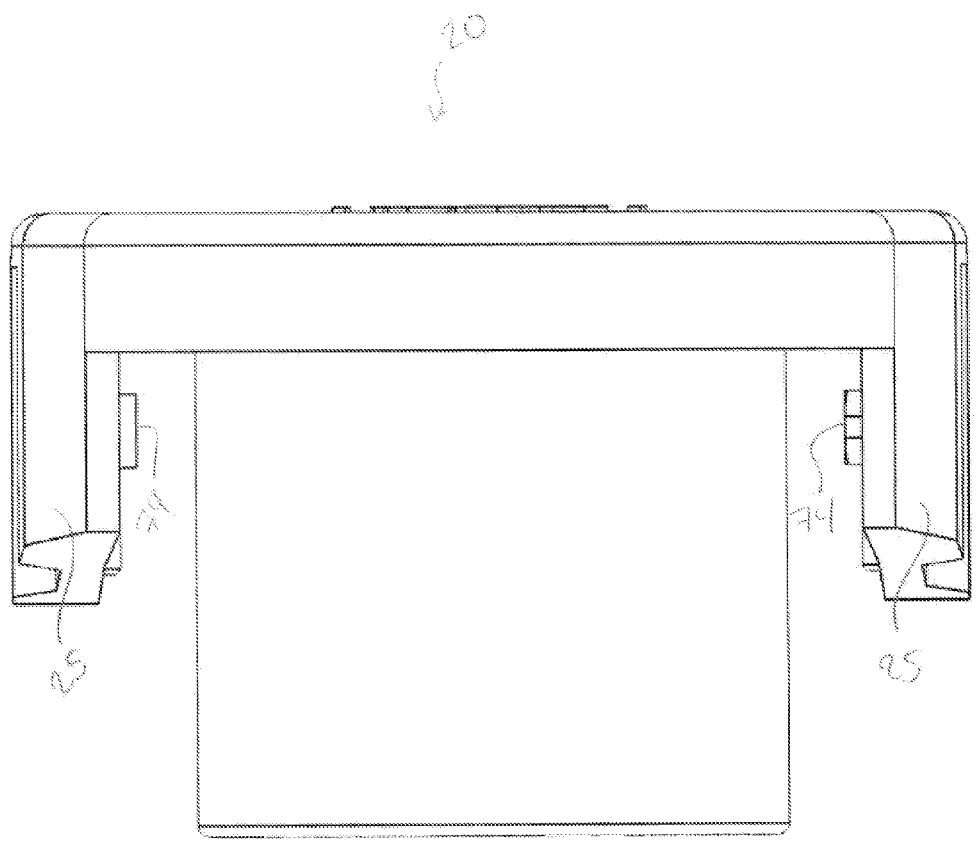
FIG. 20 is a side elevational view of a nozzle of the rotary sprinkler of FIG. 1.

The brake device 24 includes a housing cap 54, a brake member 56, a brake plate 58, a brake shaft 60, and a base member 62, as shown in FIGS. 5 and 7. The cap 54 has a body 63 with a sleeve 64 extending longitudinally downward and defining a recess 66 for receiving components of the brake device 24, shown in FIGS. 7-8a. Inside of the recess 66, the cap 54 has a lower cap surface 67, a groove 68, and a blind bore 70. The brake device 24 and frame upper portion 16 have interlocking portions that permit the brake device 24 to be releasably secured to the upper portion 16. In one form, the interlocking portions form a bayonet-style connection between the brake device 24 and the frame upper portion 16. The interlocking portions include a pair tabs 72 depending from opposite sides of the body 63, as shown in FIGS. 3 and 8. The tabs 72 have a protrusion 74 and a detent 76 that engage corresponding features of the frame 14. Referring to FIGS. 19 and 20, a pair of coupling members 122 are disposed on opposite sides of the upper portion 16 of the frame 14. Each coupling member 122 has a recess 124 and an opening 126 adapted to frictionally engage the detent 76 and protrusion 74, respectively, of the brake device 24 and restrict turning and longitudinal movement of the brake device 24 relative to the frame upper portion 16.

To connect the brake device 24 to the frame 14, a distal end 77 of the cap 54 (see FIG. 5) is advanced into the frame opening 30, with the cap 54 rotationally positioned about the axis 52 so the depending tabs 25 do not pass over the coupling members 122, but are instead positioned laterally to the coupling members 122. When the protrusions 74 of the brake device 24 are axially aligned with the openings 126 of the coupling members 122, the cap 54 and tabs 72 thereof are turned in direction 130 to a locked position, which causes the protrusion 74 to slide into the opening 126 (see FIGS. 1 and 19). The detents 76 cam over the coupling members 122, which causes the tabs 72 to bias outward, and engage the recesses 124. The biasing action produces a reaction force that maintains the detents 76 in the recesses 124 against unintentional dislodgement. The opening 126 has walls 126A, 126B that engage the protrusion 74 and restrict longitudinal movement of the brake device 24 along the axis 52. Further, the brake device detents 76 have convex outer surfaces 76A that engage complimentary concave surfaces 124A of the frame recesses 124 (see FIGS. 8A and 19). The engagement between the detents 76 and the recesses 124 restricts rotary movement of the tabs 72 away from the locked position. The cap 54, restricted from rotary or longitudinal displacement, is thereby releasably secured to the frame 14. To disengage the brake device 24 from the frame 14, the cap 54 is turned in direction 132 which unseats the detents 76 from the recesses 124 and disengages the brake device tabs 72 from the frame coupling members 122 (see FIG. 1).

With reference to FIGS. 5 and 19, the nozzle 20 is releasably coupled to the lower portion 18 of the frame 14 with interlocking portions of the nozzle 20 and the frame nozzle socket 21. In one form, the interlocking portions of the nozzle 20 and the nozzle socket 21 are similar to the releasable connection of the brake device 24 to the frame upper portion 14. Further, the nozzle 20 is connected to the nozzle socket 21 in a manner similar to the process of installing the brake device 24 on the frame upper portion 16. The nozzle 20 has a collar 140 with depending tabs 142 configured to engage coupling members 144 disposed on an outer wall 146 of the nozzle socket 21 (see FIGS. 2 and 19).

Figure 2:
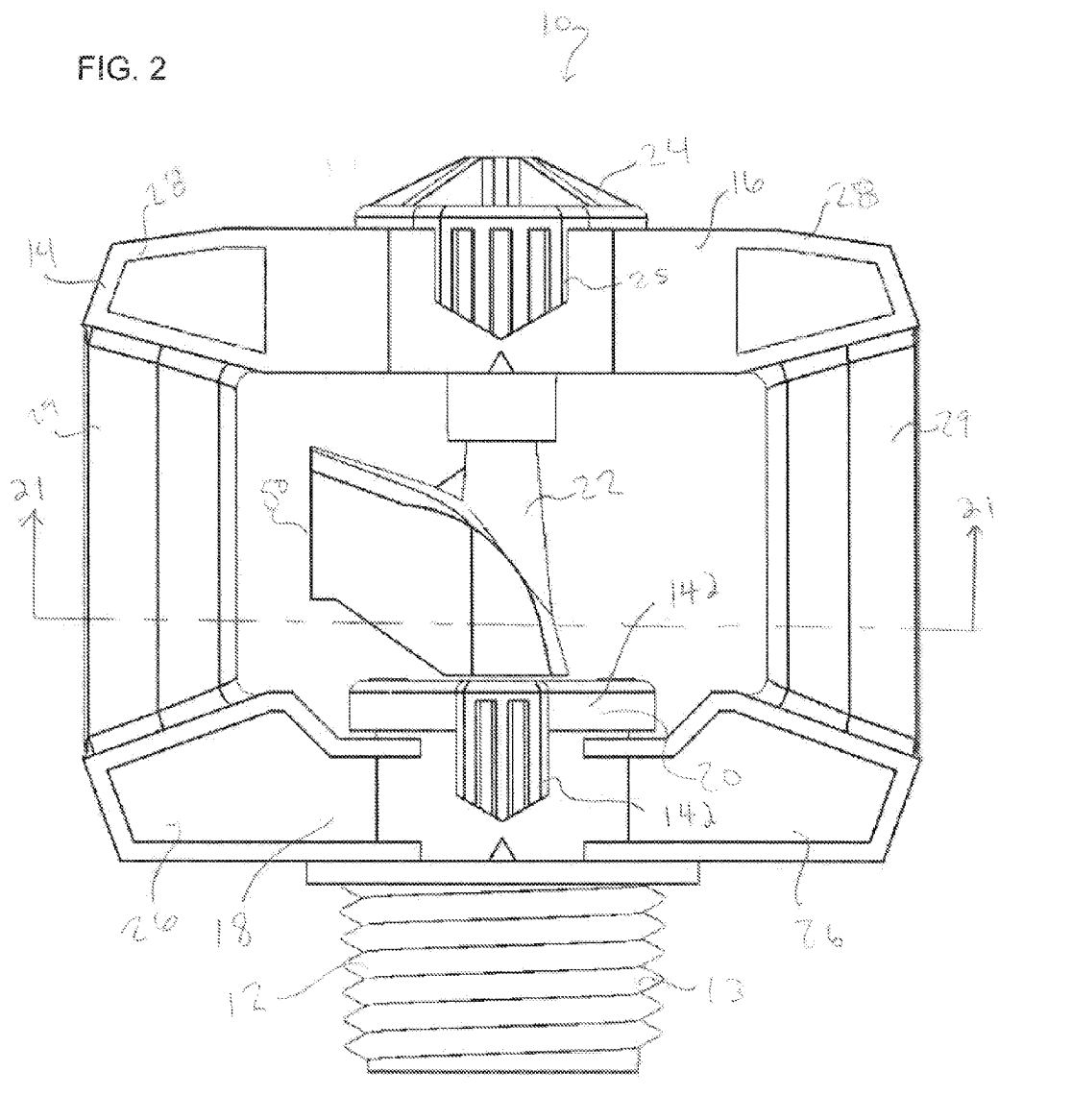
FIG. 2 is a front elevational view of the rotary sprinkler of FIG. 1.

As shown in FIG. 2, the deflector 22 is positioned above and closely approximate the nozzle 20. The brake device 24 may be disengaged from the frame 14 (and the deflector 22 moved upwardly) to provide clearance for removal of the nozzle 20. It will be appreciated that both the brake device 24 and the nozzle 20 are top serviceable and can be removed without removing the sprinkler 10 from the fluid supply.

The sprinkler 10 may be configured to receive different nozzles 20 having a variety of flow rates, etc. for a desired sprinkler application. The collar 140 and depending tabs 142 are similar between the different nozzles 20 in order to permit the different nozzles 20 to be releasably engaged with the nozzle socket coupling member 144.

The brake assembly 24 includes a brake member 56 and a clamping device, such as a brake plate 58 and a brake surface 67, which clamp the brake member 56 and slow the rotation of the deflector 22 as shown in FIG. 7. The brake plate 58 is positioned below the brake member 56 and is coupled to a shaft 60 which carries the deflector 22 such that the brake plate 58 turns with rotation of the deflector 22. The brake surface 67 is disposed on an underside of the cap 24 (on an opposite side of the brake member 56 from the brake plate 58) and is stationary relative to the rotating brake member 56. As discussed in greater detail below, fluid striking the deflector 22 rotates the deflector 22 and brake plate 58, shifts the brake plate 58 upward, and compresses the brake member 56 between the brake plate 58 and the brake surface 67. This produces frictional resistance to turning of the deflector 22.

Figure 9:
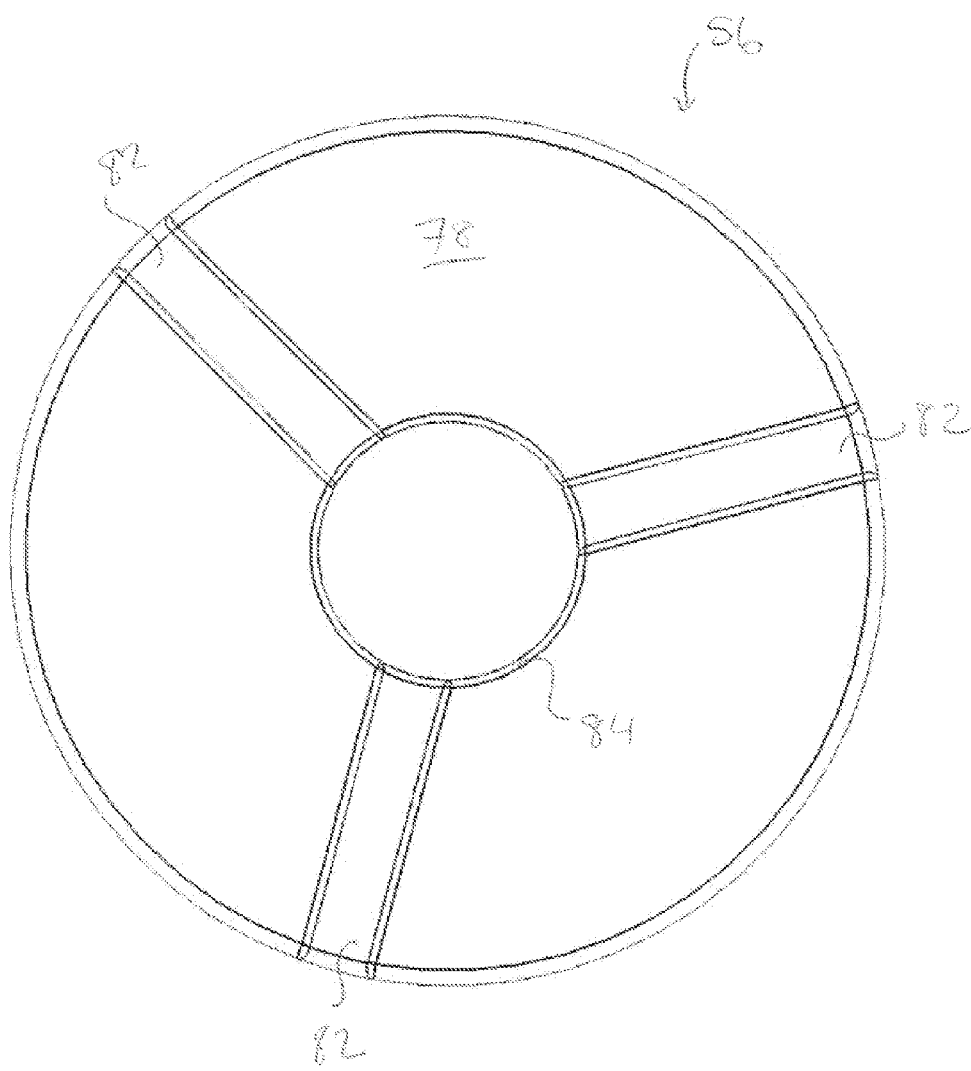
FIG. 9 is a bottom plan view of a brake member of the brake device of FIG. 7.
Figure 10:
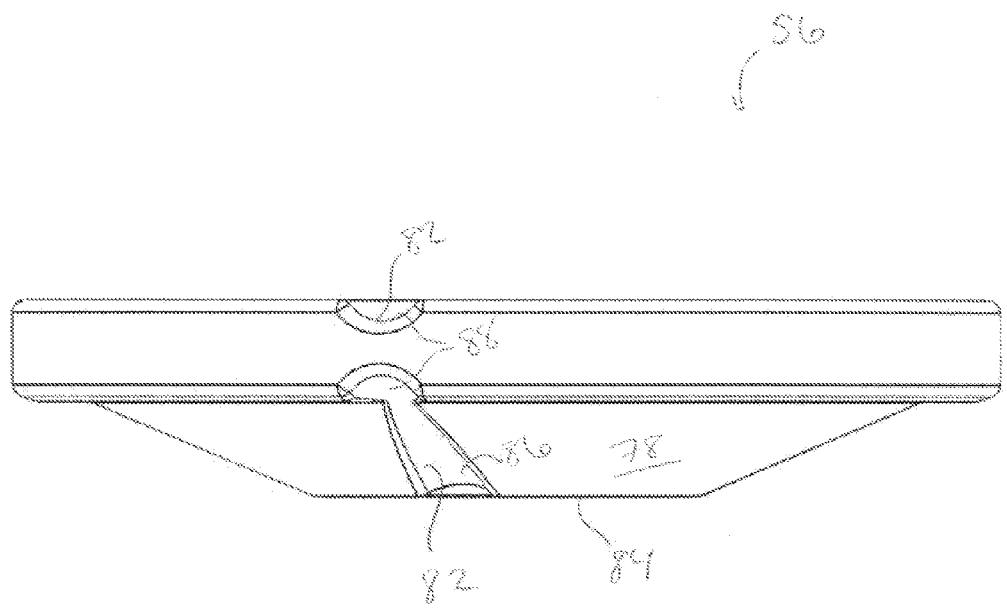
FIG. 10 is a side elevational view of the brake member of FIG. 9.
Figure 11:
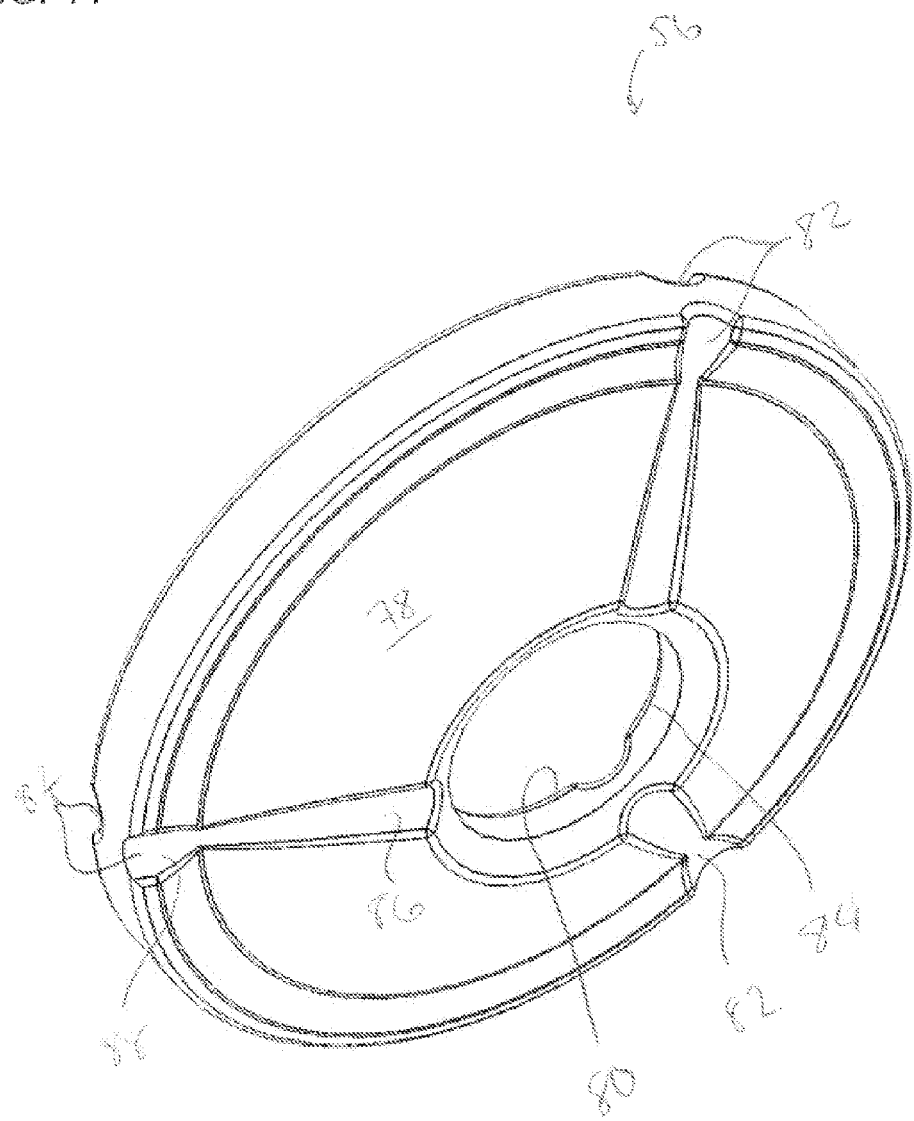
FIG. 11 is a perspective view of the brake member of the FIG. 9.
Figure 12:
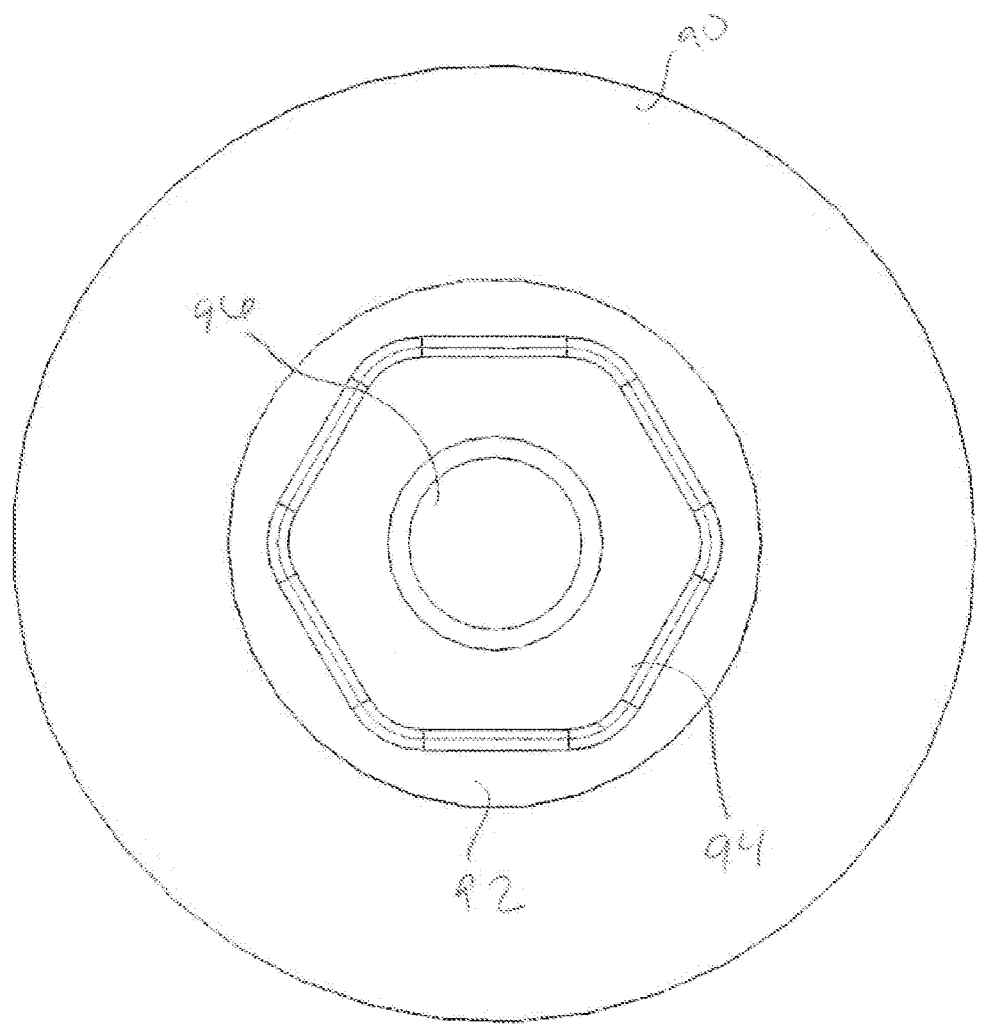
FIG. 12 is a bottom plan view of a brake plate of the brake device of FIG. 7.
Figure 13:
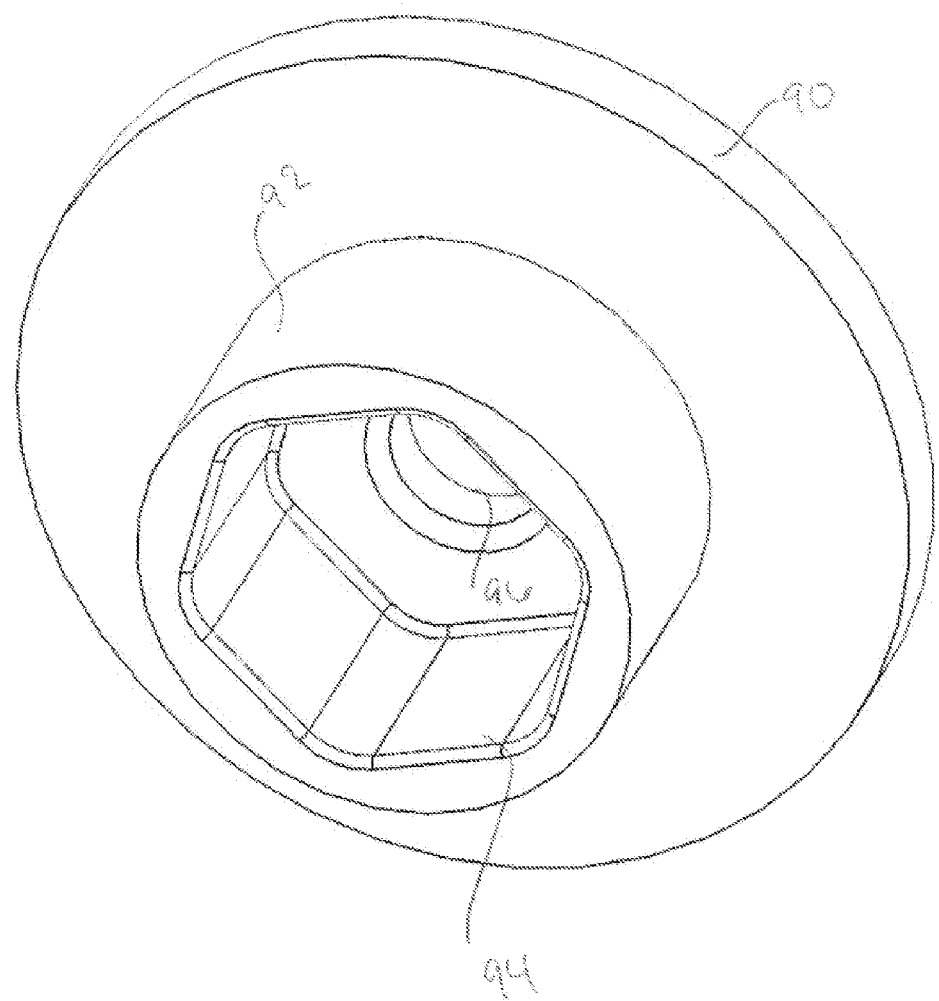
FIG. 13 is a perspective view of the brake plate of FIG. 12.

The brake member 56 may be conically shaped and defined by a lower friction surface 78 and an upper friction surface 80 (see FIGS. 7, 10, 11). The surfaces 78 and 80 each have grooves 82 extending radially outward from a central opening 84 (which receives the shaft 60 therethrough), with each groove 82 having an inner recess 86 and an outer recess 88 as shown in FIGS. 9 and 10. The grooves 82 may function to direct dirt and debris that become lodged between the brake member 56, brake plate 58, and brake surface 67 radially outward and away from the shaft 60. This operation inhibits the dirt and debris from gumming up the rotation of brake plate 58 (and deflector 22 connected thereto). In one approach, a lubricant such as grease may be used within the brake assembly 24 to increase the ease with which the deflector 22 can rotate. In this approach the grooves 82 serve to trap excess grease that could affect the frictional quality of the contact surfaces.

Figure 10A:
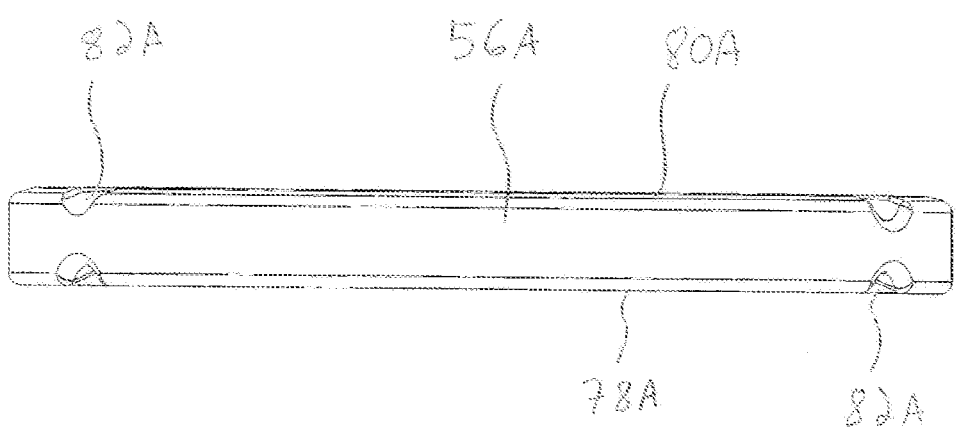
FIG. 10A is a side elevational view of an alternative form of a brake member for the brake device.

With reference to FIG. 10A, another brake member 56A is shown. The brake member 56A is substantially similar to the brake member 56 and includes upper and lower friction surfaces 80A, 78A with grooves 82A thereon. The brake member 56A, however, is flat rather than the conical shape of brake member 56.

With reference to FIGS. 5, 7, 12, and 13, the brake plate 58 has an upper plate portion 90 with a friction surface 91 for engaging the brake member 56 and a socket 92 extending longitudinally downward from the plate portion 90. The socket 92 has a hexagonal shaped opening 94 and a through-opening 96 for receiving the shaft 60 therethrough. Referring to FIGS. 5 and 7, the shaft 60 has an upper portion 98, a lower portion 100, a hexagonal collar 102, and splines 104 of the lower portion 100. The upper portion 60 resides within the openings 84 and 96 of the brake member 56 and the brake plate 58, respectively. The socket 92 has a mating, hexagonal configuration to engage the shaft hexagonal collar 102 and restrict rotary movement therebetween. An upper surface 102A of the collar 102 faces a bottom 92A of the socket 92, so that upward, longitudinal movement of the shaft 60 engages the upper surface 102A of the shaft collar 102 with the socket bottom 92A and shifts the brake plate 58 upward.

The shaft 60 has a lower end portion 100 sized to fit within a recess 105 of the deflector 22. The shaft lower end portion 100 has splines 104 that engage cooperating splines in the recess 105. The interengagement of the splines keeps the deflector 22 mounted on the shaft lower end portion 100 and restricts relative rotary motion of the deflector 22 about the shaft lower end portion 100. In another approach, the recess 105 has a smooth bore and the shaft lower end portion 100 is press-fit therein.

Figure 14:
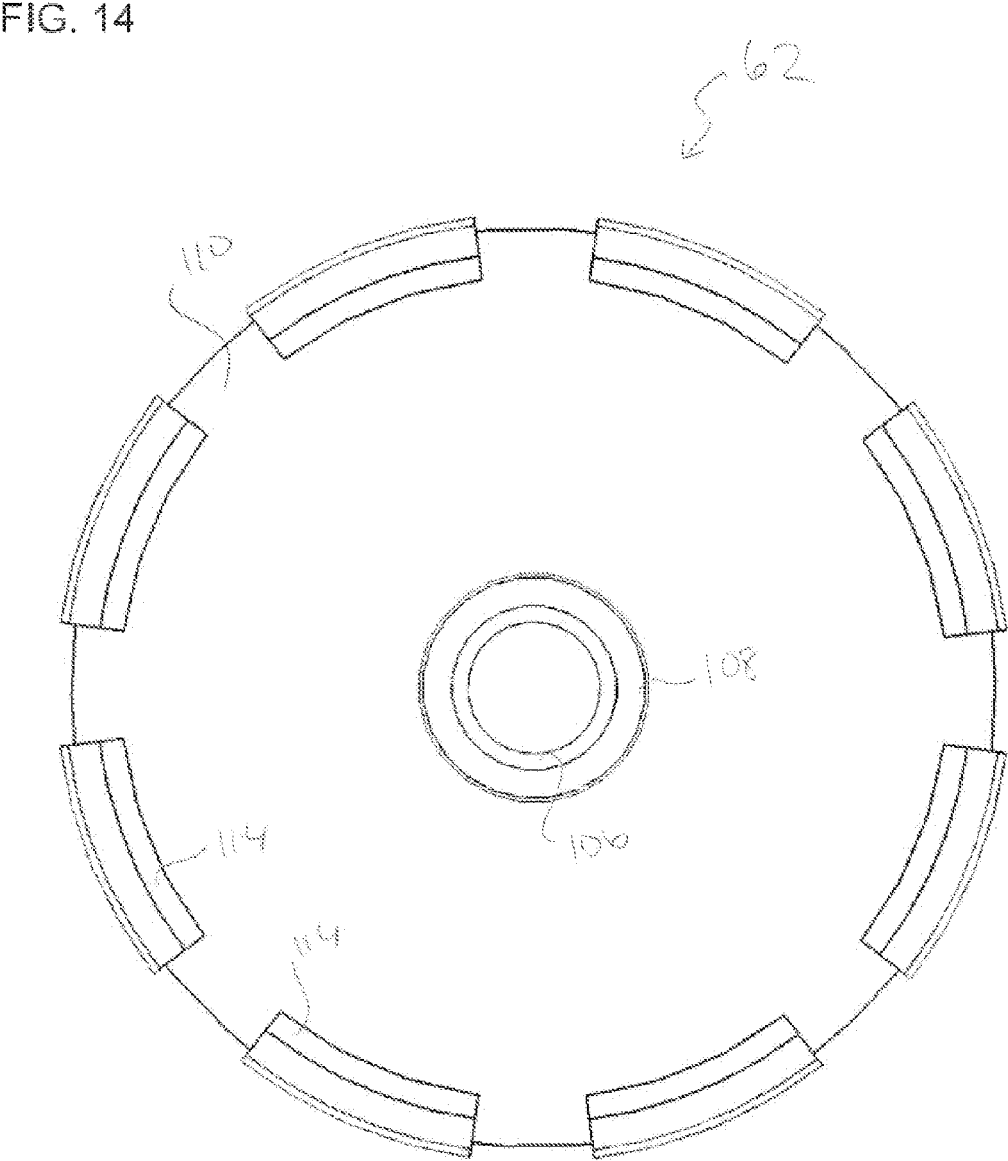
FIG. 14 is a bottom plan view of a brake base member of the brake device of FIG. 7.
Figure 15:
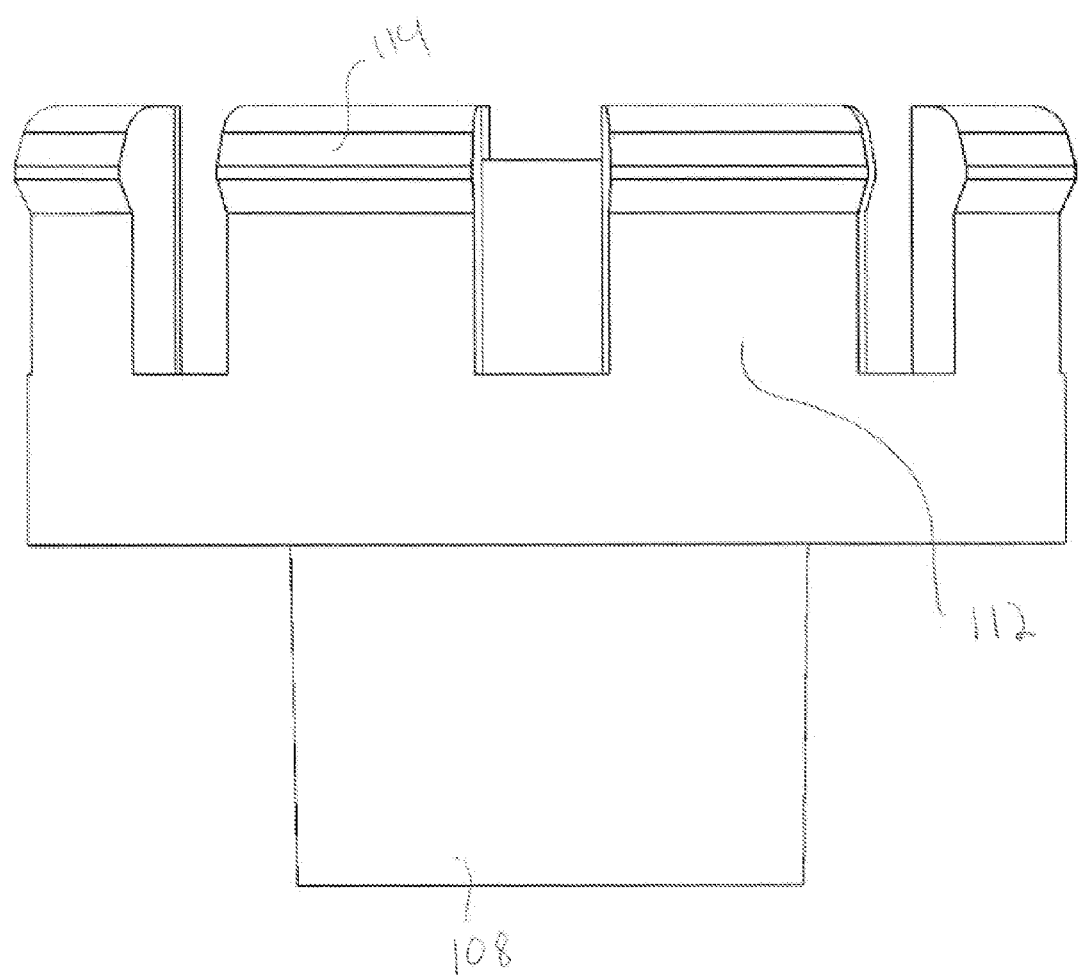
FIG. 15 is a side elevational view of the brake base member of FIG. 14.

Referring now to FIGS. 7, 14, and 15, the brake base 62 has resilient tabs 112 that releasably connect the brake base 62 within the brake cap 54. The resilient tabs 112 are upstanding from a disc 110 and include protuberances 114 which bear against an internal surface 54A of the brake cap 54 (see FIG. 8) and deflect the tabs 112 radially inward as the base 62 is inserted into the cap 54 and the tabs 112 are advanced into the brake cap recess 66. The protuberances 114 snap into the groove 68 of the brake cap 54 to secure the brake base 62 within the brake cap 54.

In another approach, the brake base 62 may be ultrasonically welded or adhered to the brake cap 54 rather than utilizing resilient tabs 112. In yet another approach, the brake base 62 may be permanently connected to the brake cap 54 using structures that make disassembly nearly impossible without damaging the sprinkler 10. For example, the resilient tabs 112 could have protuberances 114 with sharp profiles that permit the tabs 112 to snap into brake cap 54 in a insertion direction but require deformation of the protuberances 114 in a reverse direction.

With the brake base 62 mounted within the brake cap 54, the brake base 62 is secured to the frame 14 during operation of the sprinkler 10. The brake base 62 has a sleeve 108 with a through opening 106 sized to receive the shaft 60, as shown in FIGS. 7, 14, 15. The sleeve 108 permits both rotational and longitudinal movement of the sleeve 108 within the opening 108. Further, the sleeve has an upper end 108A which contacts the bottom of the shaft collar 102 and restricts downward longitudinal movement of the shaft 60 beyond a predetermined position, as shown in FIG. 7. The sleeve upper end 108A functions as a lower stop for the shaft 60.

Figure 16:
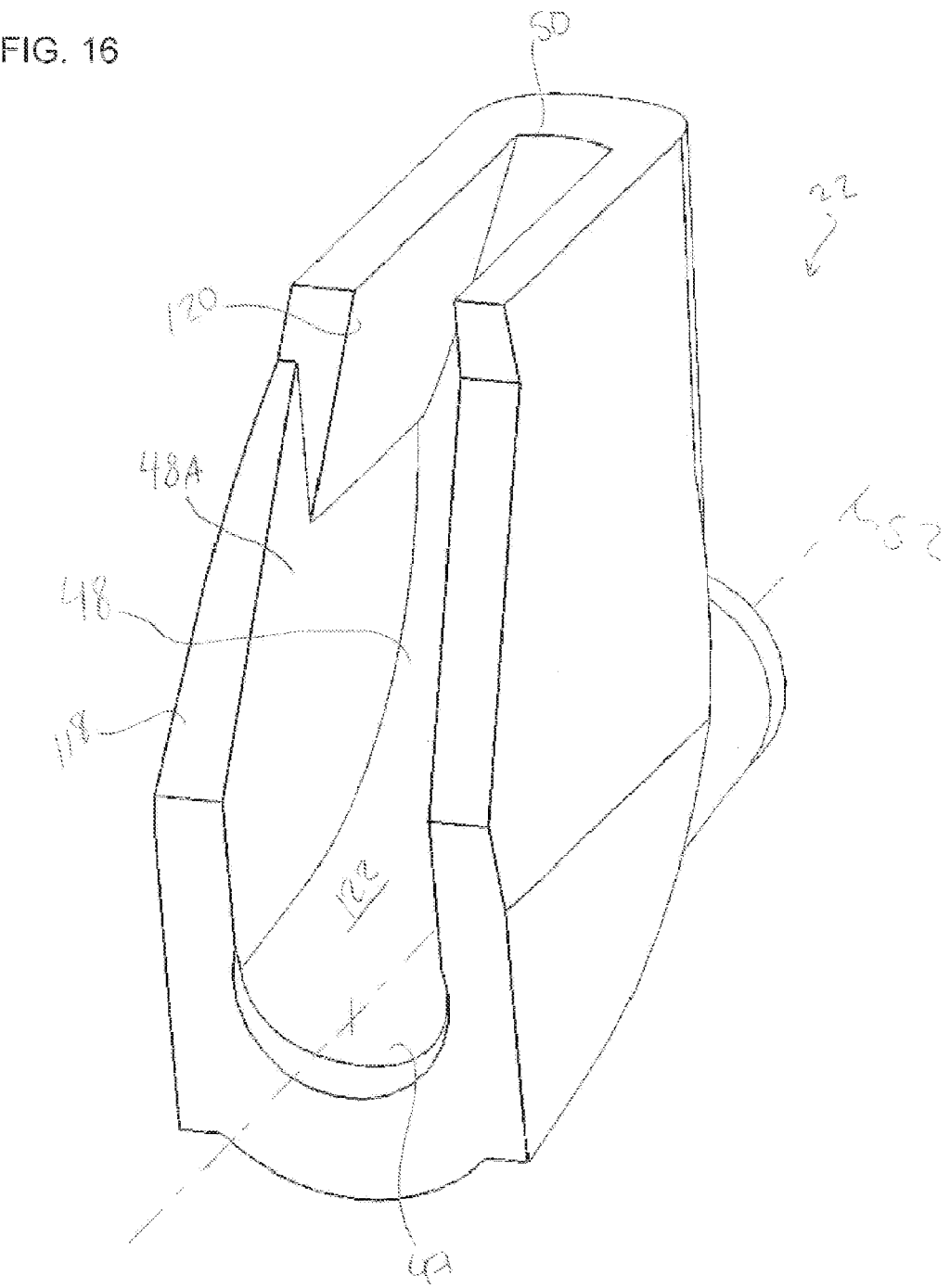
FIG. 16 is a perspective view of a deflector of the rotary sprinkler of FIG. 1.
Figure 17:
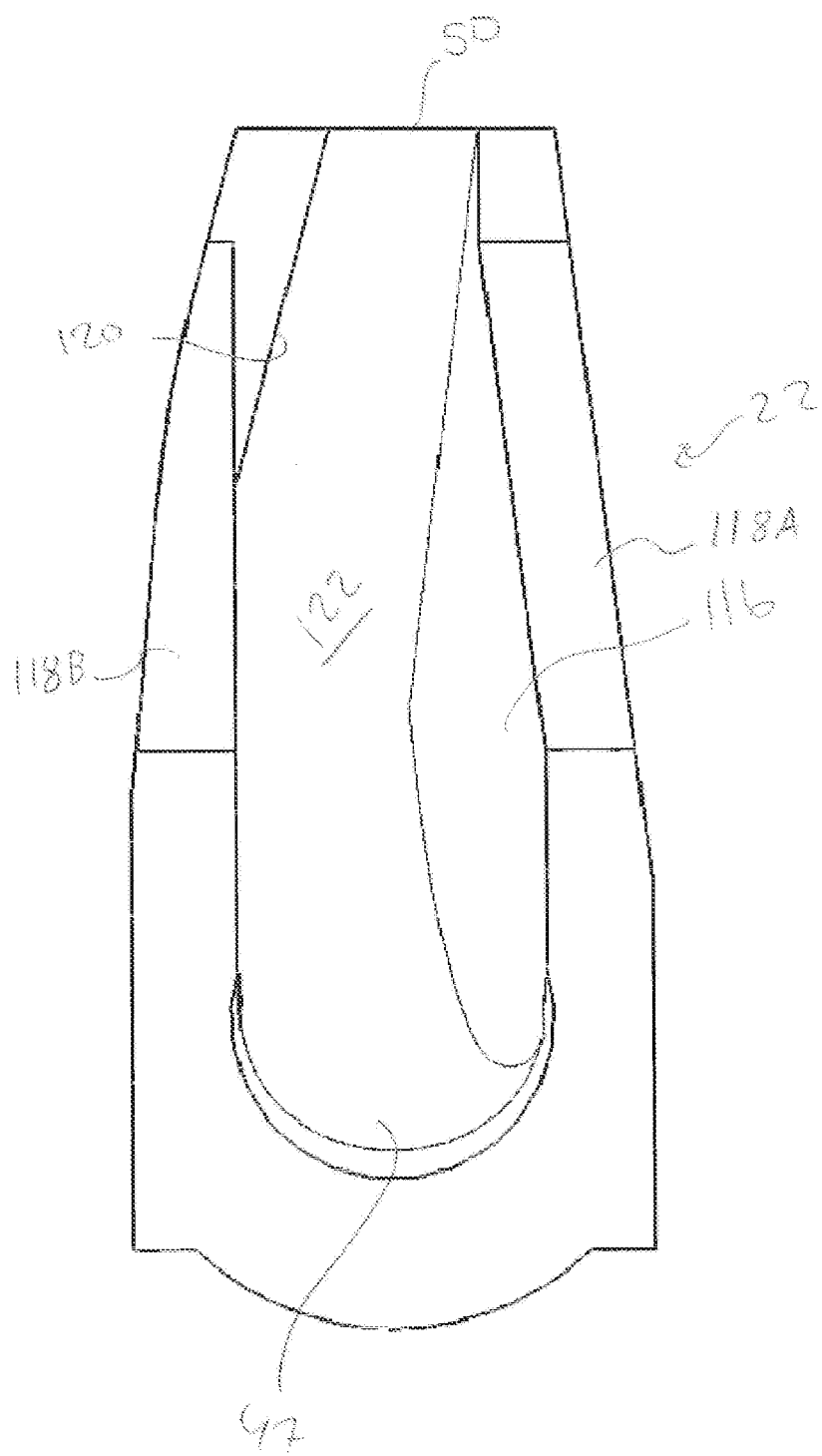
FIG. 17 is a bottom plan view of the deflector of FIG. 16.
Figure 18:
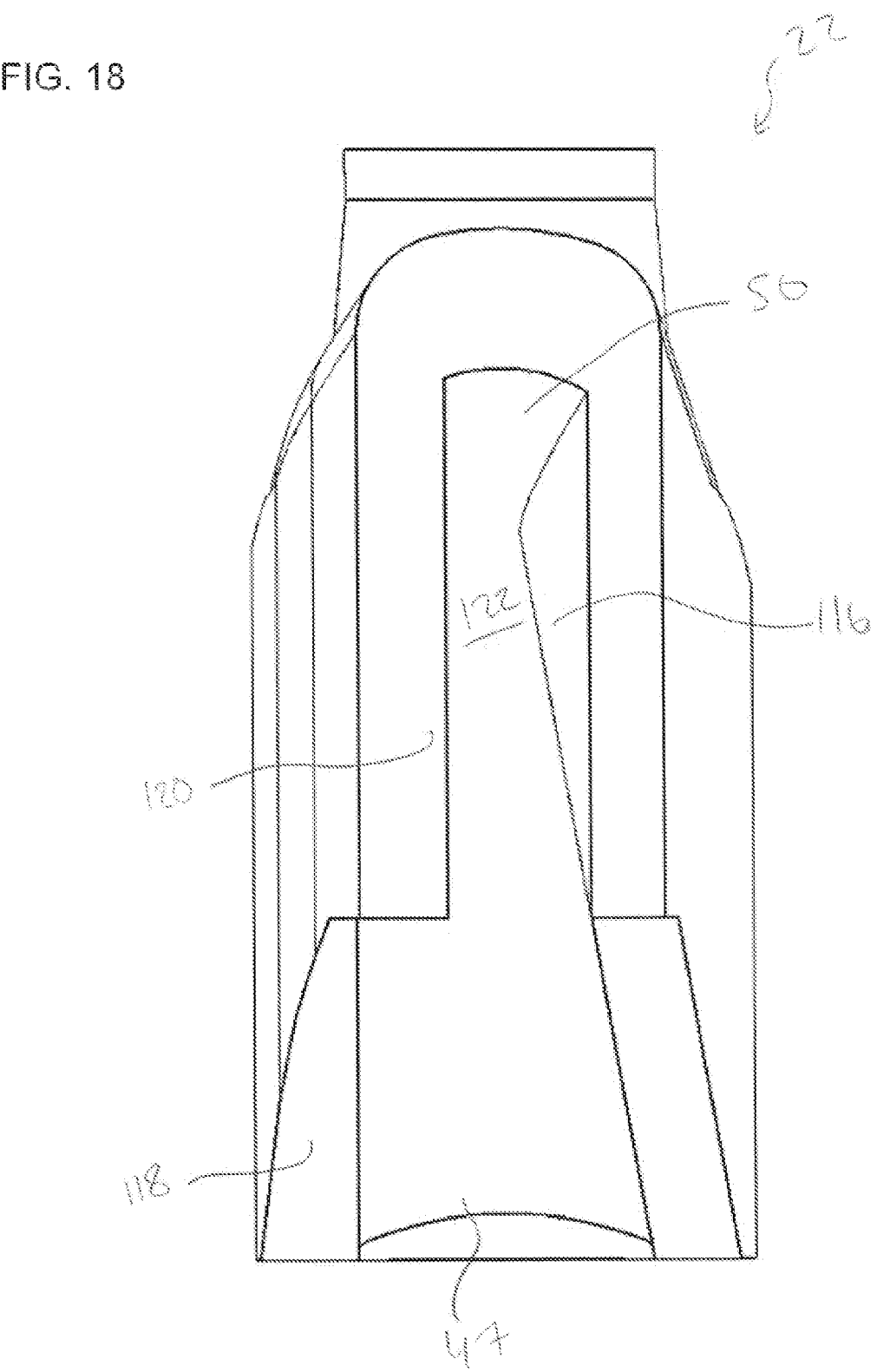
FIG. 18 is a side elevational view of the deflector of FIG. 16.

Referring to FIGS. 16-18, the channel 48 of the deflector 22 may have an open configuration with an opening 48A extending along a side of the channel 48. The channel 48 has walls 118 on opposite sides of the channel 48, with one of the walls 118A having an axially inclined surface 116 to direct the flow of fluid through the deflector 22 and the other wall 118B having a ramp 120 that directs the flow tangentially from the outlet 50 of the deflector 22. As a result of water flow through the channel 48 and against the ramp 120, a reaction force tangent to the axis of rotation 52 of the deflector 22 is created, causing the deflector 22 and the attached shaft 60 to rotate relative to the frame 14 in direction 150 (see FIGS. 1 and 21).

The channel 48 also has a curved surface 122 that redirects an axial flow of fluid from the nozzle 20 into a flow travelling radially outward from the deflector 22. The inclined surface 116 directs the fluid flow towards the wall 118B as the fluid travels along the curved surface 122. The inclined surface 116 and the curved surface 122 operate to direct fluid toward the ramp 120 and cause the fluid to exit the deflector outlet 50 at a predetermined angle sufficient to cause the deflector 22 to turn. The shape of the surfaces of the channel 48, including surfaces 116, 120, and 122, can be modified as desired to provide a desired, uniform fluid stream as it leaves the deflector 22. It will be appreciated that the channel 48 can have one, two, three, or more flat surfaces, as well as other features such as one or more grooves, in order to achieve a desired fluid distribution uniformity from the deflector 22.

Figure 39:
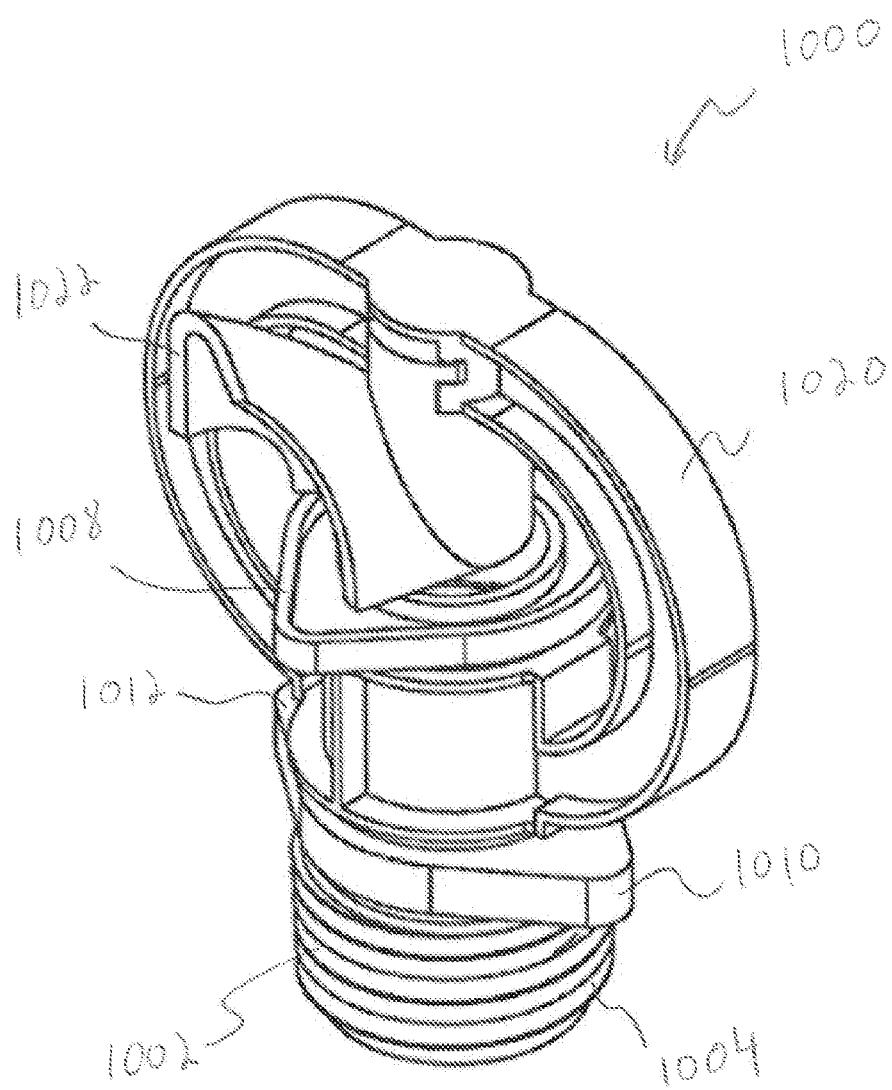
FIG. 39 is a schematic view of a water spray pattern of a sprinkler having the deflector of FIG. 37.
Figure 31:
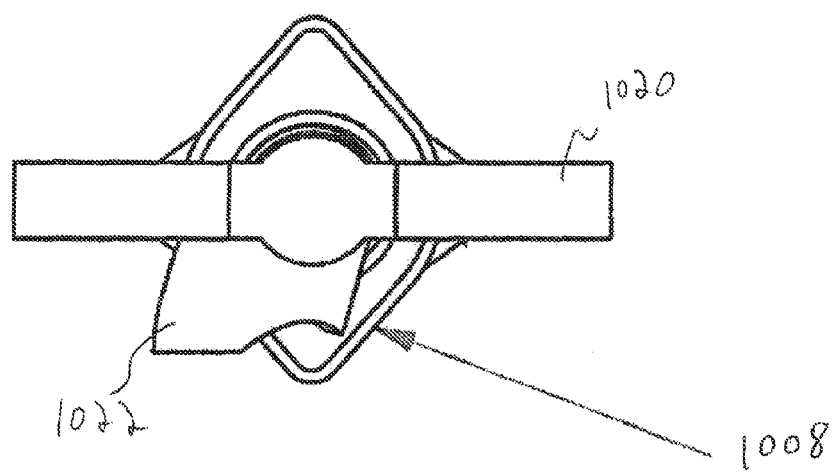
FIG. 31 is a top plan view of the rotary sprinkler of FIG. 30.
Figure 32:
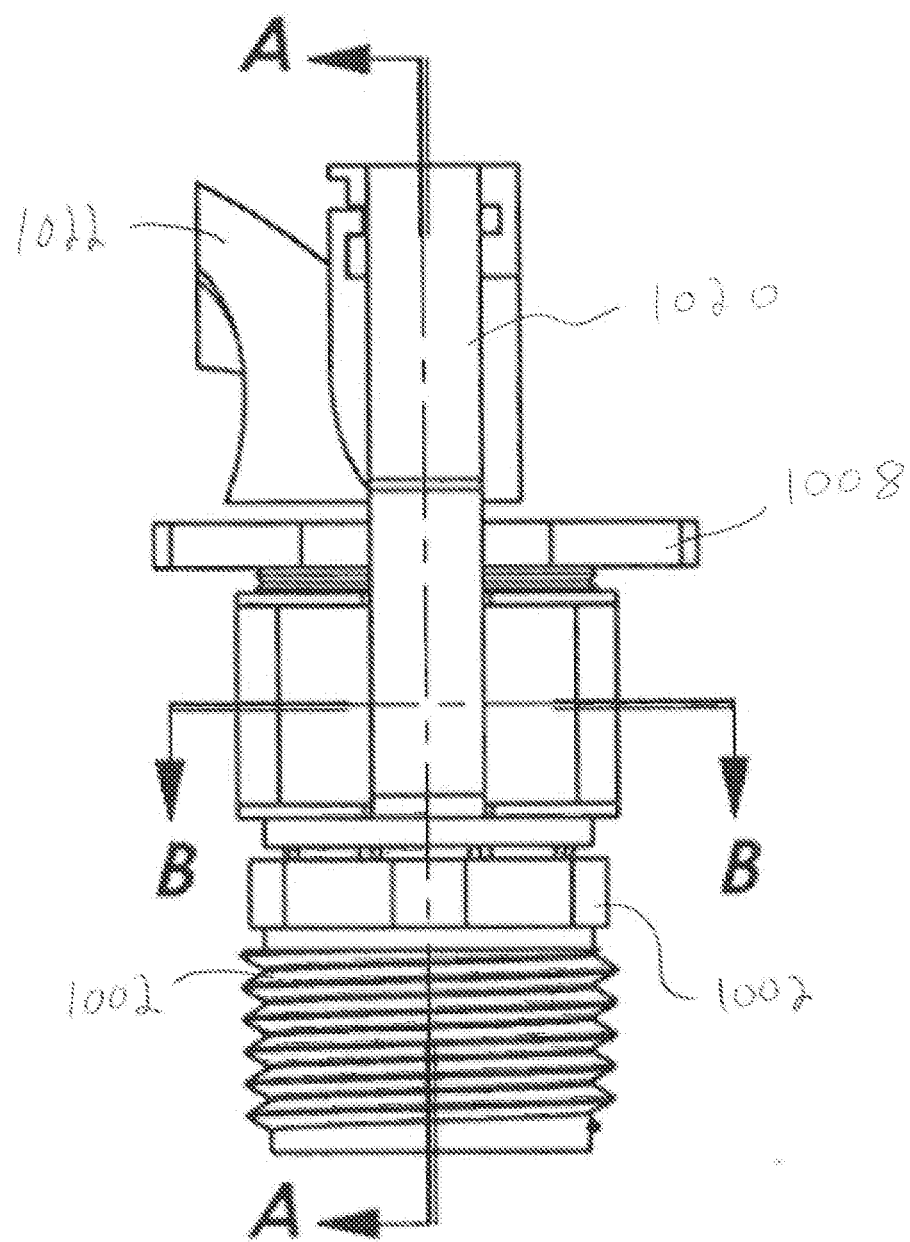
FIG. 32 is a side elevational view of the of the rotary sprinkler of FIG. 30.
Figure 33:
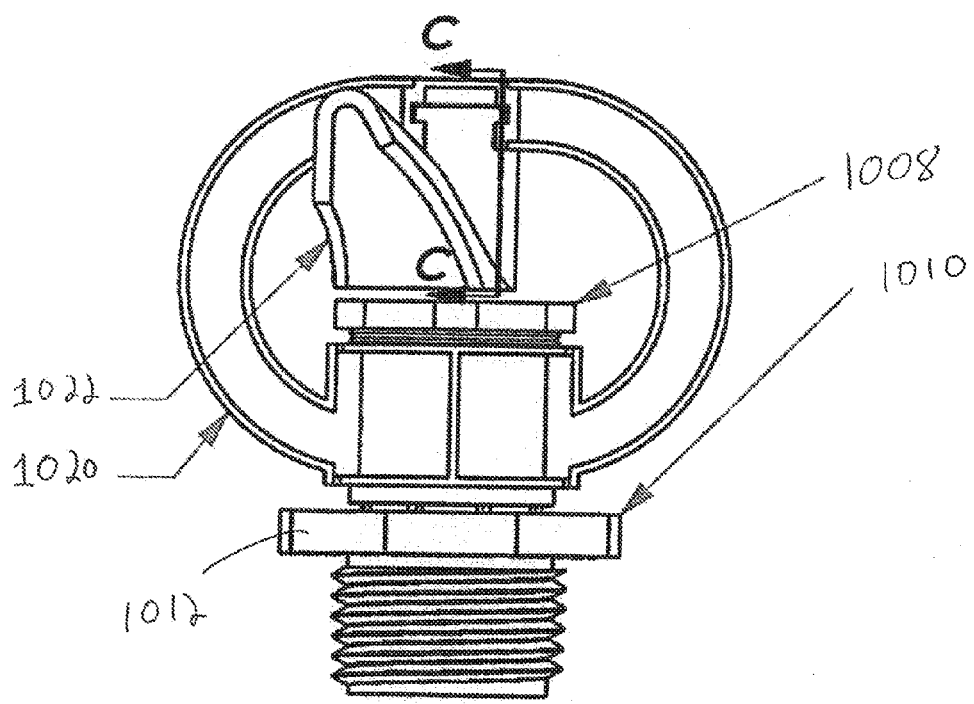
FIG. 33 is a is a front elevational view of the of the rotary sprinkler of FIG. 30.
Figure 34:
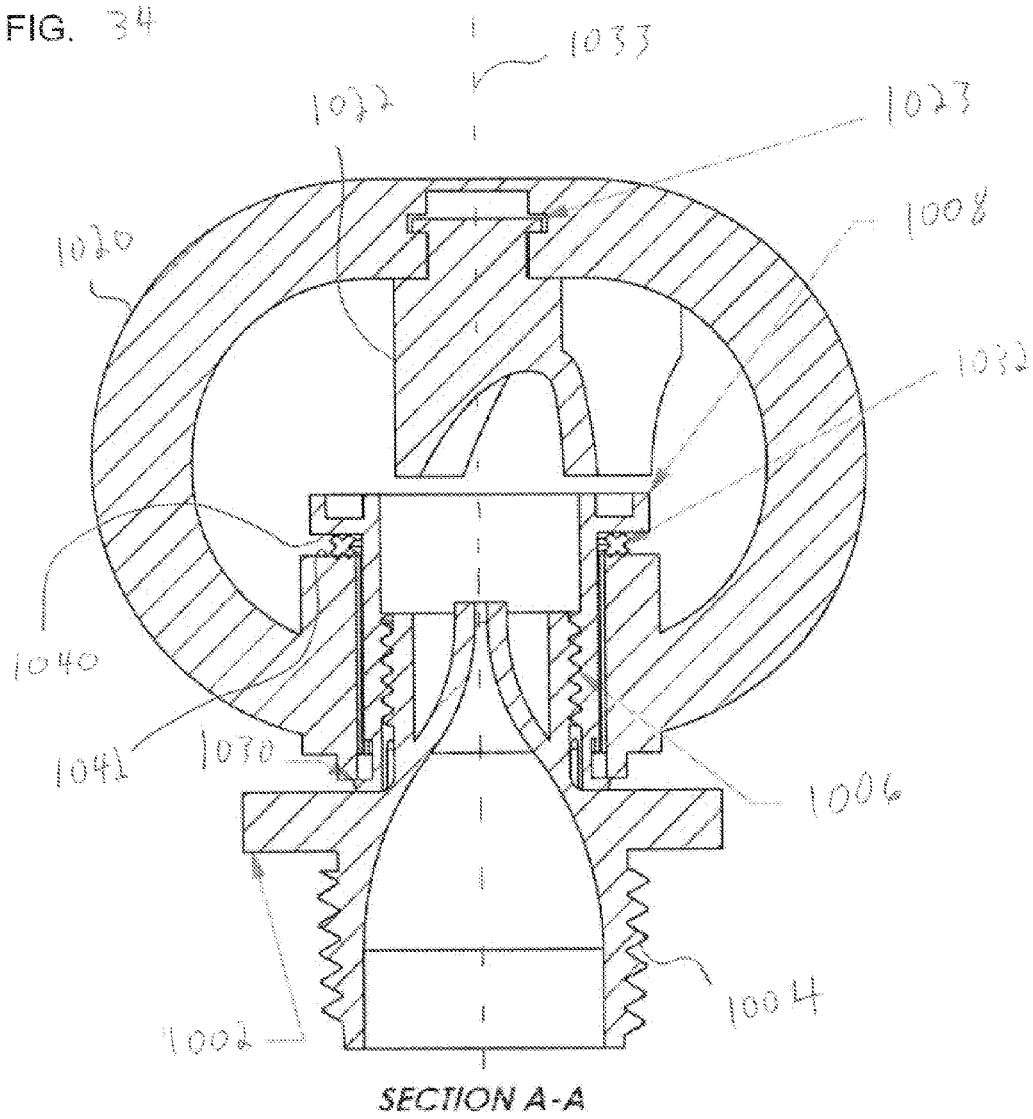
FIG. 34 is a cross-sectional view taken along line A-A in FIG. 32.
Figure 35:
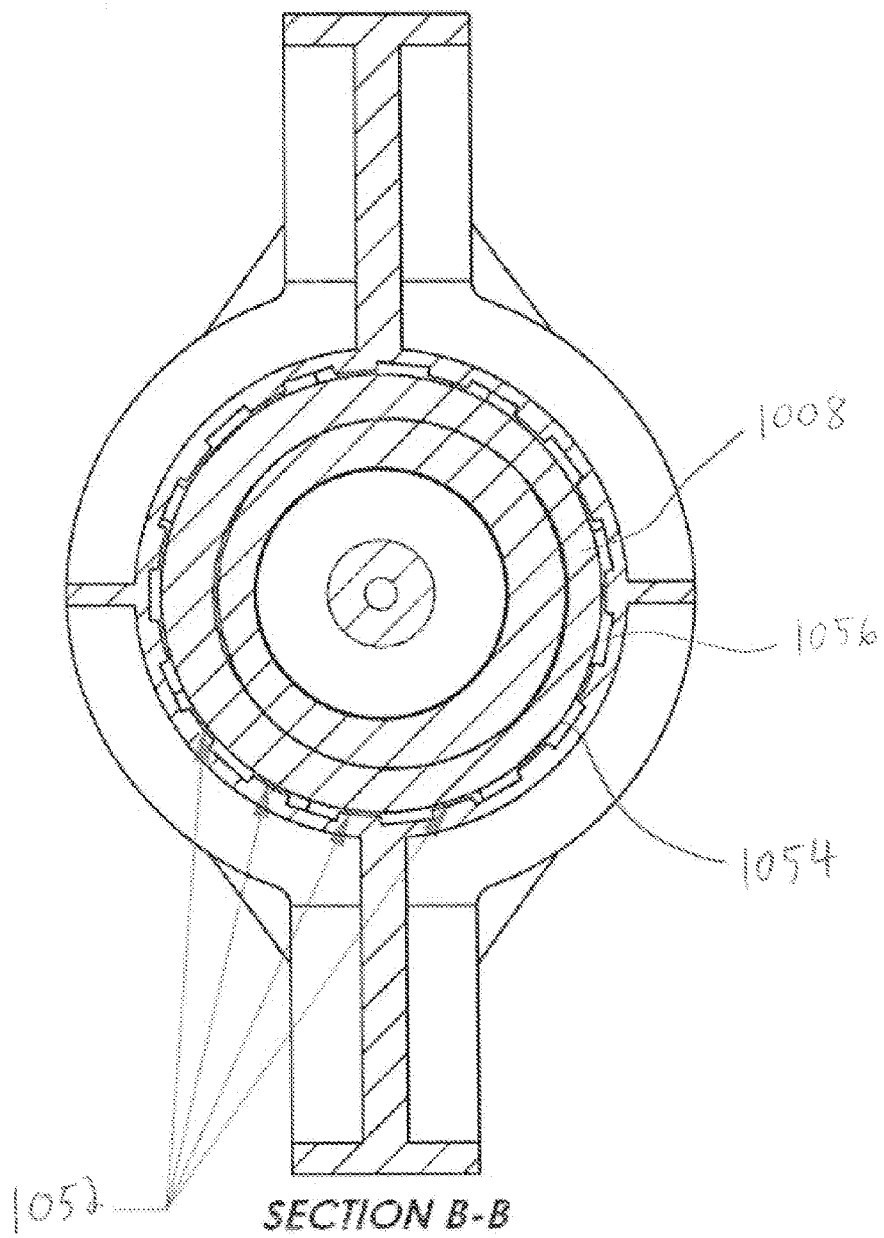
FIG. 35 is a cross-sectional view taken along line B-B in FIG. 32.
Figure 36:
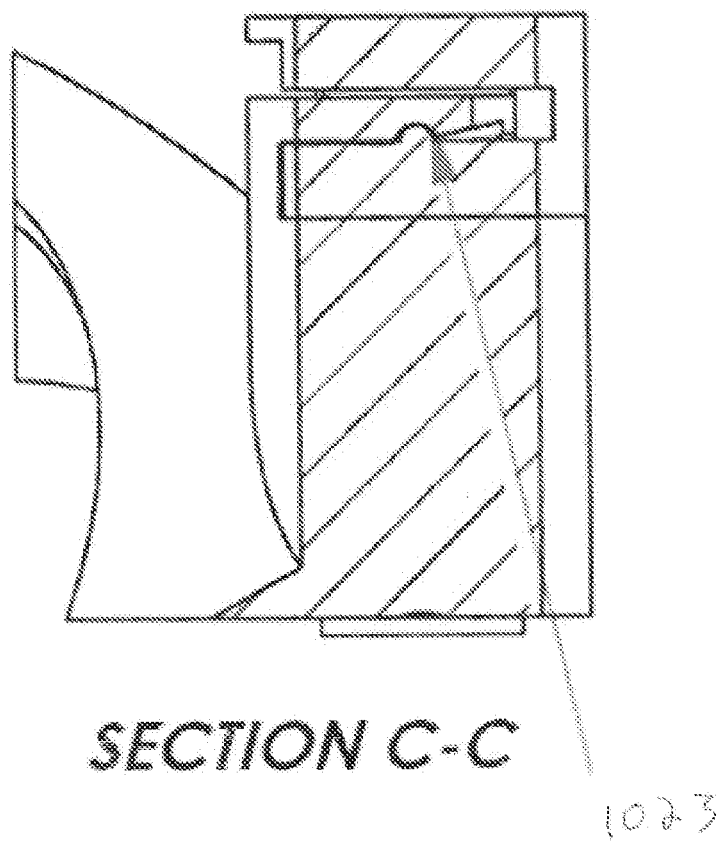
FIG. 36 is a cross-sectional view taken along line C-C in FIG. 33.
Figure 38:
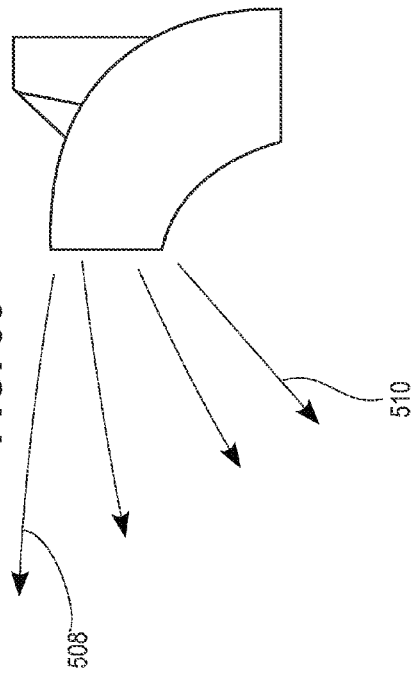
FIG. 38 is a schematic view of fluid being emitted from the deflector of FIG. 37.
Figure 39:
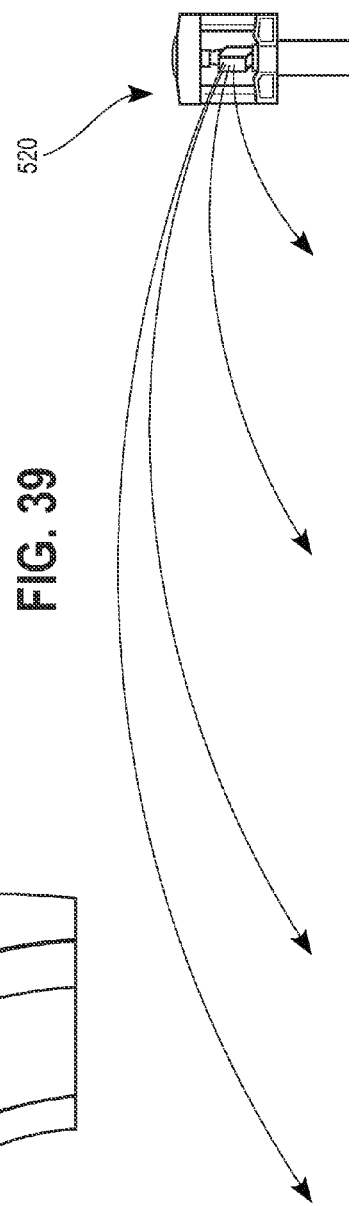
Figure 37:
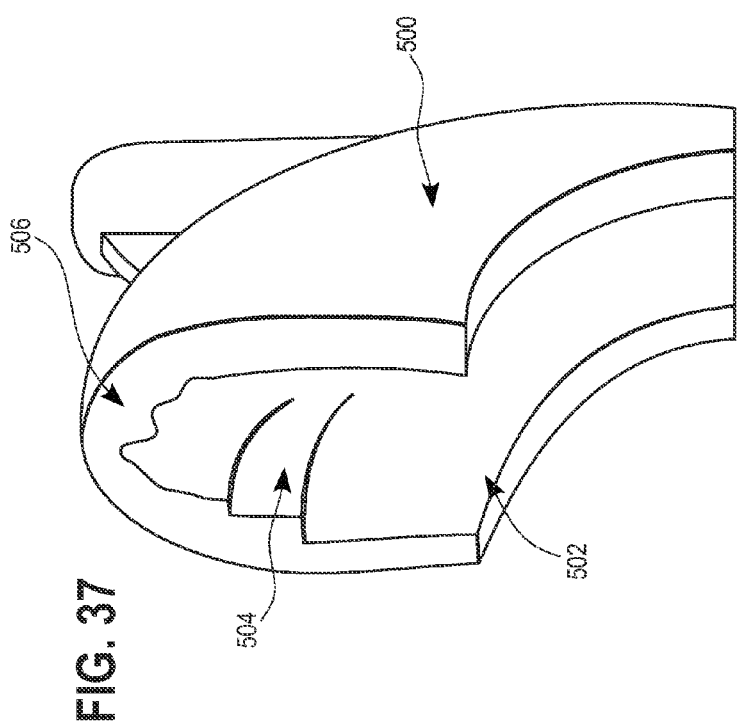
FIG. 37 is a perspective view of another deflector.
Figure 40:
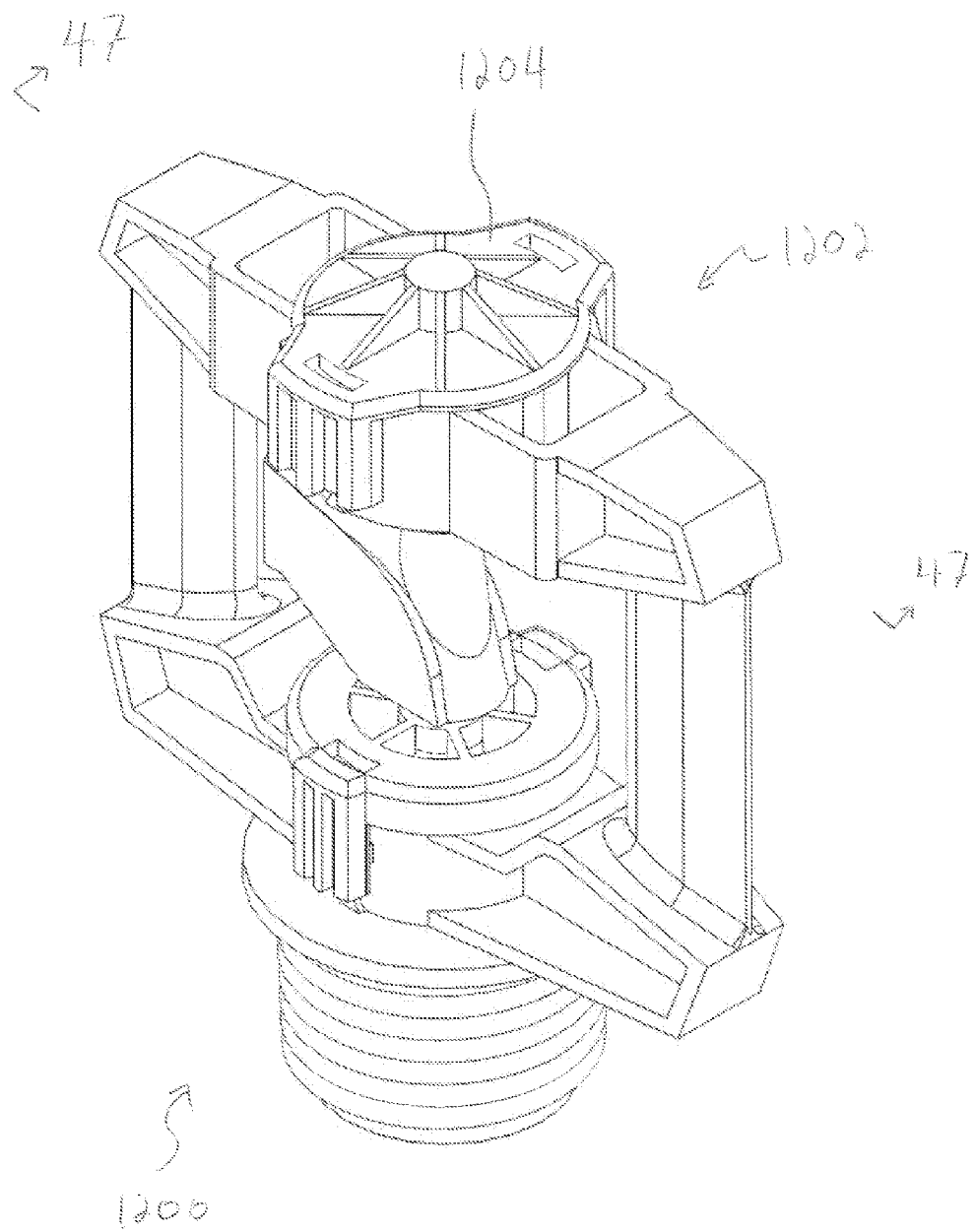
FIG. 40 is a perspective view of another rotary sprinkler.

With reference to FIGS. 37-39, a deflector 500 is shown having an inner channel 502, steps 504, and grooves 506 extending along an interior surface of the channel 502. The grooves 506 near the upper end (as viewed in FIG. 37) direct the upper portion of the fluid flow to provide far-field watering 508 while the steps 504 near the lower end direct the lower portion of the fluid flow to provide near-field watering 510. The deflector 500 can be used with the sprinkler 10, and is generally shown in operation in FIG. 39. By directing the upper portion of the flow farther, the deflector 500 restricts the upper portion of the flow from pushing the lower portion of the flow downward. This functions to increase the throw distance and spray uniformity of the sprinkler 520.

When fluid travels into the deflector 22 from the nozzle 20, the fluid strikes the curved surface 122 and shifts the deflector 22 and shaft 60 connected thereto upward through a short stroke. The upward movement of the shaft 60 shifts the upper friction surface 91 (see FIG. 5) of the brake plate 58 into engagement with the lower friction surface 78 of the brake member 56. The brake member 56 is also shifted axially upwardly through a short stroke sufficient to move the upper friction surface 80 of the brake member 56 (see FIG. 7) into engagement with the brake surface 67 of the cap 54. With this arrangement, the brake member 56 is axially sandwiched between the rotatably driven brake plate 58 and the nonrotating brake surface 67. The brake member 56 frictionally resists and slows the rotational speed of the brake plate 58 and the deflector 22 connected to it.

The higher the fluid flow through the nozzle 20, the greater the impact force of the fluid against the curved surface 122 of the deflector 22. This translates into a greater upward force being exerted on the deflector 22 and shaft 60 and brake plate 58 connected thereto. As the fluid flow increases, this upward force causes the brake member 56 to gradually flatten out and bring a larger portion 160 of the brake member friction surface 80 into engagement with the cap brake surface 67, as shown in FIG. 7. Further, flattening out of the brake member 56 also causes a larger portion 162 of the brake member lower friction surface 78 to engage the brake plate 58. Thus, rather than the deflector 22 spinning faster with increased fluid flow from the nozzle 20, the brake device 24 applies an increasing braking force to resist the increased reaction force on the deflector ramp 120 from the increased fluid flow.

The flat brake member 56A provides a similar increase in braking force with increased impact force of the fluid against the curved surface 122 of the deflector 22. More specifically, the frictional engagement between the brake upper frictional surface 80A, the brake surface 67, and the brake member 58 is increased with an increase in fluid flow against the curved surface 122 (see FIG. 7). This increase occurs because frictional force is a function of the force applied in a direction normal to the friction surface 67, with the normal force in this case resulting from the impact of fluid against the curved surface 122 of the deflector 22.

Figure 21:
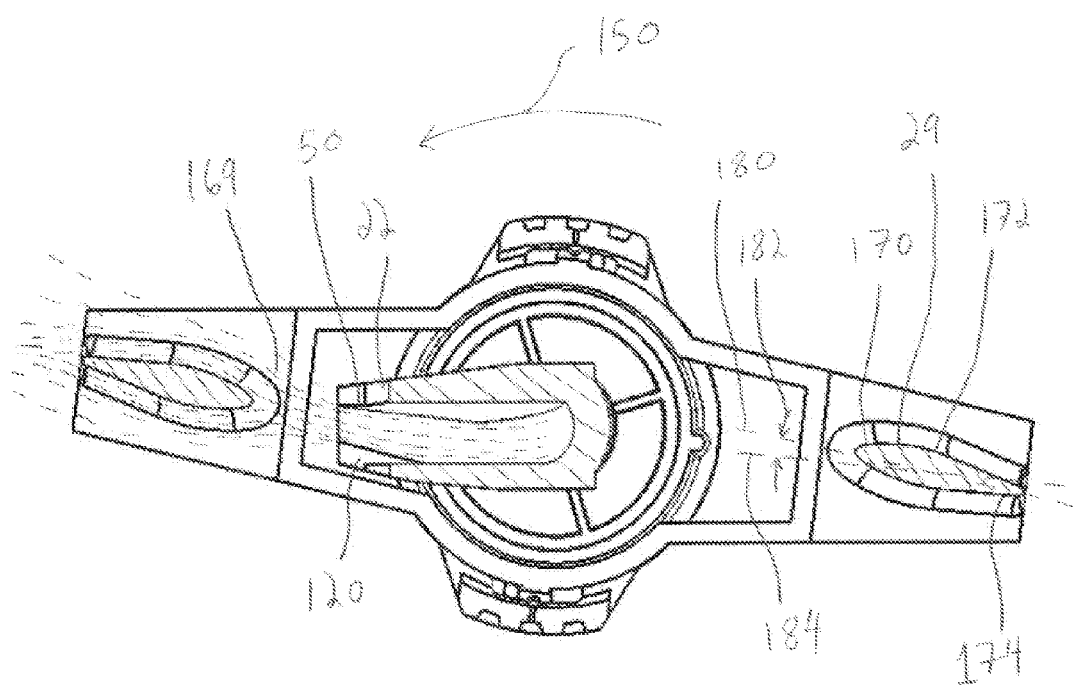
FIG. 21 is a cross-sectional view taken along line 21-21 in FIG. 2 showing the cross-sectional shape of the supports of the rotary sprinkler of FIG. 1.

With reference to FIG. 21, the sprinkler 10 has additional features that improve efficiency of the sprinkler 10. In one form, the sprinkler 10 has supports 29 with an airfoil-shaped cross section that minimizes the shadow created by the supports 29 in the spray pattern of the sprinkler 10. More specifically, the supports 29 have a leading end portion 170, an enlarged intermediate portion 172, and a tapered trailing end portion 174. The leading and trailing end portions 172, 174 gradually divert fluid flow 169 from the deflector 22 around the supports 29 and cause the fluid flow 169 to re-join near the trailing end 174. The fluid flow 169 then continues radially outward from the supports 29 substantially uninterrupted by the presence of the supports 29, which reduces the shadow of the supports 29 over conventional sprinklers.

The supports 29 have cross-sectional midlines 180 that are oriented at an angle 182 relative to a radius 184 of the sprinkler 10. As shown in FIG. 21, fluid 169 travels outwardly from the deflector 22 tangentially to the deflector outlet opening 50 due to the fluid 169 striking the ramp 120. The support midlines 180 are oriented substantially parallel to this tangential direction of fluid travel, which causes the fluid 169 traveling outward from the deflector outlet opening 50 to contact the leading end portion 170 head-on. This maximizes the ability of the support cross-section to redirect flow 169 around the support 29 and rejoin the flow 169 once it reaches the trailing end portion 174.

The components of the sprinkler 10 are generally selected to provide sufficient strength and durability for a particular sprinkler application. For example, the brake shaft 60 may be made of stainless steel, the brake member 56 may be made of an elastomeric material, and the remaining components of the sprinkler 10 may be made out of plastic.

Figure 22:
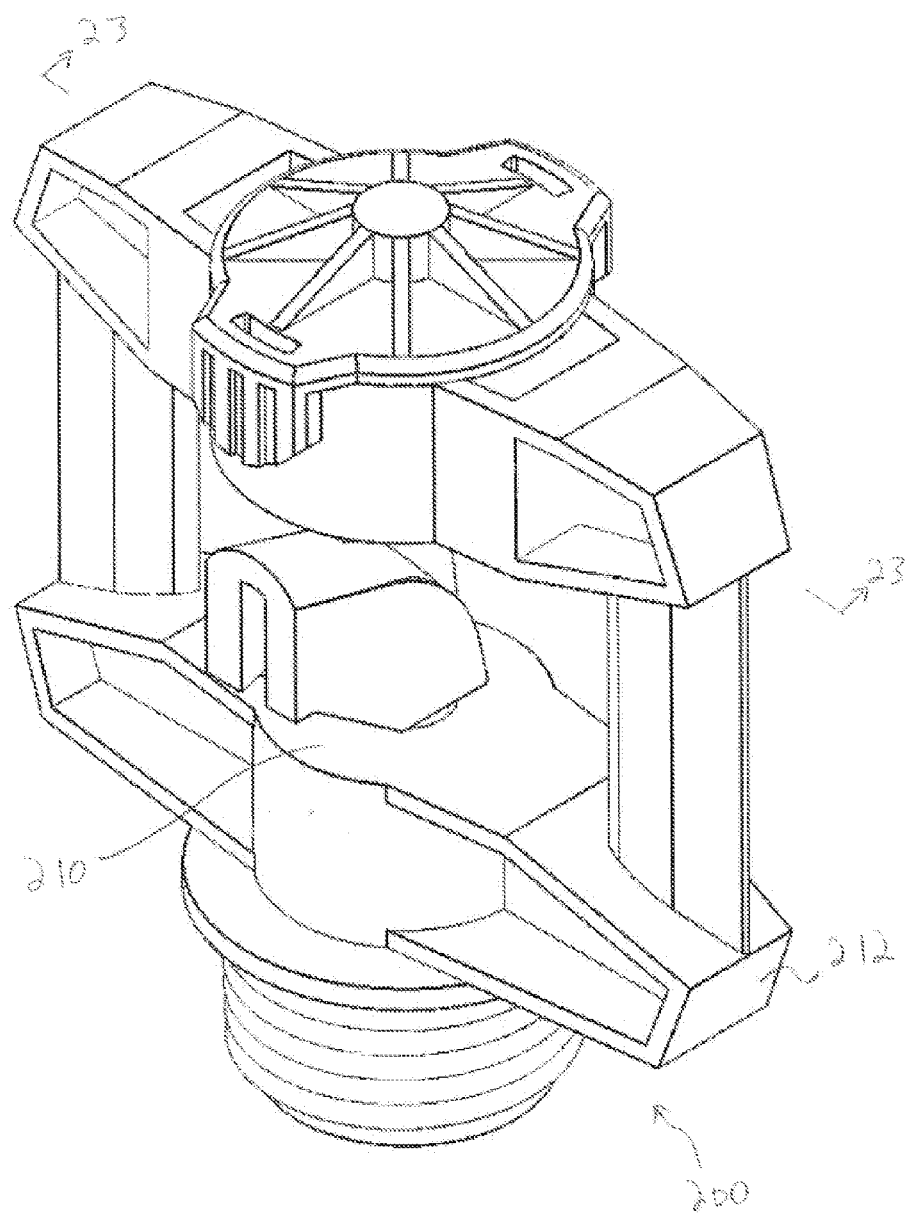
FIG. 22 is a perspective view of another rotary sprinkler.
Figure 23:
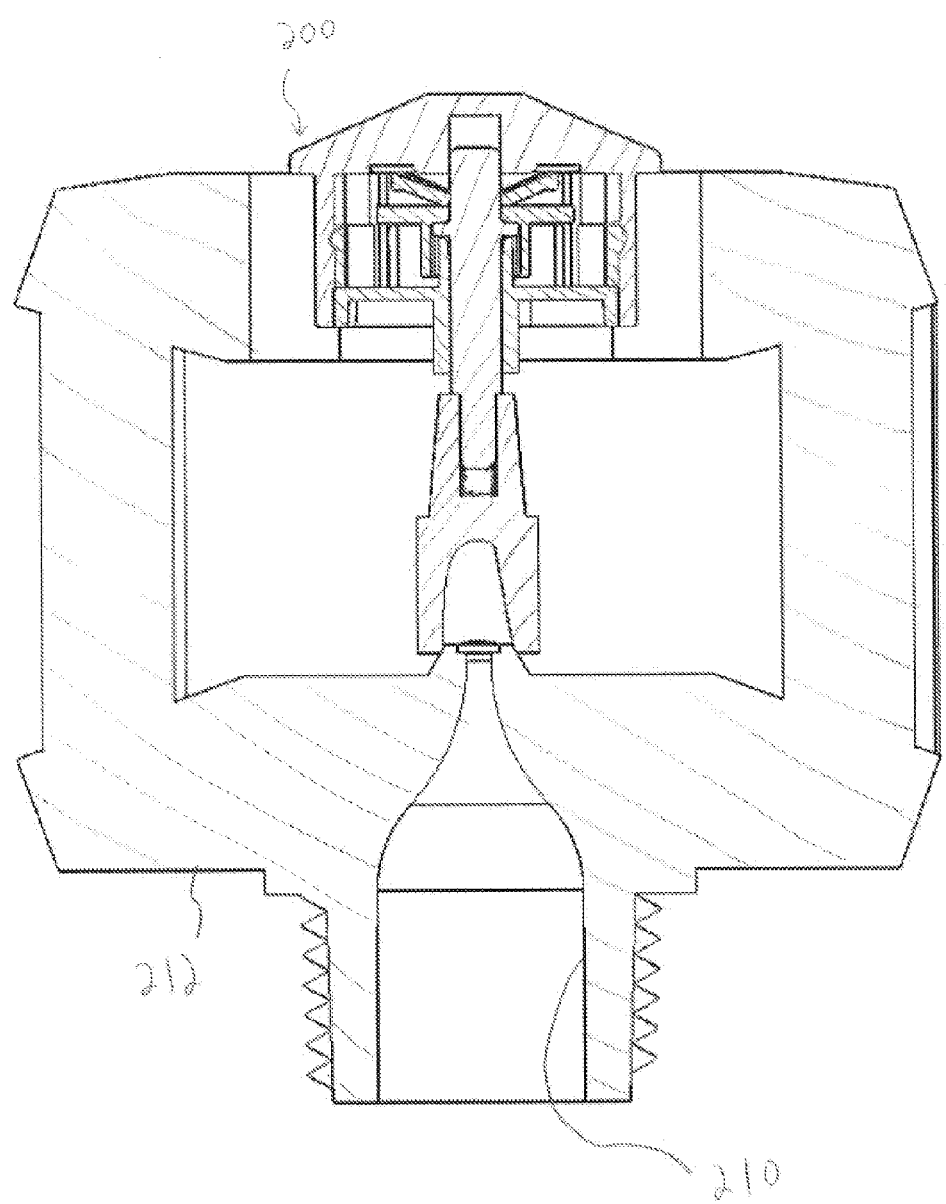
FIG. 23 is a cross-sectional view taken across line 23-23 in FIG. 22
Figure 24:
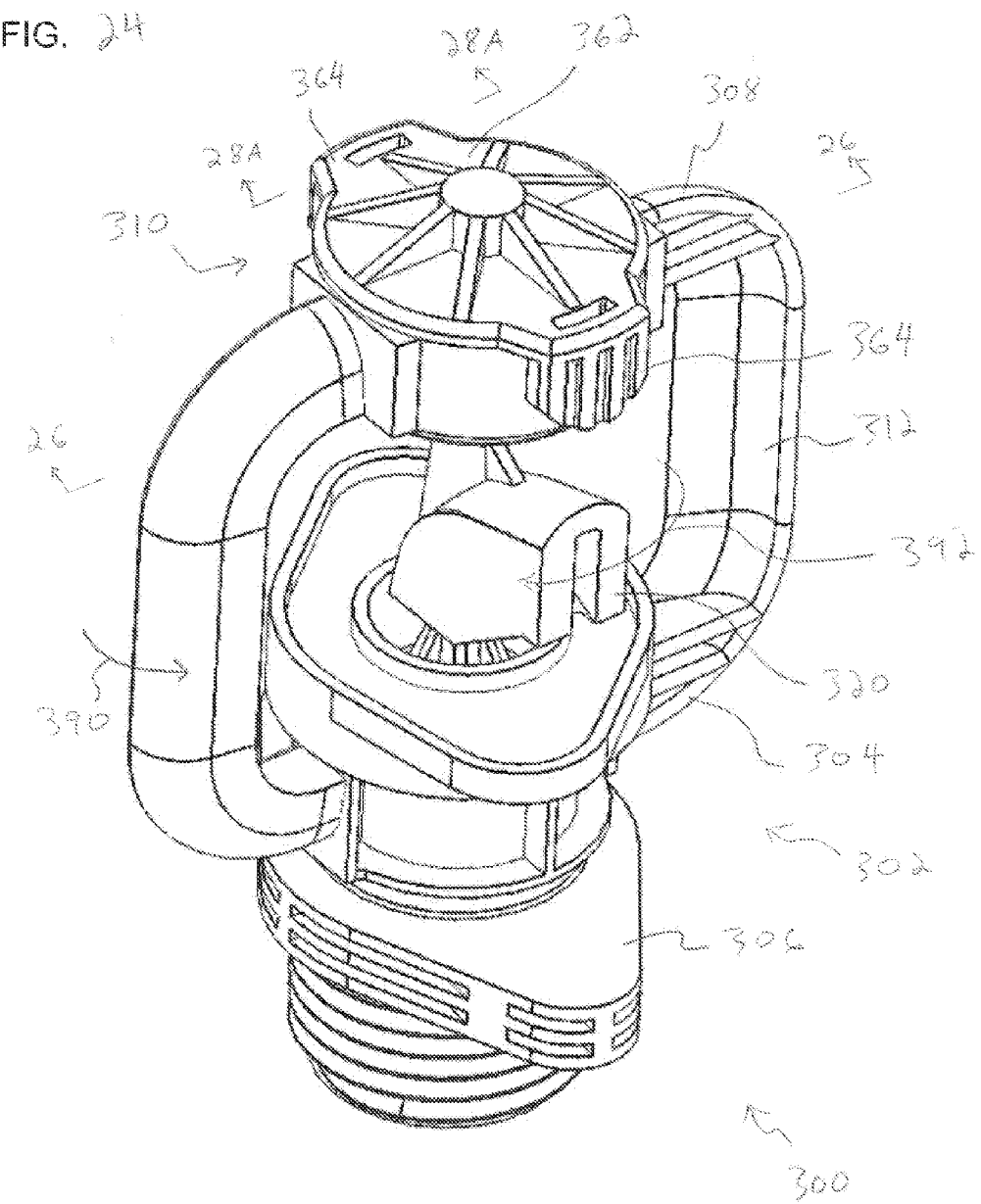
FIG. 24 is a perspective view of another rotary sprinkler.
Figure 25:
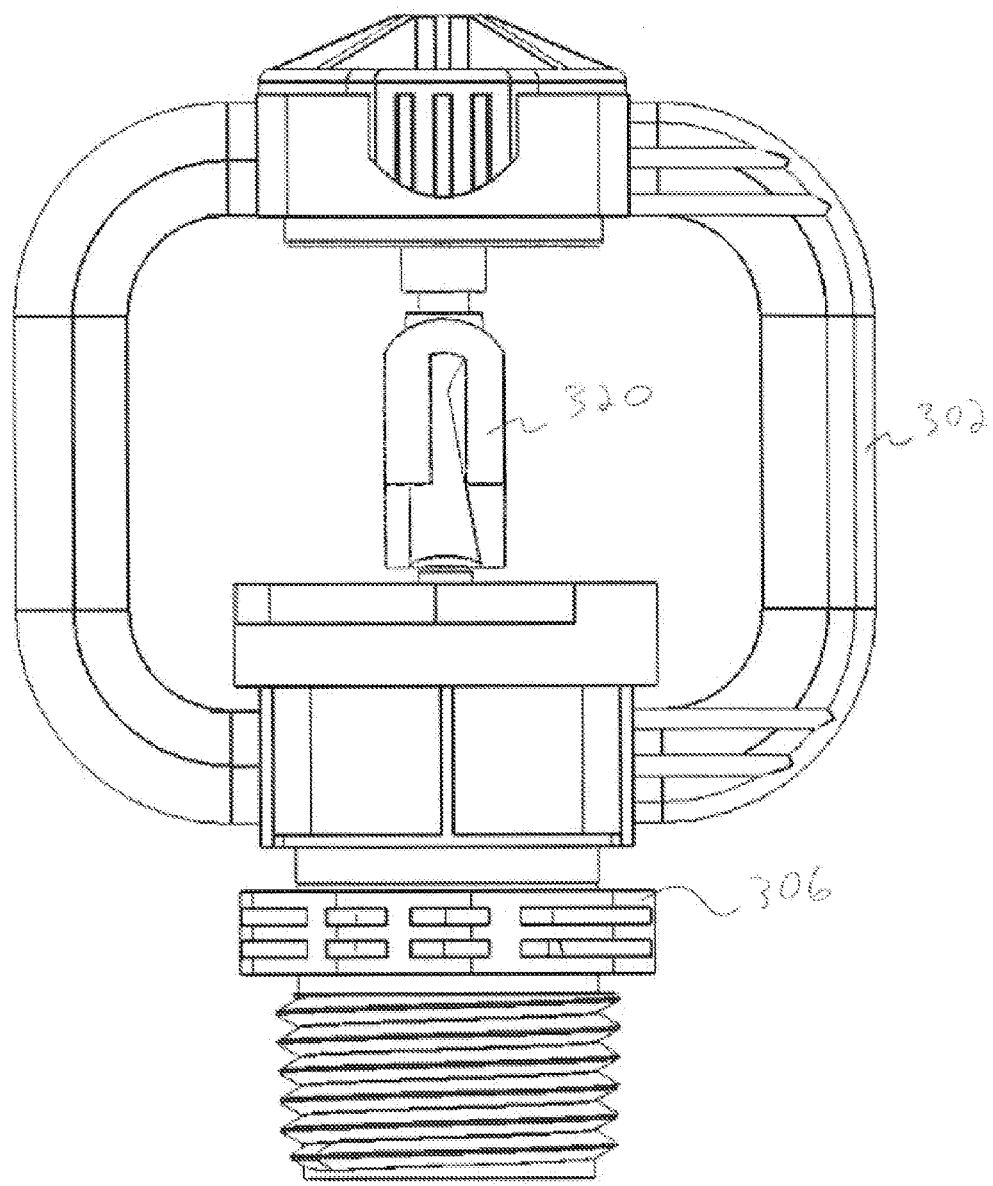
FIG. 25 is a side elevational view of the rotary sprinkler of FIG. 24
Figure 26:
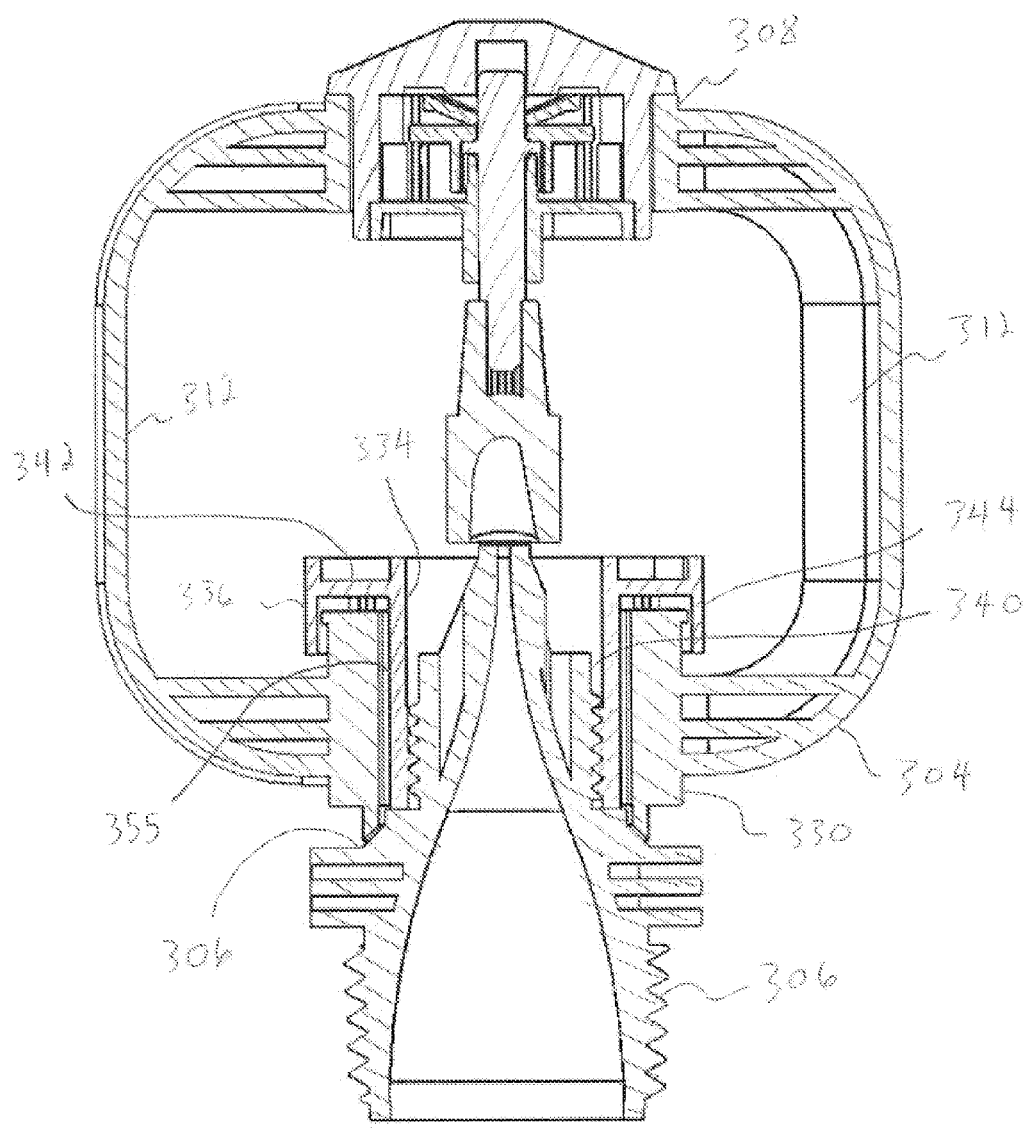
FIG. 26 is a cross-sectional view taken along line 26-26 in FIG. 24.
Figure 27:
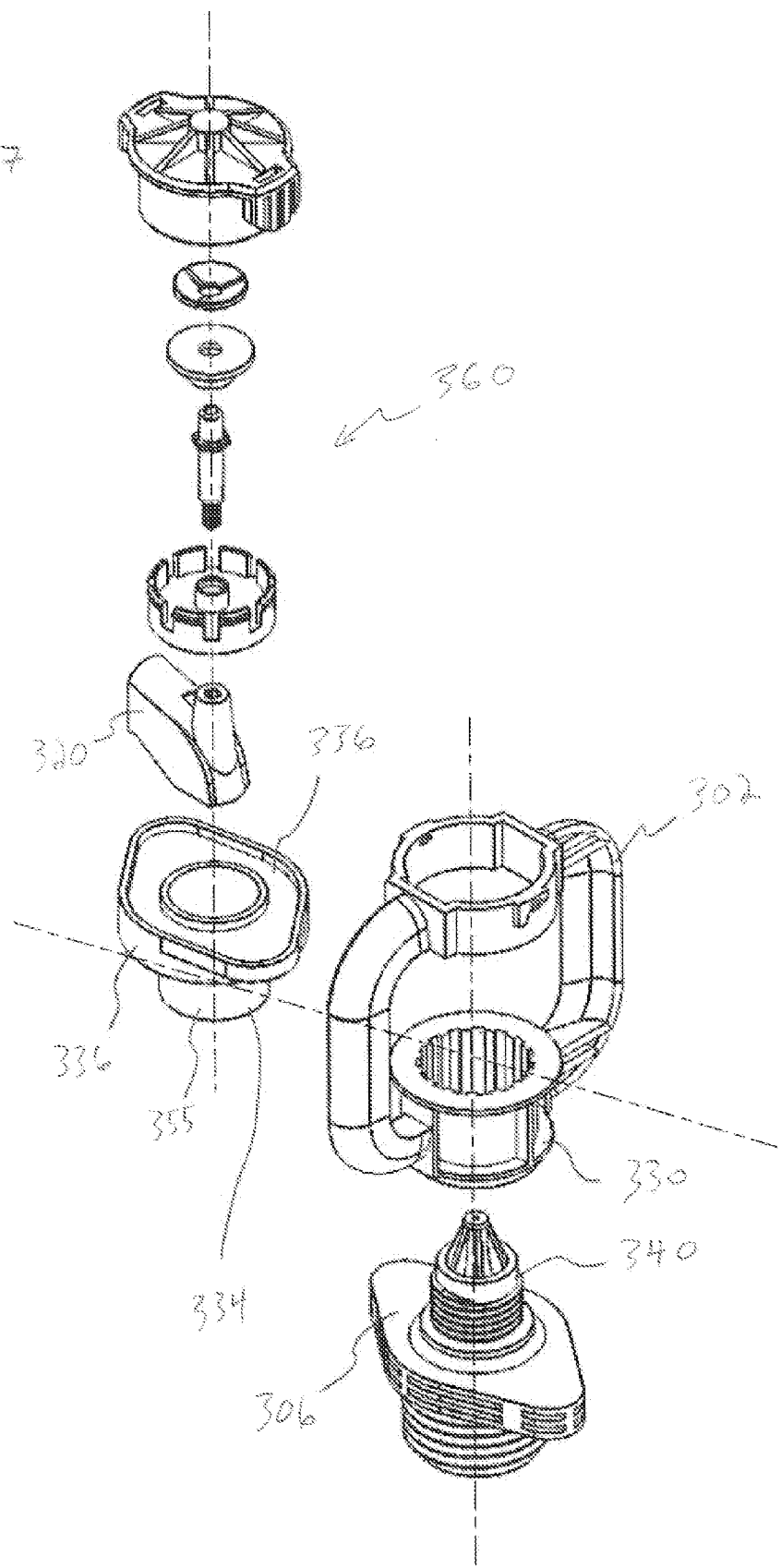
FIG. 27 is an exploded view of the rotary sprinkler of FIG. 24.

With reference to FIGS. 22 and 23, a sprinkler 200 is shown that is similar to the sprinkler 10. The sprinkler 200, however, has a nozzle 210 integrally formed with a frame 212 of the sprinkler 200, rather than the removable nozzle 20 of the sprinkler 10. The sprinkler 200 may cost less to manufacture and be desirable over the sprinkler 10 in certain applications, such as when a removable nozzle 20 is not needed.

With reference to FIGS. 24-29, another sprinkler 300 is shown. The sprinkler 300 is similar in many respects to the sprinkler 10 such that differences between the two will be highlighted. One difference is that the sprinkler 300 includes a body 302 having a base portion 304 rotatably mounted on a nozzle 306, a support portion 308 to which a spinner assembly 310 is connected, and arms 312 connecting the base portion 304 to the support portion 308. The body 302 and spinner assembly 310 can thereby rotate relative to the nozzle 304 during use, whereas the frame 14 and spinner assembly 15 of sprinkler 10 are generally stationary during use. Because the body 300 can rotate about the nozzle 306, fluid flow from a deflector 320 of the spinner assembly 310 strikes the arms 312 and causes the body 302 to rotate incrementally a short distance about the nozzle 306. This incremental rotation of body 302 moves the arms 312 to a different position each time the deflector 320 travels by the arms 312 which continually moves the spray shadow produced by the arms 312. In this manner, the sprinkler 300 has an uninterrupted spray pattern over time.

More specifically, the body base portion 304 includes a collar 330 with an opening 332 sized to fit over a neck 334 of a retention member such as a nut 336. During assembly, the collar 330 is slid onto the neck 334 and the neck 334 is threaded onto an upstanding outer wall 340 of the nozzle 306. The nut 336 has a flange 342 and a sleeve 344 that capture the collar 330 on the nozzle 306 between the flange 342 and a support 350 of the nozzle 306. Further, the nut 336 has wings 354 that may be grasped and used to tighten the nut 336 onto the nozzle 306.

The collar 330 has internal teeth 351 with grooves 353 therebetween and the neck 334 of the nut 336 has a smooth outer surface 355. When the body 302 rotates relative to the nut 336 and the nozzle 306, the teeth 351 slide about the outer surface 355. The grooves 353 direct dirt and debris caught between the body 302 and the nut 336 downward and outward from the connection between the body 302 and the nut 336. This keeps dirt and debris from gumming up the connection and keeps the body 302 rotatable on the nut 336.

Figure 28:
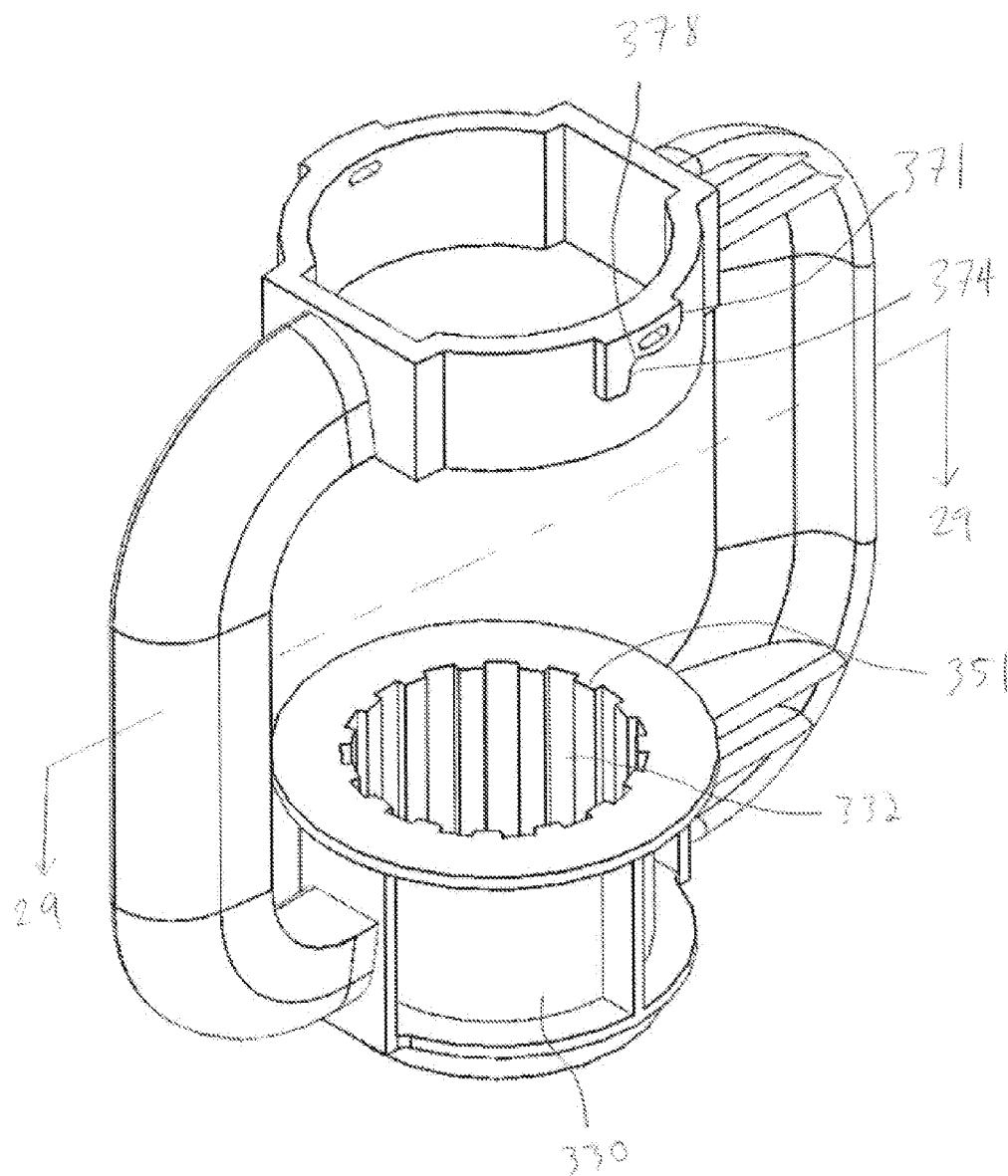
FIG. 28 is a perspective view of a frame of the rotary sprinkler of FIG. 24.
Figure 28A:
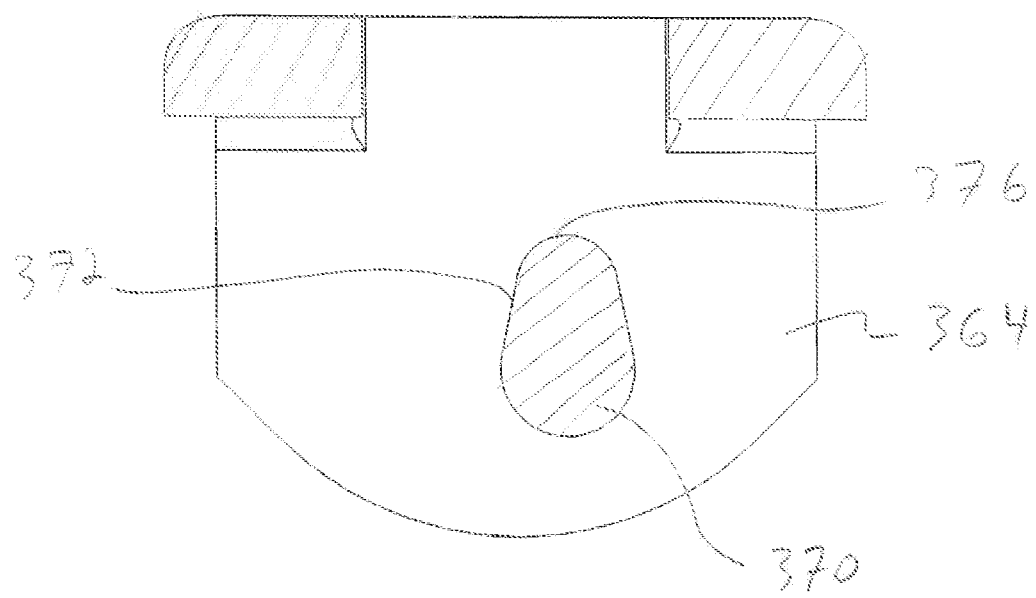
FIG. 28A is a cross-sectional view taken across line 28A-28A in FIG. 24.

With reference to FIGS. 28 and 28A, the spinner assembly 310 includes a brake device 360 releasably connected to the body support portion 308 in a manner similar to the brake device 24 and frame upper portion 16. However, the brake device 360 includes a cap 362 with depending tabs 364 having different coupling features than the tabs 72. The tabs 364 have rounded members 370 that engage coupling members 371 of the body support portion 308 and restrict longitudinal and rotational movement of the brake device cap 362. More specifically, the tab rounded member 370 has an inclined outer surface 372 that is rotated into engagement with inclined surface 374 of the coupling member 371, in a manner similar to turning the brake cap 54 to lock the cap 54 to the frame upper portion 16. The tab rounded member 370 also has a convex surface 376 which engages a concave surface 378 of the coupling member 371. The engagement of the surfaces 372, 374 and 376, 378 restricts rotary and longitudinal movement of the cap 362 away from its locked position. However, it will be appreciated that the sprinkler 300 could alternatively utilize the locking mechanisms of sprinkler 10.

Another difference between the sprinklers 10, 300 is that the sprinkler 300 has arms 312 with cross-sections shaped to produce rotary movement of the arms 312 in response to fluid striking the arms 312. With reference to FIG. 29, water flow 380 from the deflector 320 travels toward an inner portion of the arm 312, strikes a curved intermediate surface 384, and is redirected outward from an outer portion 386 of the arm 312. The impact of the water flow 380 against the curved surface 384 imparts a force offset from the radial direction which creates a torque on the arm 312 and the body 302. This torque advances the body 312 in direction 390, which is generally opposite the direction of rotation of the deflector 320.

It will be appreciated that the fluid stream 380 strikes the arm 312 only momentarily before the rotation of the deflector 320 moves the fluid stream 380 out of alignment with the arm 312. Eventually, the fluid stream 380 strikes the other arm and a similar torque is applied to further incrementally rotate the body 302 and arms 312. Thus, the deflector 320 moves at a generally constant speed (due at least in part to brake assembly 360) in direction 392 while the body 302 and arms 312 rotate intermittently and incrementally in direction 390 when the fluid stream 380 contacts either one of the arms 312.

With reference to FIGS. 30-36, a sprinkler 1000 is shown that is similar in a number of ways to the sprinkler 300 of FIGS. 24-29. The sprinkler 1000 has a nozzle 1002 with a lower threaded portion 1004 for mounting to a water supply line and an upper threaded portion 1006 for engaging a retention member such as a nipple 1008. The nozzle 1002 has two protuberances 1010, 1012 that can be used to hand tighten/loosen the sprinkler 1000.

The sprinkler 1000 is different from the sprinkler 300 in that the sprinkler 1000 has a rotator 1020 with a stationary deflector 1022 mounted thereon. The sprinkler includes a snap-in feature 1023 that releasably connects the deflector 1022 to the rotator 1020. The deflector 1022 diverts a jet of water from the nozzle 1002 and redirects it at two angles. One angle turns the stream from vertical to horizontal and spreads the jet for even watering. As discussed below, redirecting the stream imparts a vertical force to the deflector 1022 which causes the rotator 1020 to compress a brake 1032 and slow rotation of the rotator 1020. The deflector 1022 imparts a second angle channels the jet of water sideways creating a moment arm about an axis of rotation 1033 causing the rotator 1020 to turn clockwise (as viewed from above the sprinkler 1000). The shapes and configurations of the nozzle 1002 and deflector 1022 can be varied to produce different throw distances and volumes.

The nipple 1008 has clips 1030 that are configured to permit the brake 1032 and the rotator 1020 to be pressed onto the nipple 1008. However, once the brake 1032 and the rotator 1020 are mounted on the nipple 1008, the clips 1030 restrict the brake 1032 and the rotator 1020 from sliding off of the nipple 1008 even if the nozzle 1002 has been removed from the nipple 1008.

The brake 1032 is a compactable rubber dual-contact O-ring which when compressed will result in an increased frictional force which keeps the rotator 1020 from rotating ever faster. When water from the nozzle 1002 strikes the deflector 1022, the impact force from the water shifts the rotator 1020 away from the nozzle 1002 and causes the rotator 1020 to compress the brake 1032 between brake surfaces 1040, 1042 of the rotator 1020 and nipple 1008.

The rotator 1020 has a collar 1050 with internal teeth 1052 that slide along a smooth outer surface 1054 of the nipple 1008. The teeth 1052 direct dirt and other debris along grooves 1056 between teeth 1052 and outward from the connection between the rotator 1020 and the nipple 1008. This reduces the likelihood of the sprinkler 1000 stalling due to debris gumming up the connection between the rotator 1020 and the nipple 1008.

Figure 46:
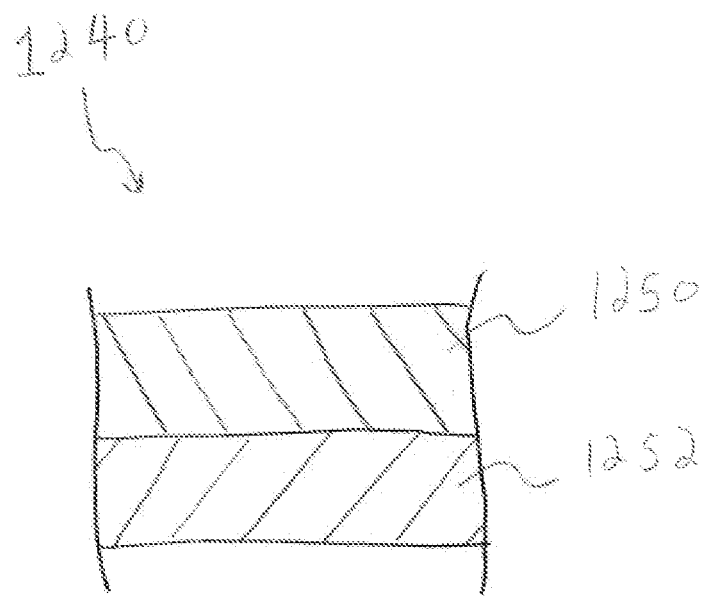
FIG. 46 is a cross-sectional view of the coil.
Figure 47:
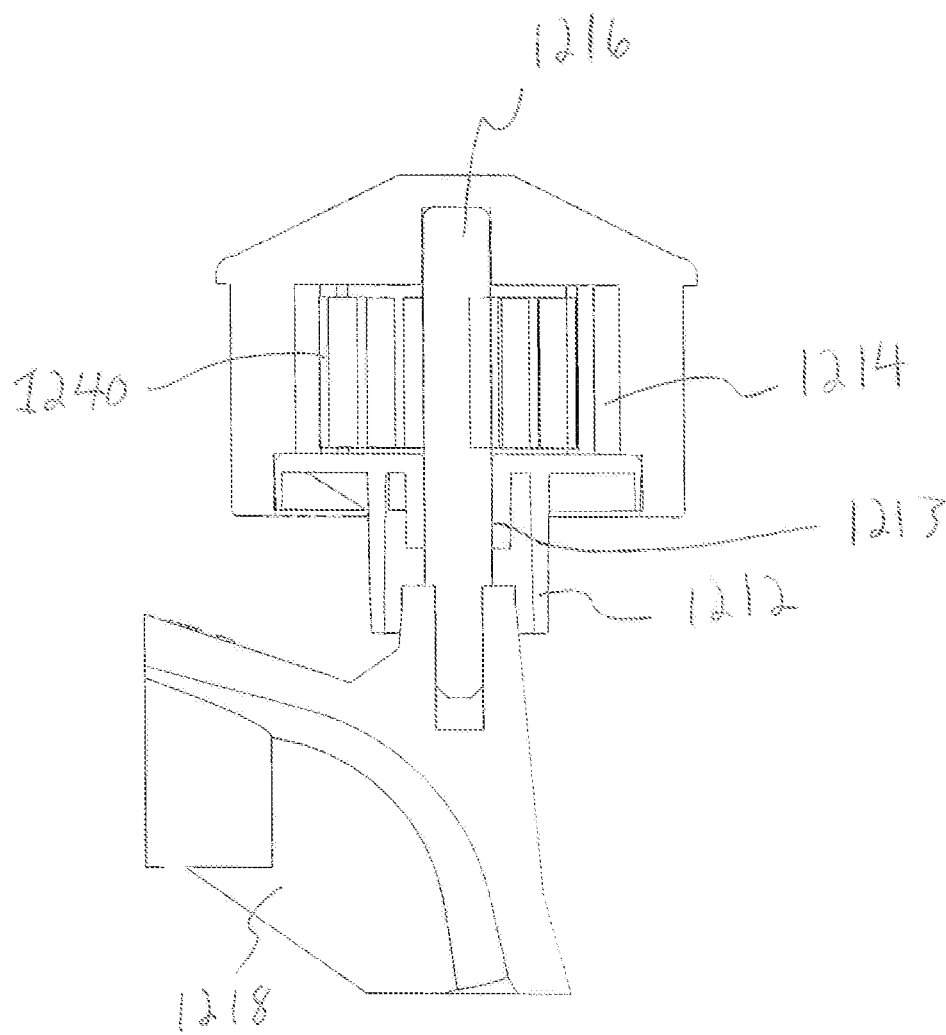
FIG. 47 is a partial cross-sectional view taken across line 47-47 in FIG. 40.

With reference to FIGS. 40-47, a sprinkler 1200 having a brake assembly 1202 that is responsive to environmental conditions is shown. The sprinkler 1200 is substantially similar to the sprinkler 10 discussed above such that differences between the two will be highlighted. The brake assembly 1202 has a cap 1204 that forms a sealed chamber 1210 in conjunction with a brake base member 1212, as shown in FIG. 47. The chamber 1210 houses a fluid 1214 and a brake shaft 1216 connected to a deflector 1218 of the sprinkler 1200. The chamber 1210 can include a seal between the brake shaft 1216 and a shaft bearing surface 1213 of the brake base member 1212 to seal the fluid 1214 within the chamber 1210, as shown in FIG. 47.

Figure 41:
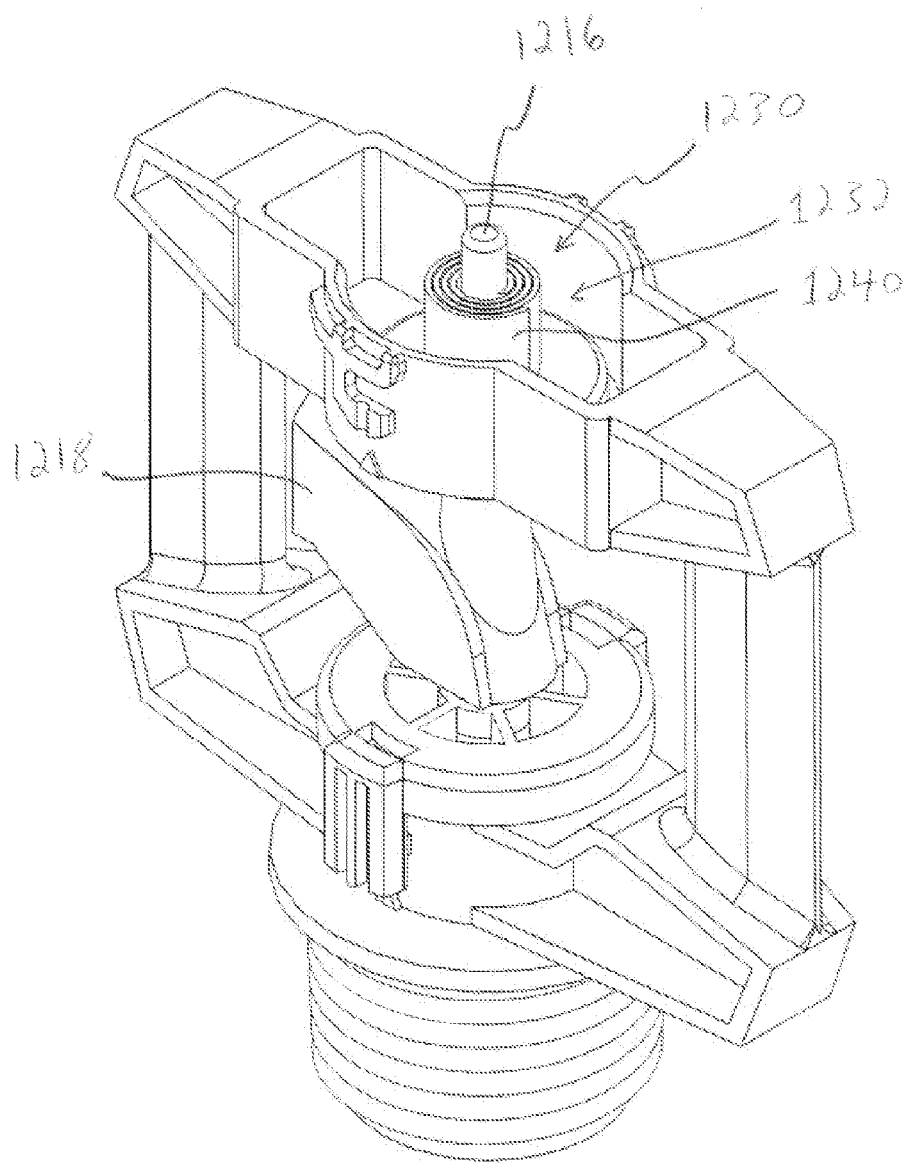
FIG. 41 is a perspective view of the sprinkler of FIG. 40 with a cap of a brake assembly of the sprinkler removed.

With reference to FIG. 41, the cap 1204 is removed to show a brake rotor 1230 of the brake assembly 1202. The brake rotor 1230 includes a reactive brake device 1232 that is configured to change the braking force applied to the deflector brake shaft 1216 in response to changes to the environment in which the sprinkler 1200 is located. For example, the reactive brake device 1232 may include a bi-material coil 1240 that has two sheets of material laminated together. With reference to FIG. 46, a cross-section of the coil 1240 is shown. The coil 1240 includes an active component 1250 having a higher coefficient of thermal expansion and a passive component 1252 having a lower coefficient of thermal expansion. As the environmental temperature increases, the active component 1250 expands more than the passive component 1252 such that the coil 1240 expands.

Figure 42:
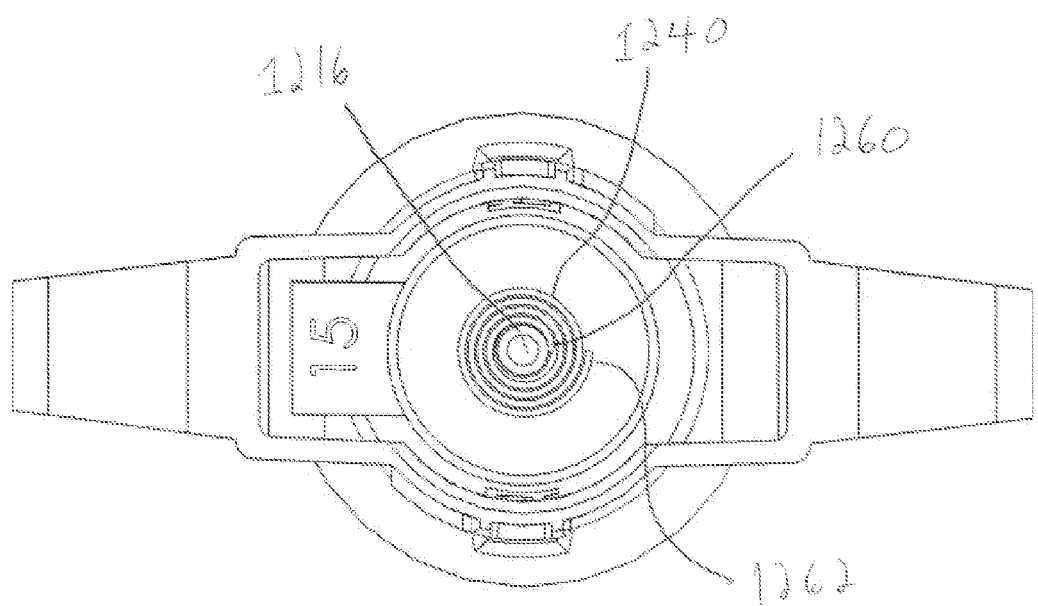
FIG. 42 is a top plan view of the sprinkler of FIG. 41 showing a coil of the brake assembly.
Figure 43:
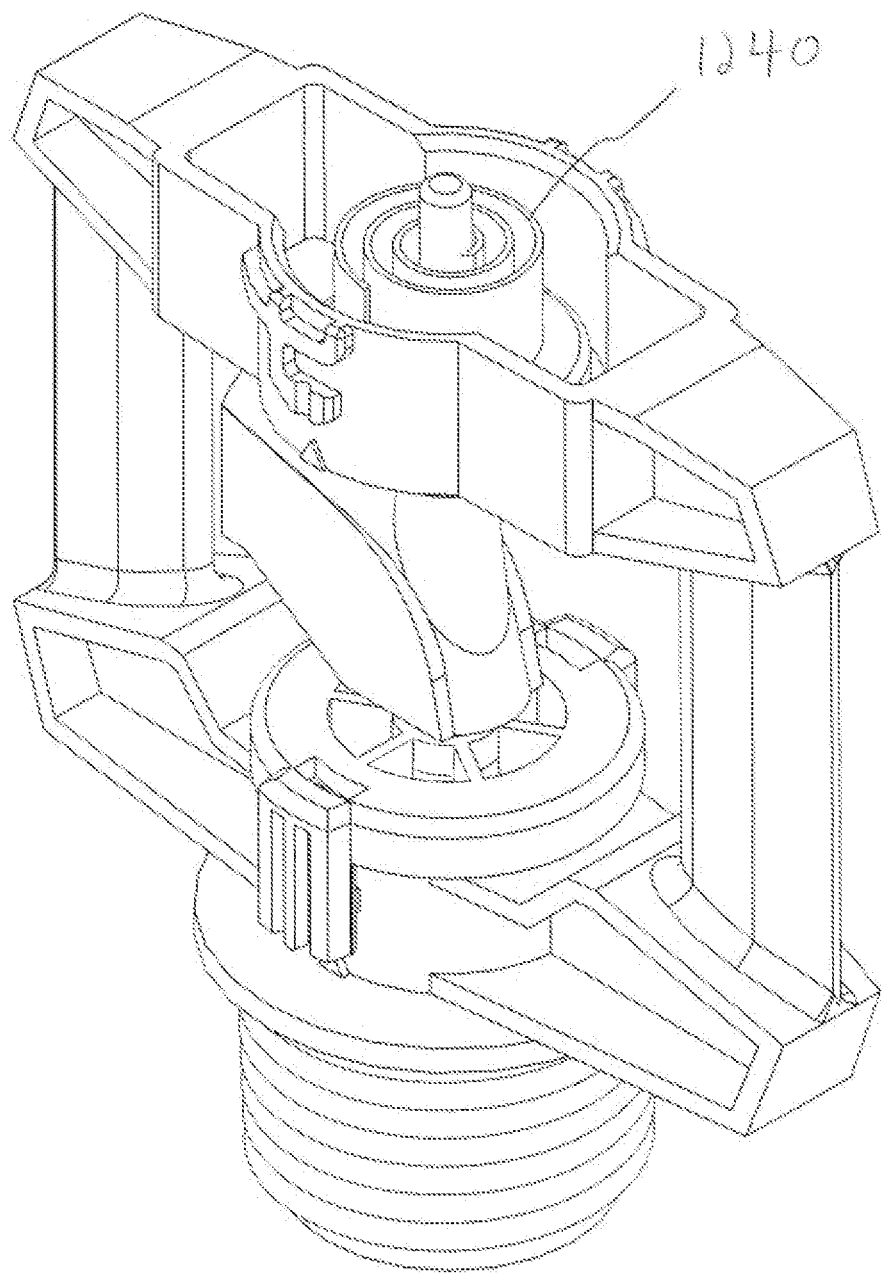
FIG. 43 is a perspective view similar to FIG. 41 showing the coil in an expanded configuration.
Figure 44:
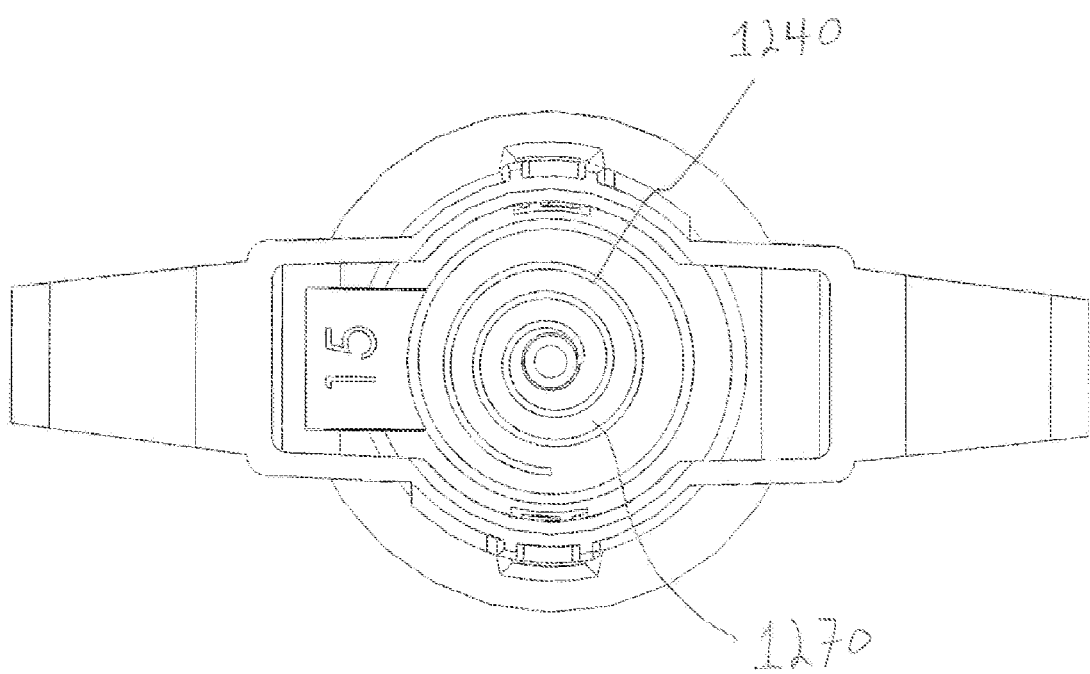
FIG. 44 is a top plan view of the sprinkler of FIG. 43.
Figure 45:
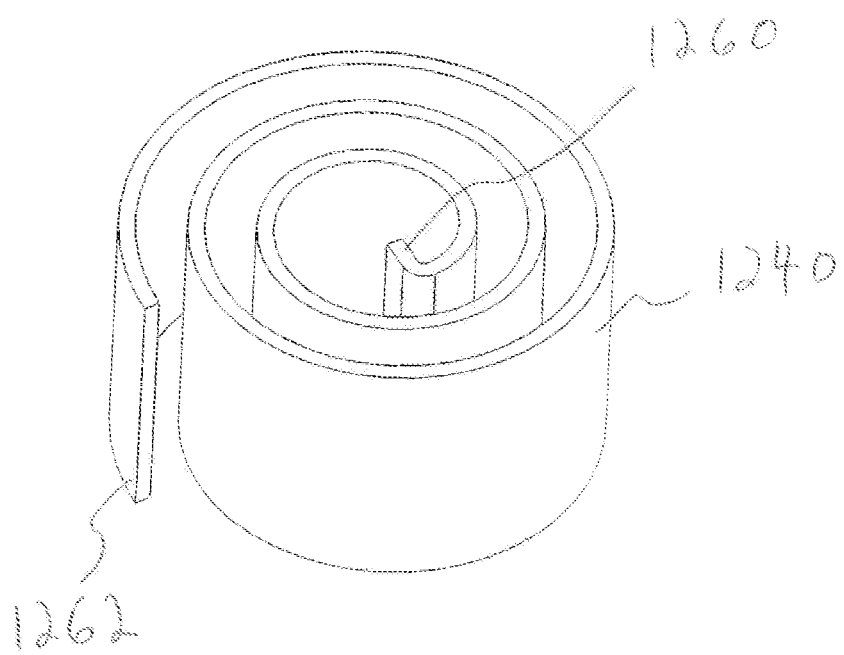
FIG. 45 is a perspective view of the coil of the brake assembly.

With reference to FIGS. 41 and 42, the coil 1240 has a fixed end 1260 engaged in a slot of the brake shaft 1216, such as by welding, and a free end 1262 disposed radially outward from the fixed end 1260. With reference to FIGS. 41 and 42, the coil 1240 is shown in a fully contracted position at a low environmental temperature where the sections of the coil 1240 are in a tightly wrapped orientation around each other. With reference to FIGS. 43 and 44, the coil 1240 is shown in a fully expanded configuration at an elevated temperature. When the coil 1240 is in the expanded configuration, the winds of the coil 1240 are spaced apart by larger gaps 1270 than when the coil 1240 is at the low temperature.

The change in the coil 1240 from the fully contracted to the fully expanded configuration increases the resistant torque generated by the coil 1240 as the coil 1240 rotates within the fluid 1214. More specifically, the resistant torque generated by the expanded coil 1240 is higher than the torque generated by the contracted coil. This increase in torque tends to offset the decrease in the viscosity of the fluid 1214 due to the increase in environmental temperature. Thus, the coil 1240 can provide a more consistent torque and resulting speed of rotation of the deflector 1218 despite changes in the temperature of the surrounding environment.

Another impact of the change in the shape of the coil 1240 from the contracted expanded configuration is that the fully expanded coil has a larger moment of inertia than the contracted coil 1240. Stated differently, the coil 1240 is more difficult to turn when it is fully expanded than when it is fully contracted. This increase in the moment of inertia also helps to offset the decrease in viscosity of the fluid 1214 due to elevated environmental temperatures.

With reference to FIGS. 46 and 47, the fluid 1214 may be a silicone-based grease of a desired viscosity. For the active component 1250, metals or metal alloys with a high coefficient of thermal expansion may be used including non-ferrous metals such a copper, brass, aluminum, or nickel. For the passive component 1252, ferrous alloy such as stainless steel may be used.

Figures 48, 49:
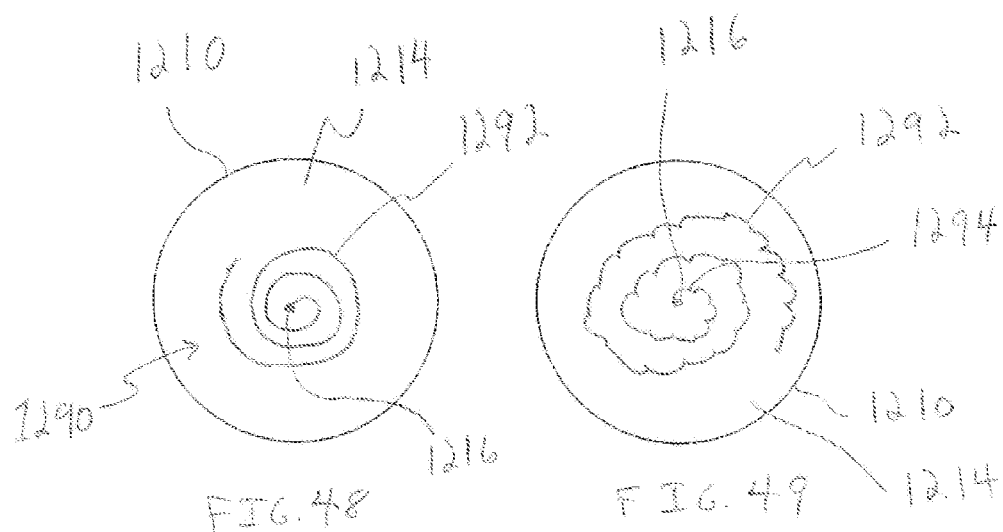
FIG. 48 is a schematic view of another coil showing the coil in a relaxed configuration.
FIG. 49 is a schematic view of the coil of FIG. 48 showing the coil in a stressed configuration.

With reference to FIG. 48, another reactive brake device 1290 is shown including a coil 1292 having a fixed end 1294 connected to the brake shaft 1216. The coil 1292 is similar to the coil 1240, except that the coil 1292 has a relaxed configuration (see FIG. 48) and a stressed configuration (see FIG. 49) where the coil 1292 has an undulating shape. The undulating profile of the coil 1292 when the coil 1292 is in the stressed configuration increases the drag of the coil 1292 through the fluid 1214 in the brake chamber 1210.

Figures 50, 51:
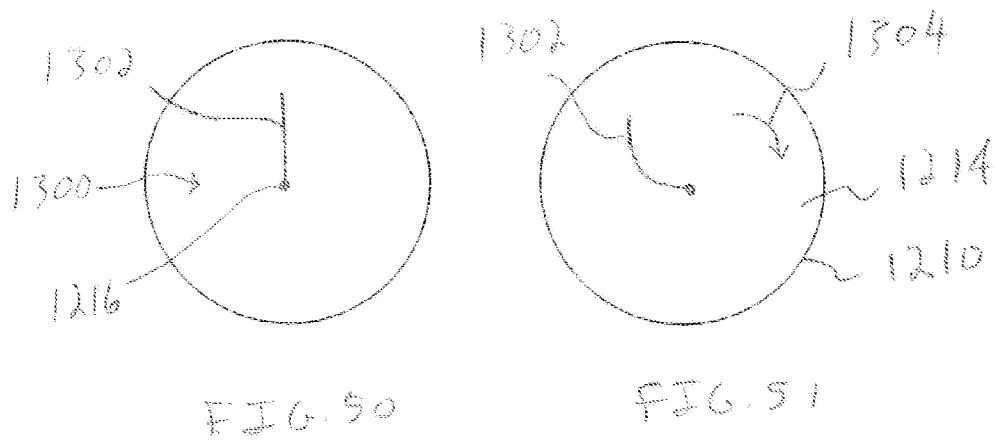
FIG. 50 is a schematic view of a beam extending outwardly from a brake shaft.
FIG. 51 is a schematic view of the beam of FIG. 50 showing the beam 51 in a bent configuration.

With reference to FIGS. 50 and 51, another reactive brake device 1300 is shown. The reactive brake device 1300 includes a beam 1302 extending radially outward from the brake shaft 1216 when the reactive brake device 1300 is at a low environmental temperature. Increasing the temperature, however, causes the beam 1302 to bend, as shown in FIG. 51. The bent beam 1302 produces a higher amount of drag as the beam 1302 travels in direction 1304 within the fluid 1214 in the chamber 1210. Thus, the reactive brake device 1300 provides another approach for compensating for the decrease in viscosity of the fluid 1214 as the environmental temperature changes. Although only one beam 1302 is shown, the reactive brake device 1300 could include one, two, three, or more beams 1302 depending on the amount of resistance needed for a particular application.

Figure 52:
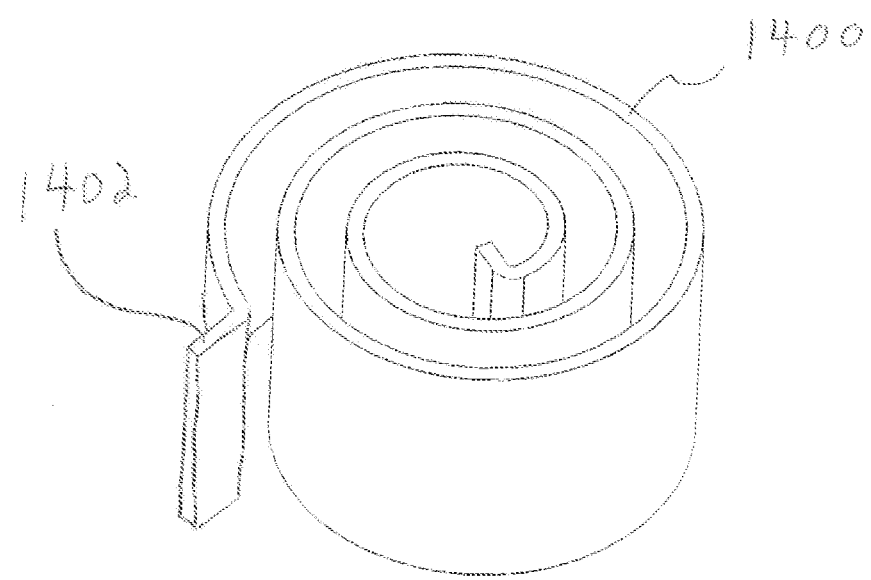
FIG. 52 is a perspective view of another coil having an outwardly projecting lip.

With reference to FIG. 52, another coil 1400 is shown. The coil 1400 is similar to the coil 1240 except that the coil 1400 has an outwardly projecting lip 1402 that can magnify the resistant torque generated by the expanded coil 1400.

While the foregoing description is with respect to specific examples, those skilled in the art will appreciate that there are numerous variations of the above that fall within the scope of the concepts described herein and the appended claims.

What is claimed is:

1. A sprinkler comprising:
   a frame;
   a deflector rotatably connected to the frame;
   a brake controlling rotation of the deflector, the brake having a fluid and a rotor in the fluid configured for rotation with the deflector;
   a regulator in the fluid having a first shape at a first temperature and a different, second shape at a second temperature, the regulator being configured to change from the first shape to the second shape and adjust rotation of the rotor in response to the change in temperature; and
   a portion of the regulator that bends as the regulator changes from the first shape to the second shape.

2. The sprinkler of claim 1 wherein the regulator has an end connected to the rotor.

3. The sprinkler of claim 1 wherein the regulator includes a member with two connected materials having different coefficients of thermal expansion.

4. A sprinkler comprising:
   a frame;
   a deflector rotatably connected to the frame;
   a brake controlling rotation of the deflector, the brake having a fluid and a rotor in the fluid configured for rotation with the deflector;
   a regulator in the fluid having a first shape at a first temperature and a different, second shape at a second temperature, the regulator being configured to change from the first shape to the second shape and adjust rotation of the rotor in response to the change in temperature; and
   wherein the regulator includes a strip of two different laminated materials.

5. The sprinkler of claim 4 wherein the two different laminated materials include two different metals.

6. A sprinkler comprising:
   a frame;
   a deflector rotatably connected to the frame;
   a brake controlling rotation of the deflector, the brake having a fluid and a rotor in the fluid configured for rotation with the deflector;
   a regulator in the fluid having a first shape at a first temperature and a different, second shape at a second temperature, the regulator being configured to change from the first shape to the second shape and adjust rotation of the rotor in response to the change in temperature; and
   wherein the regulator includes a coil wherein the first shape is a contracted configuration of the coil and the second shape is an expanded configuration of the coil.

7. A sprinkler comprising:
   a frame;
   a deflector rotatably connected to the frame;
   a brake controlling rotation of the deflector, the brake having a fluid and a rotor in the fluid configured for rotation with the deflector;
   a regulator in the fluid having a first shape at a first temperature and a different, second shape at a second temperature, the regulator being configured to change from the first shape to the second shape and adjust rotation of the rotor in response to the change in temperature; and
   wherein the regulator includes one or more beams wherein the first shape is a generally straight configuration of the one or more beams and the second shape is a generally curved configuration of the one or more beams.

8. The sprinkler of claim 1 wherein the regulator includes an elongate member comprising a pair of opposite end portions with one of the end portions disposed in the fluid and the elongate member includes the portion of the regulator that bends as the regulator changes from the first shape to the second shape along the elongate member intermediate the end portions.

9. The sprinkler of claim 1 wherein the regulator includes an end portion connected to the rotor and a free end portion disposed in the fluid and the portion of the regulator that bends as the regulator changes from the first shape to the second shape is intermediate the ends.

10. The sprinkler of claim 1 wherein the regulator includes a plurality of members each having a portion that bends as the regulator changes from the first shape to the second shape.

11. The sprinkler of claim 1 wherein the regulator includes a member having a free end in the fluid, the member free end having a first position where the free end is spaced from the rotor by a first distance and a second position where the free end is spaced from the rotor by a different, second distance and the member free end shifts from the first position to the second position as the regulator changes from the first shape to the second shape.

12. The sprinkler of claim 1 wherein the regulator includes a metallic member comprising the portion that bends as the regulator changes from the first shape to the second shape.

13. The sprinkler of claim 4 wherein the strip has an end connected to the rotor.

14. The sprinkler of claim 4 wherein the strip has a coil shape that changes from a contracted configuration to an expanded configuration as the regulator changes from the first shape to the second shape.

15. The sprinkler of claim 4 wherein the strip of two different laminated materials includes a free end disposed in the fluid.

16. The sprinkler of claim 15 wherein the free end has a first position spaced from the rotor by a first distance and a second position spaced from the rotor by a different, second distance and the free end shifts from the first position to the second position as the regulator changes from the first shape to the second shape.

17. The sprinkler of claim 7 wherein the one or more beams each include a free end disposed in the fluid.

18. The sprinkler of claim 7 wherein the one or more beams each include an end connected to the rotor.

19. A sprinkler comprising:
   a frame;
   a deflector rotatably connected to the frame;
   a brake controlling rotation of the deflector, the brake having a fluid and a rotor in the fluid configured for rotation with the deflector;
   a regulator in the fluid having a first shape at a first temperature and a different, second shape at a second temperature, the regulator being configured to change from the first shape to the second shape and adjust rotation of the rotor in response to the change in temperature; and
   wherein the regulator includes two different laminated materials.

20. The sprinkler of claim 19 wherein the two different laminated materials are metals.

21. The sprinkler of claim 19 wherein the regulator includes a member with the two different laminated materials, the member having a free end disposed in the fluid.

22. The sprinkler of claim 19 wherein the materials have different coefficients of thermal expansion.

\* \* \* \* \*